United States Patent
Matsushita et al.

(10) Patent No.: US 12,533,745 B2
(45) Date of Patent: *Jan. 27, 2026

(54) ELECTRICAL STEEL STRIP WELDED JOINT AND FRICTION STIR WELDING METHOD, AND METHOD OF PRODUCING ELECTRICAL STEEL STRIP

(71) Applicant: JFE STEEL CORPORATION, Tokyo (JP)

(72) Inventors: Muneo Matsushita, Tokyo (JP); Shohei Iwata, Tokyo (JP); Yasushi Kitani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 18/686,869

(22) PCT Filed: Jul. 27, 2022

(86) PCT No.: PCT/JP2022/029029
§ 371 (c)(1),
(2) Date: Feb. 27, 2024

(87) PCT Pub. No.: WO2023/037786
PCT Pub. Date: Mar. 16, 2023

(65) Prior Publication Data
US 2024/0359257 A1   Oct. 31, 2024

(30) Foreign Application Priority Data

Sep. 13, 2021 (JP) .................................. 2021-148992
Sep. 13, 2021 (JP) .................................. 2021-148998

(51) Int. Cl.
*B23K 20/12* (2006.01)
*H01F 1/147* (2006.01)
(Continued)

(52) U.S. Cl.
CPC .......... *B23K 20/129* (2013.01); *B23K 20/122* (2013.01); *H01F 1/147* (2013.01); *B23K 2101/36* (2018.08); *B23K 2103/04* (2018.08)

(58) Field of Classification Search
None
See application file for complete search history.

(56) References Cited

U.S. PATENT DOCUMENTS 5,460,317 A    10/1995 Thomas et al.
7,540,402 B2 *  6/2009 McCrink .................. B23K 9/23
                                                148/590
(Continued)

FOREIGN PATENT DOCUMENTS

EP    2474382 A1    7/2012
EP    2474382 B1    2/2019
(Continued)

OTHER PUBLICATIONS

Ling Cui et al., Friction stir welding of a high carbon steel, Scripta Materialia, 2007, pp. 637-640, vol. 56.
(Continued)

*Primary Examiner* — Daniel J. Schleis
(74) *Attorney, Agent, or Firm* — KENJA IP LAW PC

(57) ABSTRACT

An electrical steel strip welded joint is provided that is able to inhibit the occurrence of coil joint fracture on a production line caused by deterioration of mechanical properties and shape of the coil joint. The steel microstructures of the joined portion and the thermo-mechanically affected zone are mainly ferrite phase, and satisfy the relationships of the following Expressions (1) to (4).

(Continued)

$$Dsz \leq 200\,\mu m \qquad (1)$$

$$Dhaz1 \leq Dbm1 \qquad (2)$$

$$Dhaz2 \leq Dbm2 \qquad (3)$$

$$0.9 \times (Hbm1 + Hbm2)/2 \leq Hsz \leq 1.2 \times (Hbm1 + Hbm2)/2 \qquad (4)$$

20 Claims, 39 Drawing Sheets

(51) Int. Cl.
  *B23K 101/36* (2006.01)
  *B23K 103/04* (2006.01)

(56) References Cited

U.S. PATENT DOCUMENTS

| | | | |
|---|---|---|---|
| 9,617,690 B2 * | 4/2017 | Saita | B23K 11/04 |
| 12,337,408 B2 * | 6/2025 | Matsushita | B23K 20/123 |
| 2020/0238434 A1 * | 7/2020 | Matsushita | B23K 20/126 |
| 2022/0371119 A1 | 11/2022 | Matsushita et al. | |
| 2024/0408696 A1 * | 12/2024 | Matsushita | B23K 20/122 |
| 2025/0065438 A1 * | 2/2025 | Yamagishi | B32B 7/05 |

FOREIGN PATENT DOCUMENTS

| | | |
|---|---|---|
| EP | 2502698 B1 | 8/2020 |
| JP | H05305466 A | 11/1993 |
| JP | H07505090 A | 6/1995 |
| JP | 3261433 B2 | 3/2002 |
| JP | 2003170280 A | 6/2003 |
| JP | 2004025284 A | 1/2004 |
| JP | 2011140026 A | 7/2011 |
| JP | 4838385 B2 | 12/2011 |
| JP | 4838388 B2 | 12/2011 |
| JP | 2018095956 A | 6/2018 |
| WO | 2011024320 A1 | 3/2011 |
| WO | 2018070317 A1 | 4/2018 |
| WO | 2021060176 A1 | 4/2021 |

OTHER PUBLICATIONS

Oct. 4, 2022, International Search Report issued in the International Patent Application No. PCT/JP2022/029029.

Dec. 20, 2024, The Extended European Search Report issued by the European Patent Office in the corresponding European Patent Application No. 22867108.7.

* cited by examiner

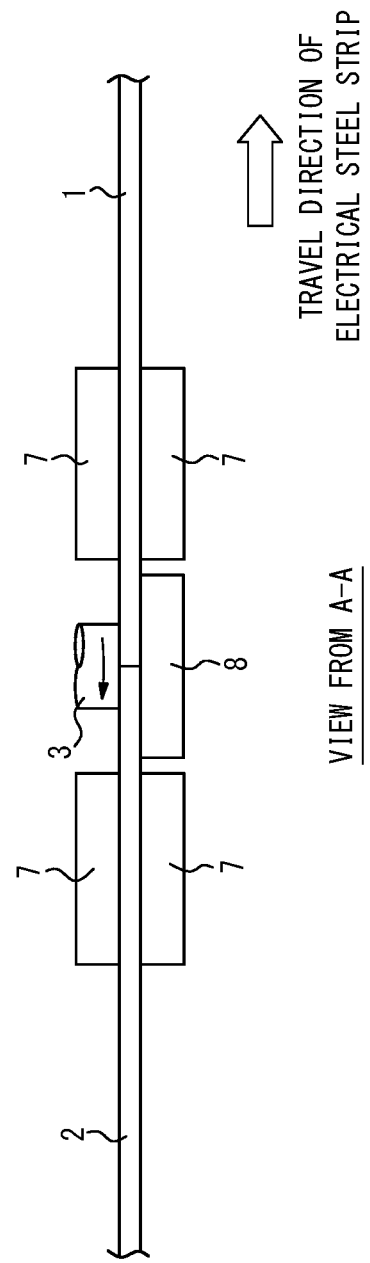

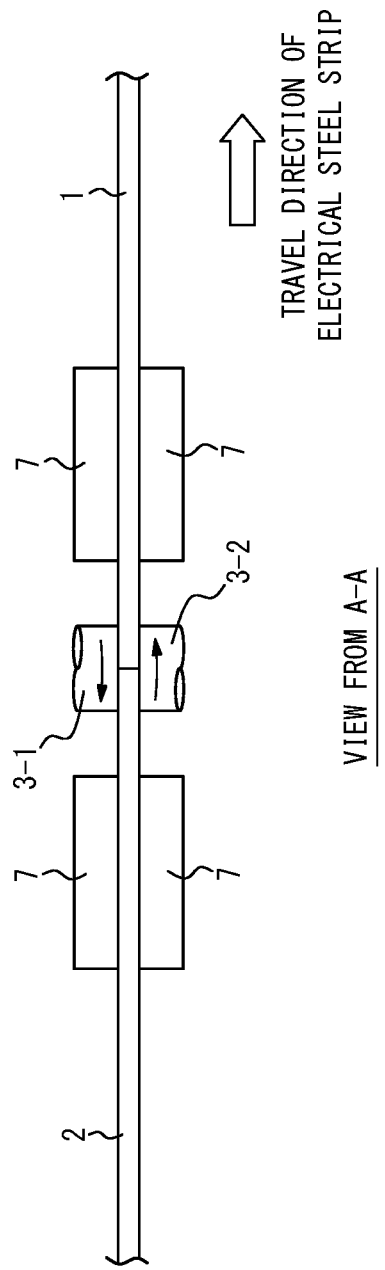

VIEW FROM A-A (CROSS SECTION)

ELECTRICAL STEEL STRIP WELDED JOINT AND FRICTION STIR WELDING METHOD, AND METHOD OF PRODUCING ELECTRICAL STEEL STRIP

TECHNICAL FIELD

The present disclosure relates to an electrical steel strip welded joint and friction stir welding method, and a method of producing an electrical steel strip.

BACKGROUND

In steel sheet production lines, such as pickling, cold rolling, annealing, and coating or plating production lines, in order to improve productivity and increase yield, performing so-called coil joining then passing a steel strip through the production line is common. Here, coil joining refers to the joining of an end (trailing end) of a preceding steel strip and an end (leading end) of the steel strip following the preceding steel strip (hereinafter also referred to as trailing steel strip) in a production line. Hereinafter, a joined portion formed by coil joining is also referred to as a coil joint. The leading end is the end of the steel strip in the direction of travel on the production line. Further, the trailing end is the end of the steel strip in the direction opposite the direction of travel on the production line. Coil joining enables rolling and the like with tension applied to the entire length of the steel strip. Further, coil joining enables highly precise control of strip thickness and shape even at the leading and trailing ends of the steel strip.

In coil joining, conventionally, flash butt welding and the like are commonly applied. However, with advances in laser welders, laser welding is becoming a mainstream application for coil joining in, for example, production lines for electrical steel sheets, stainless steel sheets, and high tensile strength steel sheets.

As an example of such technology, Patent Literature (PTL) 1 describes:

"A high-Si steel laser welding method comprising, when welding high-Si steel, welding using a filler wire containing Ni as the main component or supplying powder filler containing Ni as the main component, so that the chemical composition of weld metal satisfies the following Expression (1).

$$X = [\% \text{ Ni}] - [\% \text{ Si}] \times 2.5 - ([\% \text{ Cr}] + [\% \text{ Mo}]) \times 0.4 \geq 0 \quad (1)$$

Here, [% Ni], [% Si], [% Cr], and [% Mo] represent content (wt %) of Ni, Si, Cr, and Mo in the weld metal, respectively."

PTL 2 Describes:

"In a laser welding method for butt welding a leading sheet and a trailing sheet using a filler wire, a ratio (Gap/DEPO) of the butt gap (Gap) between the leading sheet and the trailing sheet to an average width of the weld metal (DEPO) at an initial stage of welding is 0.3 to 0.8."

PTL 3 Describes:

"In a welded portion formed by laser welding a leading sheet and a trailing sheet made of special steel that are conveyed on a continuous cold rolling line,
when L1 is the minimum thickness of base metal existing below an upper extension portion consisting of weld metal that extends to the upper side of the base metal due to cold rolling, and L2 is the minimum thickness of the base metal between the upper extension portion and a lower extension portion consisting of weld metal that extends to the lower side of the base metal due to cold rolling, then at least one of L1 or L2 is greater than zero."

CITATION LIST

Patent Literature

PTL 1: JP H5-305466 A
PTL 2: JP 2004-25284 A
PTL 3: JP 2011-140026 A
PTL 4: JP H07-505090 A (publication in Japan of WO 9310935 A1)
PTL 5: JP 3261433 B2
PTL 6: JP 4838385 B2
PTL 7: JP 4838388 B2

Non-Patent Literature

NPL 1: Cui, L.; Fujii, H.; Tsuji, N.; Nogi, K. *Scripta* Mater. 2007, 56, p. 637-640.

SUMMARY

Technical Problem

Laser welding is fusion welding, and therefore causes embrittlement due to impurity segregation during fusion and solidification, and due to hydrogen entry. As a result, deterioration of mechanical properties of the joined portion (welded portion) may occur. In particular, electrical steel sheet chemical composition contains a large amount of Si, and therefore mechanical properties of coil joints tend to deteriorate significantly. Therefore, when laser welding as in PTL 1 to 3 is applied as coil joining of electrical steel strips, there is a problem in that a fracture may occur at a coil joint, resulting in a drop in productivity due to line stoppage and the like on a production line such as a continuous cold rolling line.

It would be helpful to solve the above problem and to provide an electrical steel strip welded joint that is able to inhibit the occurrence of coil joint fracture on a production line caused by deterioration of mechanical properties and shape of the coil joint.

Further, it would be helpful to provide an electrical steel strip friction stir welding method to obtain the electrical steel strip welded joint. Further, it would be helpful to provide a method of producing an electrical steel strip using the electrical steel strip friction stir welding method.

Solution to Problem

The inventors conducted intensive studies to solve the technical problem outlined above. First, the inventors investigated and examined the reasons for the deterioration of mechanical properties and shape of coil joints when laser welding is applied as coil joining of electrical steel strips, and made the following discoveries.

(a) As mentioned above, electrical steel sheet chemical composition contains a large amount of Si, for example 2.0 mass % to 5.0 mass %. Si is a ferrite-stabilizing element. Therefore, when typical laser welding is applied to coil joining of electrical steel strips, ferrite crystal grains in the coil joint, which is a fusion zone, and also ferrite crystal grains in a heat-affected zone, become coarse. This greatly degrades mechanical properties of the coil joint, especially toughness and bending strength, and leads to the occurrence of coil joint fracture in the production line.

(b) Further, the technologies in PTL 1 to 3 use a filler mainly composed of Ni, an austenite-stabilizing element. Therefore, at the coil joints, mainly austenite phase is obtained. However, according to the technologies described in PTL 1 to 3, it is necessary to control balance between Ni equivalent and Cr equivalent in the fusion zone (weld metal) properly at all times by eliminating variation of the butt gap between the preceding steel strip and the trailing steel strip and by extremely strictly controlling an amount of fusion of the filler and the steel sheet at the fusion zone (weld metal). In other words, when the balance between the Ni equivalent and the Cr equivalent in the fusion zone (weld metal) is not properly controlled, a martensitic phase that is a hard and brittle microstructure forms in the coil joint. This greatly degrades mechanical properties of the coil joint, especially toughness. Further, in the heat-affected zone, mechanical properties of the coil joint deteriorate greatly due to the coarsening of ferrite crystal grains. These reasons lead to the occurrence of coil joint fracture in a production line.

(c) Further, the above-mentioned variation in the butt gap between the preceding steel strip and the trailing steel strip affects weld reinforcement height. For example, when weld reinforcement height is high and a welded portion is excessively convex, stresses will be concentrated at the weld toe portions when the weld is under load. Therefore, the above-mentioned variation in the butt gap between the preceding steel strip and the trailing steel strip is also a cause of coil joint fracture occurrence in a production line. Excess weld may be removed by grinding or other means. However, such an increase in processing leads to a significant decrease in productivity.

Based on the above discoveries, the inventors further conducted various investigations and arrived at the idea of applying friction stir welding as electrical steel strip coil joining.

Here, friction stir welding is solid phase joining that utilizes frictional heat between a rotating tool and material to be joined and plastic flow of the material to be joined. In other words, a rotating tool is used to friction stir an unjoined portion (region to be joined) of the material to be joined. When the unjoined portion of the material to be joined is heated by frictional heat, plastic flow begins. An interface between a plastic flow zone and a base metal portion is then greatly elongated. As a result, clean interfaces without oxides come into contact with each other, and a joined portion is formed without fusion of the material to be joined. Here, a joined portion is a region that undergoes hot working due to frictional heat between the rotating tool and the material to be joined and plastic flow to form a recrystallized microstructure, and is sometimes referred to as a stir zone. Further, a region adjacent to the joined portion is affected by hot working due to frictional heat and plastic flow, but the region is formed having a microstructure without recrystallization, due to insufficient temperature and working. This region is called a thermo-mechanically affected zone. Further, a region also exists in the material to be joined that is not affected by hot working due to frictional heat and plastic flow. This region is called a base metal portion. Technology related to friction stir welding is described in, for example, PTL 4 to 7 and NPL 1, but none of these are applicable to electrical steel strip coil joining.

Based on the above ideas, the inventors conducted further studies and came to the following discoveries.

(d) To advantageously solve the problems (a) to (c), friction stir welding is applied as electrical steel strip coil joining. In addition, making the steel microstructures of the joined portion and thermo-mechanically affected zone be mainly ferrite, refining the steel microstructures of the joined portion and thermo-mechanically affected zone, and reducing a hardness difference between the joined portion and the base metal portion are important. Specifically, simultaneously satisfying the relationships of the following Expressions (1) to (4) is important.

As a result, even when electrical steel strips are used as the material to be joined, mechanical properties of the coil joint are improved without causing deterioration of the shape of the coil joint, and the occurrence of coil joint fractures in a production line is effectively inhibited.

$$Dsz \leq 200 \ \mu m \tag{1}$$

$$Dhaz1 \leq Dbm1 \tag{2}$$

$$Dhaz2 \leq Dbm2 \tag{3}$$

$$0.9 \times (Hbm1 + Hbm2)/2 \leq Hsz \leq 1.2 \times (Hbm1 + Hbm2)/2 \tag{4}$$

Here,

Dsz is an average value (μm) of ferrite grain size of the joined portion,

Dhaz1 is an average value (μm) of ferrite grain size of the thermo-mechanically affected zone on a first electrical steel strip side, Dhaz2 is an average value (μm) of ferrite grain size of the thermo-mechanically affected zone on a second electrical steel strip side, Dbm1 is an average value (μm) of ferrite grain size of the base metal portion of a first electrical steel strip, Dbm2 is an average value (μm) of ferrite grain size of the base metal portion of a second electrical steel strip, Hsz is an average value of hardness of the joined portion, Hbm1 is an average value of hardness of the base metal portion of the first electrical steel strip, and Hbm2 is an average value of hardness of the base metal portion of the second electrical steel strip.

(e) Further, in addition to simultaneously satisfying the relationships of the above Expressions (1) to (4), satisfying the relationships of the following Expressions (5) and (6) is preferable. As a result, even when electrical steel strips are used as the material to be joined, mechanical properties of the coil joint are improved without causing deterioration of the shape of the coil joint, and the occurrence of coil joint fractures in a production line is more effectively inhibited.

$$0.8 \times TbmL \leq TszL \tag{5}$$

$$TszH \leq 1.3 \times TbmH \tag{6}$$

Here,

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, and TbmH is the thickness (mm) of the thicker of the first electrical steel strip and the second electrical steel strip.

When the thicknesses of the first electrical steel strip and the second electrical steel strip are the same, TbmL=TbmH.

(f) Further, from the viewpoint of increasing joining speed while inhibiting defect occurrence, applying a so-called double-sided friction stir welding as the friction stir welding method is preferable.

(g) In addition, when thicknesses of the electrical steel strips to be joined differ from each other, it is preferable that:
the double-sided friction stir welding is applied as a joining method, and
the joining is performed using rotating tools that have leading ends that each include a center portion and an outer circumferential portion disposed adjacent to the periphery of the center portion, and the outer circumferential portions each have a tapered shape.

Accordingly, it becomes possible to increase the joining speed even when the thicknesses of the electrical steel strips to be joined differ from each other, while inhibiting the occurrence of coil joint fracture in a production line caused by deterioration of mechanical properties and shape of the coil joint.

(h) Further, for the diameter $D_1$ (mm) of the center portions of the rotating tools, it is preferable that the relationship of the following Expression (10) is satisfied, and that joining conditions are appropriately controlled, in particular that rotation speed RS (r/min) of the rotating tools, the diameter $D_1$ (mm) of the center portions of the rotating tools, and the joining speed JS (mm/min), expressed as $RS \times D_1^3 / JS$, satisfy the relationship of the following Expression (11).

Accordingly, even when the thicknesses of the electrical steel strips to be joined differ from each other, it becomes possible to more advantageously increase the joining speed while inhibiting the occurrence of coil joint fracture in a production line caused by deterioration of mechanical properties and shape of the coil joint.

$$4 \times TJ \leq D_1 \leq 10 \times TJ \quad (10)$$

$$200 \times TJ \leq RS \times D_1^3 / JS \leq 200 \times TJ \quad (11)$$

Here, TJ is defined such that,
when the unjoined portion is a butted portion, TJ is an average value (mm) of the thickness of the first electrical steel strip and the thickness of the second electrical steel strip, and
when the unjoined portion is an overlapped portion, TJ is the thickness (mm) of the overlapped portion.

The present disclosure is based on these discoveries and further studies. Primary features of the present disclosure are as follows.

1. An electrical steel strip welded joint, joining a first electrical steel strip and a second electrical steel strip,
the electrical steel strip welded joint comprising a joined portion and a thermo-mechanically affected zone adjacent to the joined portion, wherein
the steel microstructures of the joined portion and the thermo-mechanically affected zone are mainly ferrite phase, and
the following Expressions (1) to (4) are satisfied, $$Dsz \leq 200 \ \mu m \quad (1)$$

$$Dhaz1 \leq Dbm1 \quad (2)$$

$$Dhaz2 \leq Dbm2 \quad (3)$$

$$0.9 \times (Hbm1 + Hbm2)/2 \leq Hsz \leq 1.2 \times (Hbm1 + Hbm2)/2 \quad (4)$$

wherein
Dsz is an average value (µm) of ferrite grain size of the joined portion,
Dhaz1 is an average value (µm) of ferrite grain size of the thermo-mechanically affected zone on a first electrical steel strip side,
Dhaz2 is an average value (µm) of ferrite grain size of the thermo-mechanically affected zone on a second electrical steel strip side,
Dbm1 is an average value (µm) of ferrite grain size of a base metal portion of the first electrical steel strip,
Dbm2 is an average value (µm) of ferrite grain size of a base metal portion of the second electrical steel strip,
Hsz is an average value of hardness of the joined portion,
Hbm1 is an average value of hardness of the base metal portion of the first electrical steel strip, and
Hbm2 is an average value of hardness of the base metal portion of the second electrical steel strip.

2. The electrical steel strip welded joint according to aspect 1, satisfying the relationships of the following Expressions (5) and (6), $$0.8 \times TbmL \leq TszL \quad (5)$$

$$TszH \leq 1.3 \times TbmH \quad (6)$$

wherein
TszL is the minimum value (mm) of the thickness of the joined portion,
TszH is the maximum value (mm) of the thickness of the joined portion,
TbmL is the thickness (mm) of the thinner of the first electrical steel strip and the second electrical steel strip,
TbmH is the thickness (mm) of the thicker of the first electrical steel strip and the second electrical steel strip, and
when the thicknesses of the first electrical steel strip and the second electrical steel strip are the same, TbmL=TbmH.

3. The electrical steel strip welded joint according to aspect 1 or 2, wherein the thickness of the first electrical steel strip is different from the thickness of the second electrical steel strip.

4. An electrical steel strip friction stir welding method for joining a first electrical steel strip and a second electrical steel strip following the first electrical steel strip, comprising:
pressing a rotating tool into an unjoined portion that is a butted portion or an overlapped portion of an end of the first electrical steel strip and an end of the second electrical steel strip while rotating the rotating tool; and
joining the first electrical steel strip and the second electrical steel strip by moving the rotating tool in a joining direction, wherein
the joining is performed under conditions that the steel microstructures of the joined portion and the thermo-mechanically affected zone formed by the joining of the first electrical steel strip and the second electrical steel strip become mainly ferrite phase and the relationships of the following Expressions (1) to (4) are satisfied, $$Dsz \leq 200 \ \mu m \quad (1)$$
$$Dhaz1 \leq Dbm1 \quad (2)$$
$$Dhaz2 \leq Dbm2 \quad (3)$$
$$0.9 \times (Hbm1 + Hbm2)/2 \leq Hsz \leq 1.2 \times (Hbm1 + Hbm2)/2 \quad (4)$$

wherein
Dsz is an average value (μm) of ferrite grain size of the joined portion,
Dhaz1 is an average value (μm) of ferrite grain size of the thermo-mechanically affected zone on a first electrical steel strip side,
Dhaz2 is an average value (μm) of ferrite grain size of the thermo-mechanically affected zone on a second electrical steel strip side,
Dbm1 is an average value (μm) of ferrite grain size of a base metal portion of the first electrical steel strip,
Dbm2 is an average value (μm) of ferrite grain size of a base metal portion of the second electrical steel strip,
Hsz is an average value of hardness of the joined portion,
Hbm1 is an average value of hardness of the base metal portion of the first electrical steel strip, and
Hbm2 is an average value of hardness of the base metal portion of the second electrical steel strip.

5. The electrical steel strip friction stir welding method according to aspect 4, wherein the joining is performed under conditions satisfying the relationships of the following Expressions (5) and (6), $$0.8 \times TbmL \leq TszL \quad (5)$$
$$TszH \leq 1.3 \times TbmH \quad (6)$$

wherein
TszL is the minimum value (mm) of the thickness of the joined portion,
TszH is the maximum value (mm) of the thickness of the joined portion,
TbmL is the thickness (mm) of the thinner of the first electrical steel strip and the second electrical steel strip,
TbmH is the thickness (mm) of the thicker of the first electrical steel strip and the second electrical steel strip, and
when the thicknesses of the first electrical steel strip and the second electrical steel strip are the same, TbmL=TbmH.

6. The electrical steel strip friction stir welding method according to aspect 4 or 5, wherein
the rotating tool is a pair of rotating tools facing each other, and the rotating tools are pressed from both sides of the unjoined portion while rotating in opposite directions to each other,
the thickness of the first electrical steel strip is different from the thickness of the second electrical steel strip,
the leading ends of the rotating tools each include a center portion and an outer circumferential portion disposed adjacent to a periphery of the center portion, and
the outer circumferential portion has a tapered shape.

7. The electrical steel strip friction stir welding method according to aspect 6, wherein a taper angle α of the outer circumferential portion is from 2° to 20°.

8. The electrical steel strip friction stir welding method according to aspect 6 or 7, wherein a radial position of the boundary between the center portion and the outer circumferential portion is in a range from 0.15×D to 0.35×D, wherein
the radial position is the distance from the axis of rotation along the radial direction of the leading end of the rotating tool, and D is the diameter of the leading end of the rotating tool.

9. The electrical steel strip friction stir welding method according to any one of aspects 6 to 8, wherein the surface of the outer circumferential portion has a spiral-shaped stepped portion spiraling in the rotation direction of the rotating tool.

10. The electrical steel strip friction stir welding method according to any one of aspects 6 to 9, wherein the surface of the outer circumferential portion has a spiral-shaped stepped portion spiraling opposite the rotation direction of the rotating tool.

11. The electrical steel strip friction stir welding method according to any one of aspects 6 to 10, wherein the center portion has a flat, convex curved, or concave curved surface.

12. The electrical steel strip friction stir welding method according to any one of aspects 6 to 11, wherein the surface of the center portion has a spiral-shaped stepped portion spiraling opposite the rotation direction of the rotating tool.

13. The electrical steel strip friction stir welding method according to any one of aspects 6 to 12, wherein the diameter $D_1$ (mm) of the center portion of the rotating tool satisfies the relationship of the following Expression (10), and a rotation speed RS (r/min) of the rotating tool, the diameter $D_1$ (mm) of the center portion of the rotating tool, and a joining speed JS (mm/min), expressed as $RS \times D_1^3/JS$, satisfy the relationship of the following Expression (11), $$4 \times TJ \leq D_1 \leq 10 \times TJ \quad (10)$$
$$200 \times TJ \leq RS \times D_1^3 / JS \leq 2000 \times TJ \quad (11)$$

wherein TJ is defined such that,
when the unjoined portion is the butted portion, TJ is an average value (mm) of the thickness of the first electrical steel strip and the thickness of the second electrical steel strip, and
when the unjoined portion is the overlapped portion, TJ is the thickness (mm) of the overlapped portion.

14. The electrical steel strip friction stir welding method according to any one of aspects 6 to 13, wherein
at the butted portion of the end of the first electrical steel strip and the end of the second electrical steel strip, there is a step on only one side,
the advancing side of the rotating tool disposed on the side with the step is on the side of the electrical steel strip that has the smaller thickness of the first electrical steel strip and the second electrical steel strip, and
the retreating side of the rotating tool disposed on the side with the step is on the side of the electrical steel strip that has the greater thickness of the first electrical steel strip and the second electrical steel strip.

15. A method of producing an electrical steel strip, the method comprising:

joining a first electrical steel strip and a second electrical steel strip by the electrical steel strip friction stir welding method according to any one of aspects 4 to 14 to obtain a joined steel strip; and cold rolling the joined steel strip to obtain a cold-rolled steel strip.

Advantageous Effect

According to the present disclosure, even when electrical steel strips are used as the material to be joined, no deterioration of mechanical properties or shape of the coil joint occurs, and the occurrence of coil joint fractures in a production line is effectively inhibited. Accordingly, productivity of electrical steel sheets is further improved, and industrial applicability is very high. Even when electrical steel strips of different thicknesses are used as the material to be joined, the joining speed may be increased while inhibiting defect occurrence, which is very advantageous in terms of production efficiency.

BRIEF DESCRIPTION OF THE DRAWINGS

In the accompanying drawings:

FIG. 2B is a view from A-A in FIG. 2A;

FIG. 3B is a view from A-A in FIG. 3A;

DETAILED DESCRIPTION

The following describes embodiments of the present disclosure.

[1] Electrical Steel Strip Welded Joint

Figure 1A:
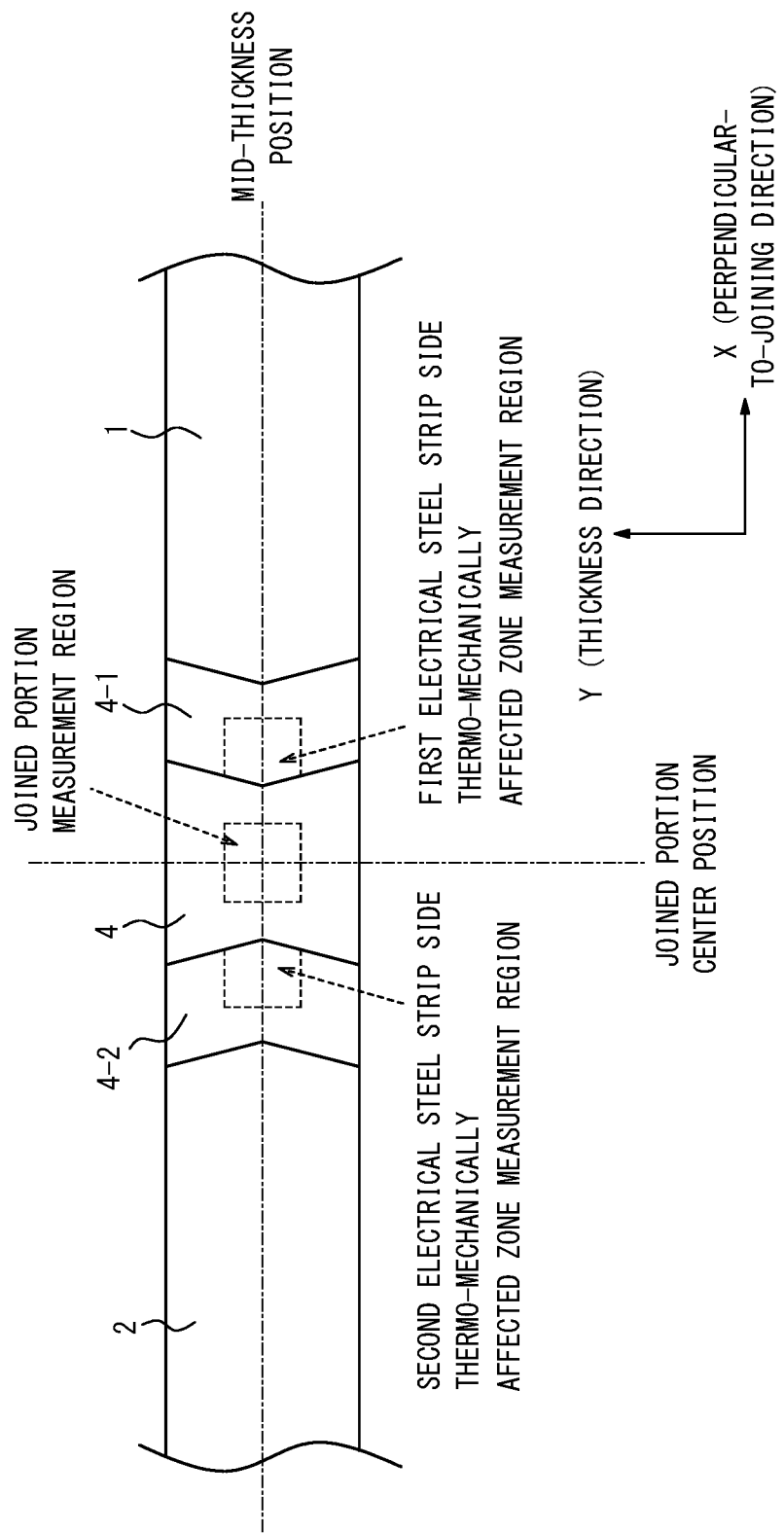
FIG. 1A is a schematic diagram illustrating an example of an electrical steel strip welded joint according to an embodiment of the present disclosure.
Figure 1B:
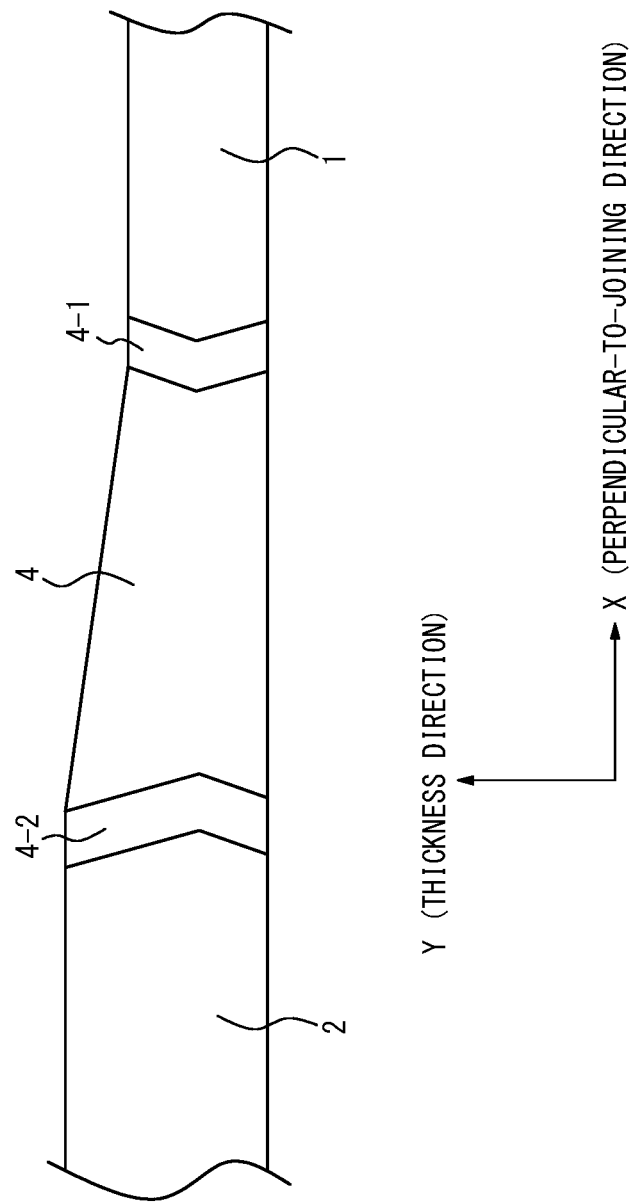
FIG. 1B is a schematic diagram illustrating an example of an electrical steel strip welded joint according to an embodiment of the present disclosure.

First, an electrical steel strip welded joint according to an embodiment of the present disclosure is described, with reference to FIG. 1A. FIG. 1A is a cross section view in the thickness direction of the electrical steel strip welded joint, where the thickness t1 of a first electrical steel strip=the thickness t2 of a second electrical steel strip. In the drawing, reference sign 1 indicates the first electrical steel strip (material to be joined), 2 indicates the second electrical steel strip (material to be joined), 4 indicates a joined portion, 4-1 indicates a thermo-mechanically affected zone (first electrical steel strip side), and 4-2 indicates the thermo-mechanically affected zone (second electrical steel strip side). Further, in the drawing, the vertical direction is the thickness direction. The horizontal direction is perpendicular to the joining direction and perpendicular to the thickness direction (hereinafter also referred to as the perpendicular-to-joining direction). The direction perpendicular to the plane of the paper is the joining direction. That is, the plane illustrated in FIG. 1A (the thickness direction cross section) includes the perpendicular-to-joining direction and the thickness direction. FIG. 1B is a cross section view in the thickness direction of the electrical steel strip welded joint, where the thickness t1 of the first electrical steel strip is different from the thickness t2 of the second electrical steel strip. FIG. 1B illustrates an example where the thickness t1 of the first electrical steel strip<the thickness t2 of the second electrical steel strip, but the relationship between t1 and t2 may be t1<t2 and may be t1>t2. Further, as illustrated in FIG. 1A, t1=t2 is also possible.

Electrical steel strip here refers to an intermediate product used as material for producing an electrical steel sheet, in particular an intermediate product at a stage from the end of hot rolling to before heat treatment for primary recrystallization (that is, decarburization annealing or primary recrystallization annealing). An electrical steel strip produced by the method of producing an electrical steel strip according to an embodiment of the present disclosure is obtained by cold rolling after joining the first electrical steel strip and the second electrical steel strip, as described below. Hereinafter, an electrical steel strip obtained by joining the first electrical steel strip and the second electrical steel strip may also be referred to as a joined steel strip, and an electrical steel strip obtained by cold rolling the joined steel strip may also be referred to as a cold-rolled steel strip.

The electrical steel strip welded joint according to an embodiment of the present disclosure is:

an electrical steel strip welded joint, joining the first electrical steel strip and the second electrical steel strip, the electrical steel strip welded joint comprising a joined portion and a thermo-mechanically affected zone adjacent to the joined portion, wherein the steel microstructures of the joined portion and the thermo-mechanically affected zone are mainly ferrite phase, respectively, and the following Expressions (1) to (4) are satisfied.

$$Dsz \leq 200 \ \mu m \tag{1}$$

$$Dhaz1 \leq Dbm1 \tag{2}$$

$$Dhaz2 \leq Dbm2 \tag{3}$$

$$0.9 \times +(Hbm1+Hbm2)/2 \leq Hsz \leq 1.2 \times +(Hbm1+Hbm2)/2 \tag{4}$$

Here,

Dsz is the average value (μm) of ferrite grain size of the joined portion,

Dhaz1 is the average value (μm) of ferrite grain size of the thermo-mechanically affected zone on the first electrical steel strip side, Dhaz2 is the average value (μm) of ferrite grain size of the thermo-mechanically affected zone on the second electrical steel strip side, Dbm1 is the average value (μm) of ferrite grain size of the base metal portion of the first electrical steel strip, Dbm2 is the average value (μm) of ferrite grain size of the base metal portion of the second electrical steel strip, Hsz is the average value of hardness of the joined portion, Hbm1 is the average value of hardness of the base metal portion of the first electrical steel strip, and Hbm2 is the average value of hardness of the base metal portion of the second electrical steel strip.

[Material to be Joined (First Electrical Steel Strip and Second Electrical Steel Strip)]

The first electrical steel strip and the second electrical steel strip are electrical steel strips that are the material to be joined. The chemical compositions of the first electrical steel strip and the second electrical steel strip are not particularly limited as long as the chemical compositions are typical of electrical steel strips (electrical steel sheets) at a cold rolling stage.

As a chemical composition of such an electrical steel strip, an example is a chemical composition containing Si in a range of 2.0 mass % to 5.0 mass %. Further, the following chemical composition is an example: C: 0.005 mass % or less, Si: 2.0 mass % to 5.0 mass %, Al: 3.0 mass % or less, Mn: 2.00 mass % or less, P: 0.2 mass % or less, S: 0.01 mass % or less, and N: 0.01 mass % or less, with the balance being Fe and inevitable impurity. The above chemical composition may contain at least one selected from the group consisting of, in mass %: Sn: 0.2% or less, Sb: 0.2% or less, Ca: 0.01% or less, REM: 0.05% or less, and Mg: 0.01% or less. Further, the above chemical compositions may contain at least one element selected from the group consisting of, in mass %: Cr: 1% or less, Ni: 1% or less, and Cu: 1% or less. Elements other than Si and Fe may each be 0%.

Further, the chemical compositions of the first electrical steel strip and the second electrical steel strip may be the same or different.

The thickness t1 of the first electrical steel strip and the thickness t2 of the second electrical steel strip are not particularly limited. t1 and t2 are respectively preferably 5 mm or less. t1 and t2 are respectively more preferably 1.2 mm to 3.2 mm. As mentioned above, t1 and t2 may be the same or different. A thickness ratio of the first electrical steel strip and the second electrical steel strip (thickness of the larger electrical steel strip/thickness of the smaller electrical steel strip) is preferably 1.6 or less.

Further, in the material to be joined, that is, the first electrical steel strip and the second electrical steel strip, a region not affected by hot working due to frictional heat and plastic flow is called the base metal portion.

Further, the base metal portion, as well as the joined portion and the thermo-mechanically affected zone described below, are defined as follows.

The electrical steel strip welded joint is cut in the thickness (vertical) direction so that the plane illustrated in FIG. 1A (that is, the plane containing the perpendicular-to-joining direction and the thickness direction) is the cross section. The cross section is then polished and etched with a saturated picric acid solution, nital (a solution of nitrate and ethanol) or aqua regia (a solution of concentrated hydrochloric acid and concentrated nitrate mixed in a 3:1 volume ratio). The cross section is then observed under an optical microscope to determine the degree of etching and the like, and to delineate the base metal portion, the joined portion, and the thermo-mechanically affected zone.

[Joined Portion]

The joined portion is the region that undergoes hot working due to frictional heat and plastic flow between the rotating tool and the material to be joined, resulting in a recrystallized microstructure.

The joined portion is composed of a mainly ferrite phase steel microstructure, specifically, with ferrite phase having an area ratio of 95% or more. The area ratio of the ferrite phase may be 100%. The area ratio of the residual microstructure other than the ferrite phase is 5% or less. As the residual microstructure other than the ferrite phase, examples include secondary phases such as martensite, sulfides, nitrides, carbides, and the like. The area ratio of the residual microstructure may be 0%.

The area ratio of the ferrite phase is measured as follows.

A test piece is cut from the electrical steel strip welded joint so that a joined portion measurement region, described below, is included in an observation plane. The observation plane is the plane illustrated in FIG. 1A (that is, the plane that includes the perpendicular-to-joining direction and the thickness direction). The observation plane of the test piece is then polished and etched with 3 vol % nital, saturated picric acid solution or aqua regia to reveal the microstructure. Then, in the joined portion measurement region, described below, a total of ten fields of view are captured with an optical microscope at a magnification of 500×. From the obtained microstructure images, the area of ferrite phase is calculated for the ten fields of view using Adobe Photoshop, sold by Adobe Systems Inc. The area of ferrite phase calculated for each field of view is then divided by the area of the field of view and multiplied by 100. The arithmetic mean of those values is then used as the area ratio of the ferrite phase.

Further, refinement of the steel microstructure of the joined portion is important. Specifically, reducing grain size of ferrite crystal grains of the steel microstructure of the joined portion (hereinafter also referred to as ferrite grain size) to satisfy the relationship of the following Expression (1) is important. As a result, even when electrical steel strips are used as the material to be joined, mechanical properties of the coil joint are improved without causing deterioration of the shape of the coil joint, and the occurrence of coil joint fractures in a production line is effectively inhibited.

$$Dsz \leq 200 \ \mu m \tag{1}$$

Here,

Dsz is the average value (μm) of ferrite grain size of the joined portion.

Here, Dsz is measured in accordance with Japanese Industrial Standard JIS G 0551. Specifically, measurement is made as follows.

The electrical steel strip welded joint is cut in the thickness (vertical) direction so that the plane illustrated in FIG. 1A (that is, the plane containing the perpendicular-to-joining direction and the thickness direction) is the cross section. In the cross section, the X axis is the perpendicular-to-joining direction and the Y axis is the thickness direction. The origin of the X axis and the Y axis is the center position of the joined portion in the perpendicular-to-joining direction and the mid-thickness position of the material to be joined in the thickness (vertical) direction. The center position of the joined portion in the perpendicular-to-joining direction is, for example, the center position of the butt gap in the case of a butt joint or the center position of the overlapped portion in the case of a lap joint. The mid-thickness position of the material to be joined in the thickness (vertical) direction is, for example, the mid-thickness position of the smaller of the first electrical steel strip and the second electrical steel strip in the case of a butt joint, or the mid-thickness position of the overlapped portion in the case of a lap joint. A region defined as X=−0.2×t to +0.2×t and Y=−0.2×t to +0.2×t is the measurement region. Here, t is an average value (mm) of thickness of the first electrical steel strip and thickness of the second electrical steel strip. However, when the measurement region includes a region that is not the joined portion, such as the thermo-mechanically affected zone or the base metal portion, such a region is excluded from the measurement region. For the X axis and the Y axis, + and − may be set arbitrarily.

Then, at any position in the measurement region, ferrite grain size of the joined portion is measured a total of five times by the cutting method (evaluated by the number of crystal grains captured per 1 mm of a test line or the number P of intersections) in accordance with JIS G 0551 "Steels-Micrographic determination of the apparent grain size", and the average value of these measurements is Dsz. The measurement region of ferrite grain size of the joined portion is hereinafter also referred to simply as the joined portion measurement region.

Further, reducing a hardness difference between the joined portion and the base metal portion, specifically to satisfy the relationship of the following Expression (4), is important. As a result, even when electrical steel strips are used as the material to be joined, mechanical properties of the coil joint are improved without causing deterioration of the shape of the coil joint, and the occurrence of coil joint fractures in a production line is effectively inhibited.

$$0.9 \times +(Hbm1 + Hbm2)/2 \le Hsz \le 1.2 \times +(Hbm1 + Hbm2)/2 \quad (4)$$

Here,

Hsz is the average value of hardness of the joined portion,

Hbm1 is the average value of hardness of the base metal portion of the first electrical steel strip, and Hbm2 is the average value of hardness of the base metal portion of the second electrical steel strip Here, Hsz, Hbm1, and Hbm2 are measured in accordance with JIS Z 2244. Specifically, each is measured as follows.

Vickers hardness (HV) is measured at any five locations in the joined portion measurement region on the cross section under a condition of test force: 4.9 N. The average of these values is then taken as Hsz.

Further, on the cross section, Vickers hardness (HV) is measured at any five locations in a region ±0.2×t1 (level in the thickness (vertical) direction) from the mid-thickness position of the base metal portion of the first electrical steel strip and any five locations in a region ±0.2×t2 (level in the thickness (vertical) direction) from the mid-thickness position of the base metal portion of the second electrical steel strip, under the test force: 4.9 N. The position along the perpendicular-to-joining (horizontal) direction may be selected arbitrarily, as long as the position is in the base metal portion. The average values of Vickers hardness (HV) measured on the base metal portion of the first electrical steel strip and the base metal portion of the second electrical steel strip are Hbm1 and Hbm2, respectively. Here, t1 and t2 are the thicknesses of the first electrical steel strip and the second electrical steel strip, respectively.

Further, the thickness of the joined portion is not particularly limited. Appropriate control of the relationship between the thicknesses of the first electrical steel strip and the second electrical steel strip, specifically satisfying the relationships of the following Expressions (5) and (6), is preferred. As a result, even when electrical steel strips are used as the material to be joined, mechanical properties of the coil joint are further improved without causing deterioration of the shape of the coil joint, and the occurrence of coil joint fractures in a production line may be more effectively inhibited.

$$0.8 \times TbmL \le TszL \quad (5)$$

$$TszH \le 1.3 \times TbmH \quad (6)$$

Here,

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, and TbmH is the thickness (mm) of the thicker of the first electrical steel strip and the second electrical steel strip.

When the thicknesses of the first electrical steel strip and the second electrical steel strip are the same, TbmL=TbmH.

TszL and TszH may be measured as follows, for example. The electrical steel strip welded joint is cut in the thickness (vertical) direction so that the plane illustrated in FIG. 1A (that is, the plane containing the perpendicular-to-joining direction and the thickness direction) is the cross section. Then, TszL and TszH are measured at the cross section using a caliper or the like.

[Thermo-Mechanically Affected Zone]

The thermo-mechanically affected zone is adjacent to the joined portion and is a region affected by hot working due to frictional heat and plastic flow, but the temperature and working are insufficient to reach a recrystallized microstructure. Further, the thermo-mechanically affected zone is formed on both sides of the first electrical steel strip and the second electrical steel strip adjacent to the joined portion.

The thermo-mechanically affected zone, like the joined portion, is a mainly ferrite phase steel microstructure, specifically, a ferrite phase having an area ratio of 95% or more. The area ratio of the ferrite phase may be 100%. The area ratio of the residual microstructure other than the ferrite phase is 5% or less. As the residual microstructure other than the ferrite phase, examples include secondary phases such as martensite, sulfides, nitrides, carbides, and the like. The area ratio of the residual microstructure may be 0%. The area ratio of the ferrite phase may be measured by the same method as described above.

Further, refinement of the steel microstructure of the thermo-mechanically affected zone is important. Specifically, making ferrite grain size in the thermo-mechanically affected zone equal to or less than the ferrite grain size in the base metal portion, that is, satisfying the relationships of the following Expressions (2) and (3), is important.

$$Dhaz1 \leq Dbm1 \quad (2)$$

$$Dhaz2 \leq Dbm2 \quad (3)$$

Here,

Dhaz1 is the average value (μm) of ferrite grain size of the thermo-mechanically affected zone on the first electrical steel strip side, Dhaz2 is the average value (μm) of ferrite grain size of the thermo-mechanically affected zone on the second electrical steel strip side, Dbm1 is the average value (μm) of ferrite grain size of the base metal portion of the first electrical steel strip, and Dbm2 is the average value (μm) of ferrite grain size of the base metal portion of the second electrical steel strip.

Here, Dhaz1, Dhaz2, Dbm1, and Dbm2 are measured in the same manner as Dsz, the average value of ferrite grain size of the joined portion, according to JIS G 0551.

Further, the measurement region of the ferrite grain size of the thermo-mechanically affected zone on the first electrical steel strip side (hereinafter also referred to as the first electrical steel strip side thermo-mechanically affected zone measurement region) is set as follows. The electrical steel strip welded joint is cut in the thickness (vertical) direction so that the plane illustrated in FIG. 1A (that is, the plane containing the perpendicular-to-joining direction and the thickness direction) is the cross section. In the cross section, the X axis is the perpendicular-to-joining direction and the Y axis is the thickness direction. A boundary position between the joined portion and the thermo-mechanically affected zone on the first electrical steel strip side at the mid-thickness position (level) of the first electrical steel strip is the origin of the X axis and the Y axis. For the X axis, the first electrical steel strip side is + and the joined portion side is −, and the measurement region is a region defined as X=0 to +0.4×t1 and Y=−0.2×t1 to +0.2×t1. Here, t1 is the thickness of the first electrical steel strip. For the Y axis, + and − may be set arbitrarily. However, when the measurement region includes a region that is not the thermo-mechanically affected zone on the first electrical steel strip side, such as the joined portion or the base metal portion, such a region is excluded from the measurement region.

As mentioned above, the joined portion is the region that undergoes hot working due to frictional heat and plastic flow between the rotating tool and the material to be joined, resulting in a recrystallized microstructure. The thermo-mechanically affected zone is a region adjacent to the joined portion and is affected by hot working due to frictional heat and plastic flow, but the temperature and working are insufficient to reach a recrystallized microstructure. The base metal is the region unaffected by hot working due to frictional heat and plastic flow.

Similarly, the measurement region of the ferrite grain size of the thermo-mechanically affected zone on the second electrical steel strip side (hereinafter also referred to as the second electrical steel strip side thermo-mechanically affected zone measurement region) is set as follows. The electrical steel strip welded joint is cut in the thickness (vertical) direction so that the plane illustrated in FIG. 1A (that is, the plane containing the perpendicular-to-joining direction and the thickness direction) is the cross section. In the cross section, the X axis is the perpendicular-to-joining direction and the Y axis is the thickness direction. A boundary position between the joined portion and the thermo-mechanically affected zone on the second electrical steel strip side at the mid-thickness position (level) of the second electrical steel strip is the origin of the X axis and the Y axis. For the X axis, the second electrical steel strip side is + and the joined portion side is −, and the measurement region is a region defined as X=0 to +0.4×t2 and Y=−0.2×t2 to +0.2×t2. Here, t2 is the thickness of the second electrical steel strip. For the Y axis, + and − may be set arbitrarily. However, when the measurement region includes a region that is not the thermo-mechanically affected zone on the second electrical steel strip side, such as the joined portion or the base metal portion, such a region is excluded from the measurement region.

Further, the measurement regions of ferrite grain size of the base metal portions of the first electrical steel strip and the second electrical steel strip (hereinafter also referred to as the first electrical steel strip and second electrical steel strip base metal portion measurement regions) may be, on the cross section, a region of +0.2×t1 from the mid-thickness position of the base metal portion of the first electrical steel strip (level in the thickness (vertical) direction) and a region of +0.2×t2 from the mid-thickness position of the base metal portion of the second electrical steel strip (level in the thickness (vertical) direction), respectively. The position along the perpendicular-to-joining (horizontal) direction may be selected arbitrarily, as long as the position is in the base metal portion. Here, t1 and t2 are the thicknesses of the first electrical steel strip and the second electrical steel strip, respectively.

Examples of joint types include butt joints and lap joints.

[2] Electrical Steel Strip Friction Stir Welding Method

The following describes an electrical steel strip friction stir welding method according to an embodiment of the present disclosure.

As described above, in the electrical steel strip friction stir welding method according to an embodiment of the present disclosure, by applying friction stir welding as coil joining of electrical steel strips, making the steel microstructures of the joined portion and the thermo-mechanically affected zone mainly ferrite, and refining the steel microstructures of the joined portion and the thermo-mechanically affected zone, a hardness difference between the joined portion and the base metal portion is reduced.

The electrical steel strip friction stir welding method according to an embodiment of the present disclosure is more specifically:

An electrical steel strip friction stir welding method for joining a first electrical steel strip and a second electrical steel strip following the first electrical steel strip, comprising:

pressing a rotating tool into an unjoined portion that is a butted portion or an overlapped portion of an end of the first electrical steel strip and an end of the second electrical steel strip while rotating the rotating tool; and joining the first electrical steel strip and the second electrical steel strip by moving the rotating tool in a joining direction, wherein the joining is performed under conditions that the steel microstructures of the joined portion and the thermo-mechanically affected zone formed by the joining of the first electrical steel strip and the second electrical steel strip respectively become mainly ferrite phase and the relationships of the above Expressions (1) to (4) are satisfied. The electrical steel strip friction stir welding method according to an embodiment of the present disclosure is suitable, for example, for implementation in a production line for an electrical steel strip, especially in a continuous cold rolling line. Here, a continuous cold rolling line is a production line where steel strips are continuously cold rolled by a cold rolling device. A continuous cold rolling line includes, for example, a steel strip conveyor and a cold rolling device. A continuous cold rolling line may optionally be accompanied by pickling equipment, an annealing furnace, coating equipment, and the like.

Butt joints and lap joints are preferred examples of joint types.

Figure 2A:
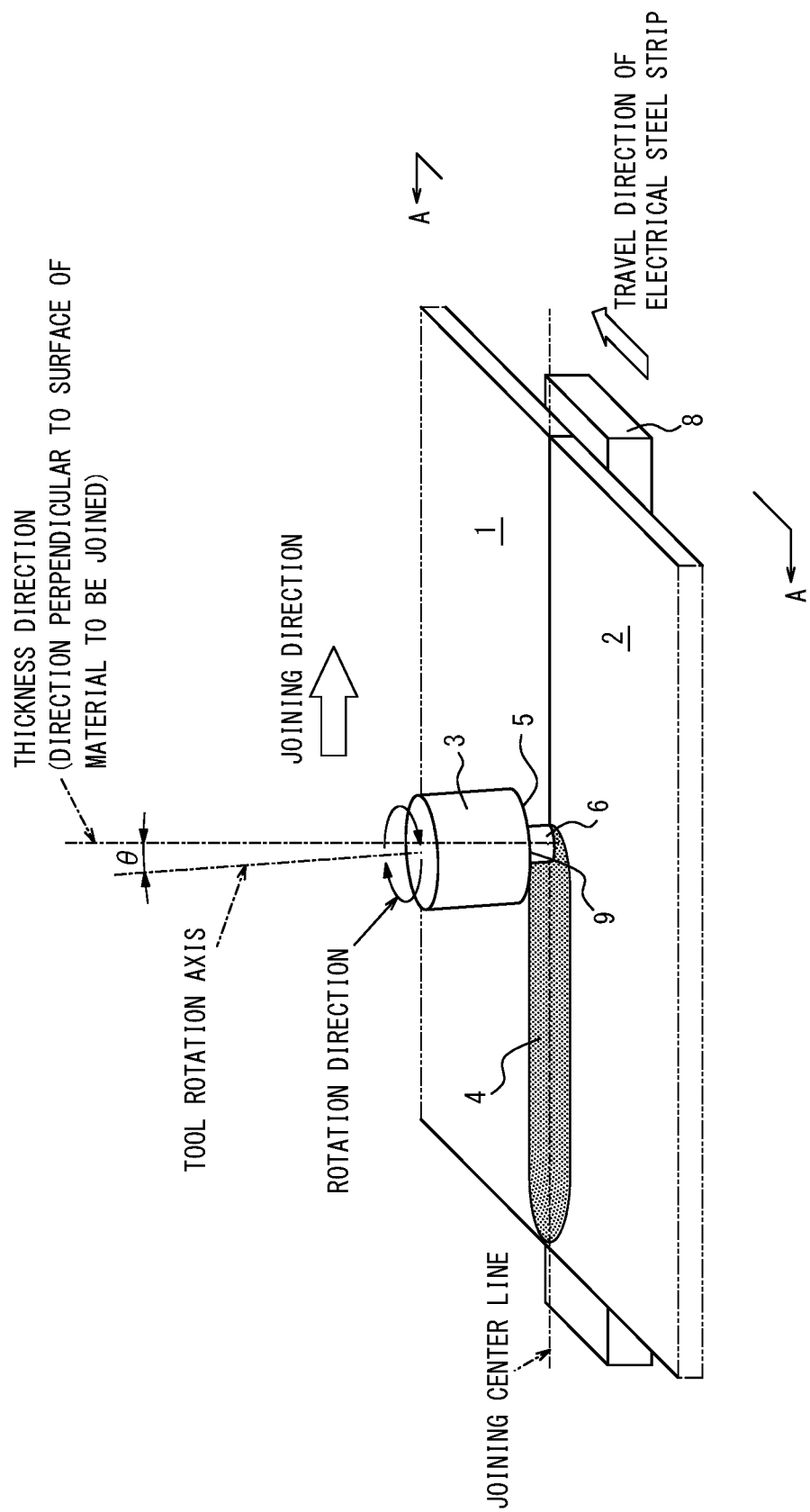
FIG. 2A is a schematic diagram for explanation of an electrical steel strip friction stir welding method according to an embodiment of the present disclosure, and is a side perspective view illustrating an example of a butt joint by a single-sided friction stir welding method.

In a butt joint, as in FIG. 2A and FIG. 2B, end faces of the first electrical steel strip and the second electrical steel strip face each other, and a rotating tool is pressed against the butted portion including the end faces (butting face) of the first electrical steel strip and the second electrical steel strip while rotating. In this state, the first electrical steel strip and the second electrical steel strip are joined by moving the rotating tool in the joining direction. FIG. 2A is a side perspective view and FIG. 2B is a view from A-A in FIG. 2A.

Figure 2C:
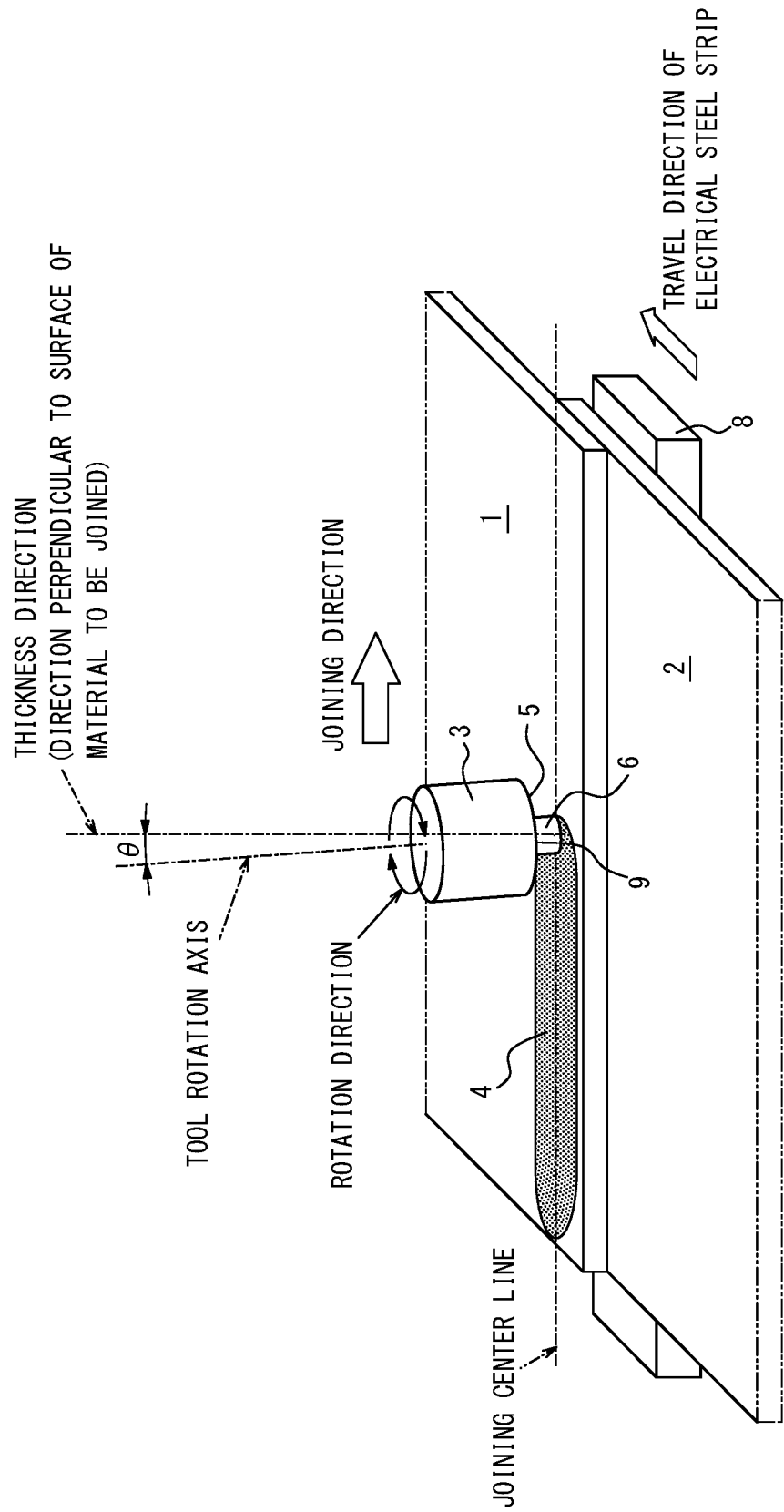
FIG. 2C is a schematic diagram for explanation of an electrical steel strip friction stir welding method according to an embodiment of the present disclosure, and is a side perspective view illustrating an example of a lap joint by a single-sided friction stir welding method.

In a lap joint, as in FIG. 2C, at least a portion of end portions of the first electrical steel strip and the second electrical steel strip are overlapped and a rotating tool is pressed against the overlapped portion while rotating. In this state, the first electrical steel strip and the second electrical steel strip are joined by moving the rotating tool in the joining direction.

In the drawings, reference sign 1 indicates the first electrical steel strip (material to be joined), 2 indicates the second electrical steel strip (material to be joined), 3 indicates the rotating tool, 4 indicates the joined portion, 5 indicates a shoulder, 6 indicates a probe (pin), 7 indicates a gripping device, 8 indicates a surface plate (backing), and 9 indicates a lead end. The gripping device is not illustrated in FIG. 2A or FIG. 2C. Further, in FIG. 2B, the vertical direction is the thickness direction, the horizontal direction is the perpendicular-to-joining direction (travel direction of electrical steel strip), and the direction perpendicular to the plane of the paper towards the reader is the joining direction.

Here, the first electrical steel strip is the preceding steel strip in the continuous cold rolling line, and the second electrical steel strip is the trailing steel strip (electrical steel strip following the first electrical steel strip) in the continuous cold rolling line.

Butt joints and lap joints differ only in the form of the unjoined portion and other device configurations are basically the same, and therefore a case of a butt joint by so-called single-sided friction stir welding is described as an example, as illustrated in FIG. 2A and FIG. 2B.

Single-sided friction stir welding uses, for example, a friction stir welding device including a rotating tool, a gripping device, and a control unit (not illustrated) that controls operation of the rotating tool. The control unit controls, for example, a tilt angle θ of the rotating tool, a position of the lead end of the rotating tool, joining speed, pressure load, rotation speed of the rotating tool, rotation torque, and the like.

In single-sided friction stir welding, the rotating tool is disposed on one side of the material to be joined, that is, the first electrical steel strip and the second electrical steel strip. The first electrical steel strip and the second electrical steel strip are disposed on the surface plate (backing) parallel to a joining center line illustrated in the drawings, and are each gripped by the gripping device. Then, the rotating tool is pressed on the unjoined portion (the region to be joined) on the joining center line, that is, the butted portion including an end (trailing end) of the first electrical steel strip and an end (leading end) of the second electrical steel strip, while rotating the rotating tool. In this state, the rotating tool is moved in the joining direction. This softens the material to be joined due to frictional heat between the rotating tool and the material to be joined, that is, the first electrical steel strip and the second electrical steel strip. The softened site is then stirred by the rotating tool to generate plastic flow to join the material to be joined, that is, the first electrical steel strip and the second electrical steel strip. In the portion where the joining is completed, the joined portion is formed. Further, the thermo-mechanically affected zone is formed adjacent to the joined portion.

Figure 3A:
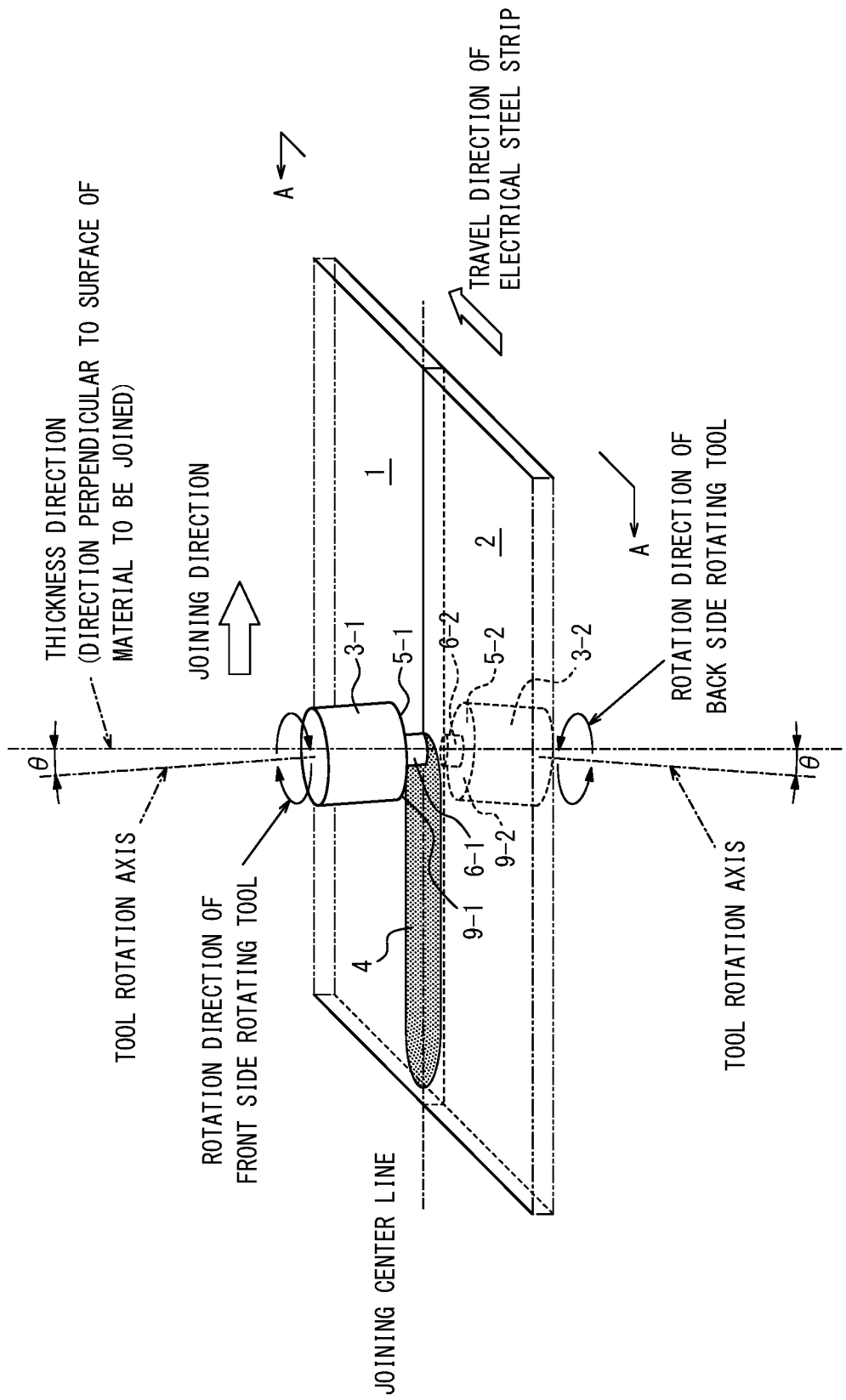
FIG. 3A is a schematic diagram for explanation of an electrical steel strip friction stir welding method according to an embodiment of the present disclosure, and is a side perspective view illustrating an example of a butt joint by a double-sided friction stir welding method.

Further, a double-sided friction stir welding method may be used instead of single-sided friction stir welding. The double-sided friction stir welding method is a friction stir welding method in which the first electrical steel strip and the second electrical steel strip are joined using a pair of rotating tools facing each other. The pair of rotating tools facing each other are pressed into the unjoined portion from both sides of the unjoined portion while rotating in opposite directions, and in this state, the rotating tools are moved in the joining direction to join the first electrical steel strip and the second electrical steel strip. FIG. 3A and FIG. 3B illustrate the case of a butt joint by double-sided friction stir welding. FIG. 3A is a side perspective view and FIG. 3B is a view from A-A in FIG. 3A. In the drawings, reference sign 1 indicates the first electrical steel strip (material to be joined), 2 indicates the second electrical steel strip (material to be joined), 3-1 indicates a rotating tool (front side rotating tool), 3-2 indicates a rotating tool (back side rotating tool), 4 indicates the joined portion, 5-1 and 5-2 indicate shoulders, 6-1 and 6-2 indicate probes (pins), 7 indicates the gripping device, and 9-1 and 9-2 indicate lead ends. The gripping device is not illustrated in FIG. 3A. Further, in FIG. 3B, the vertical direction is the thickness direction, the horizontal direction is the perpendicular-to-joining direction (travel direction of electrical steel strip), and the direction perpendicular to the plane of the paper towards the reader is the joining direction.

Double-sided friction stir welding uses, for example, a double-sided friction stir welding device including a pair of rotating tools facing each other, the gripping device, and a control unit (not illustrated) that controls operation of the rotating tools. The control unit controls, for example, the tilt angle θ of the rotating tools, the position of the lead ends of the rotating tools and the distance between the lead ends (probes) (hereinafter also referred to as the gap between probes), a gap between the shoulders of the rotating tools (that is, the distance between the shoulder of the front side rotating tool and the shoulder of the back side rotating tool in the thickness direction), joining speed, pressure load, rotation speed of the rotating tools, rotation torque, and the like.

In double-sided friction stir welding, the rotating tools of the friction stir welding device are disposed on each side of the material to be joined, that is, the first electrical steel strip and the second electrical steel strip. The rotating tool disposed on the front side of (vertically above) the first electrical steel strip and the second electrical steel strip may be referred to as the front side rotating tool, and the rotating tool located on the back side of (vertically below) the first electrical steel strip and the second electrical steel strip may be referred to as the back side rotating tool. The first electrical steel strip and the second electrical steel strip are disposed parallel to a joining center line illustrated in the drawings, and are each gripped by the gripping device. Then, the rotating tools are pressed on both sides of the unjoined portion (the region to be joined) on the joining center line, that is, both sides of the butted portion including an end (trailing end) of the first electrical steel strip and an end (leading end) of the second electrical steel strip, while rotating the rotating tools. In this state, the rotating tools are moved in the joining direction. This softens the material to be joined due to frictional heat between the rotating tools and the material to be joined, that is, the first electrical steel strip and the second electrical steel strip. The softened site is then stirred by the rotating tools to generate plastic flow to join the material to be joined, that is, the first electrical steel strip and the second electrical steel strip. In the portion where the joining is completed, the joined portion is formed. Further, the thermo-mechanically affected zone is formed adjacent to the joined portion.

In the electrical steel strip friction stir welding method according to an embodiment of the present disclosure, it is important that the joining is performed under conditions that the steel microstructures of the joined portion and the thermo-mechanically affected zone formed by the joining become mainly ferrite phase and the relationships of the above Expressions (1) to (4) are satisfied. As a result, even when electrical steel strips are used as the material to be joined, mechanical properties of the coil joint are improved without causing deterioration of the shape of the coil joint, and the occurrence of coil joint fractures in a production line is effectively inhibited.

In order to make the steel microstructures of the joined portion and the thermo-mechanically affected zone formed by the joining be mainly ferrite phase and to satisfy the relationships of the above Expressions (1) to (4), the following conditions are preferred, for example.

For Single-Sided Friction Stir Welding

The diameter D (mm) of the shoulder of the rotating tool satisfies the relationship of the following Expression (7), and
the rotation speed RS (r/min) of the rotating tool, the diameter D (mm) of the shoulder of the rotating tool, and the joining speed JS (mm/min), expressed as RS×D³/JS, satisfy the relationship of the following Expression (8).

$$4 \times TJ \le D \le 10 \times TJ \tag{7}$$

$$1000 \times TJ \le RS \times D^3 / JS \le 9000 \times TJ \tag{8}$$

Here, TJ in Expressions (7) and (8) is defined such that,
when the unjoined portion is the butted portion, TJ is an average value (mm) of the thickness of the first electrical steel strip and the thickness of the second electrical steel strip, and
when the unjoined portion is the overlapped portion, TJ is the thickness (mm) of the overlapped portion (that is, the sum of the thickness (mm) of the first electrical steel strip and the thickness (mm) of the second electrical steel strip).

In other words, the diameter D of the shoulder of the rotating tool (hereinafter also simply referred to as shoulder diameter D) is appropriately controlled according to the thickness of the unjoined portion. This effectively imparts to the material to be joined, that is, the first electrical steel strip and the second electrical steel strip, a temperature increase due to frictional heat generated between the rotating tool and the material to be joined, and a shear stress due to frictional force. Here, when the shoulder diameter D is less than 4×TJ (mm), obtaining sufficient plastic flow and satisfying the defined relationship may be difficult. On the other hand, when the shoulder diameter D exceeds 10×TJ (mm), the region where plastic flow occurs is unnecessarily expanded, and an excessive amount of heat is injected into the joined portion.

This may coarsen the recrystallized microstructure of the joined portion, making satisfying the defined relationship difficult. Therefore, to make conditions satisfy the defined relationship, the shoulder diameter D preferably satisfies the relationship of the above Expression (7). The shoulder diameter D is more preferably 5×TJ (mm) or more. The shoulder diameter D is more preferably 9×TJ (mm) or less.

Further, RS×D³/JS is a parameter that correlates with the amount of heat generated per unit joint length. By setting the range of RS×D³/JS from 1000×TJ to 9000×TJ, the temperature rise due to the frictional heat generated between the rotating tool and the material to be joined and the shear stress due to the frictional force may be effectively imparted to the material to be joined, that is, the first electrical steel strip and the second electrical steel strip. Here, when RS×D³/JS is less than 1000×TJ, the amount of heat generated may be insufficient. Therefore, forming a joining interface in a metallurgically joined state at mating surfaces of the first electrical steel strip and the second electrical steel strip, and satisfying the defined relationship may become difficult. On the other hand, when RS×D³/JS exceeds 9000× TJ, the amount of heat generated by friction stirring becomes excessive, and an excessive amount of heat is injected into the joined portion. This increases the peak temperature (the maximum arrival temperature), decreases the cooling rate of the joined portion, and coarsens the recrystallized microstructure of the joined portion. As a result, satisfying the defined relationship may become difficult. Therefore, from the viewpoint of making conditions satisfy the defined relationship, RS×D³/JS preferably satisfies the relationship of the above Expression (8). RS×D³/JS is more preferably 1400×TJ or more. RS×D³/JS is more preferably 7000×TJ or less.

For Double-Sided Friction Stir Welding

The diameter D (mm) of the shoulders of the rotating tools satisfies the relationship of the above Expression (7), and
the rotation speed RS (r/min) of the rotating tools, the diameter D (mm) of the shoulders of the rotating tools, and the joining speed JS (mm/min), expressed as RS×D³/JS, satisfy the relationship of the following Expression (9).

$$200 \times TJ \le RS \times D^3 / JS \le 2000 \times TJ \tag{9}$$

Here, TJ in Expression (9) is defined such that,
when the unjoined portion is the butted portion, TJ is an average value (mm) of the thickness of the first electrical steel strip and the thickness of the second electrical steel strip, and
when the unjoined portion is the overlapped portion, TJ is the thickness (mm) of the overlapped portion (that is, the sum of the thickness (mm) of the first electrical steel strip and the thickness (mm) of the second electrical steel strip).

As mentioned above, RS×D³/JS is a parameter that correlates with the amount of heat generated per unit joint length. By setting the range of RS×D³/JS from 200×TJ to 2000×TJ, the temperature rise due to the frictional heat generated between the rotating tools and the material to be joined and the shear stress due to the frictional force may be effectively imparted to the material to be joined, that is, the first electrical steel strip and the second electrical steel strip. Here, when RS×D³/JS is less than 200×TJ, the amount of heat generated may be insufficient. Therefore, forming a joining interface in a metallurgically joined state at mating surfaces of the first electrical steel strip and the second electrical steel strip, and satisfying the defined relationship may become difficult. On the other hand, when RS×D³/JS exceeds 2000×TJ, the amount of heat generated by friction stirring becomes excessive, and an excessive amount of heat is injected into the joined portion. This increases the peak temperature (the maximum arrival temperature), decreases the cooling rate of the joined portion, and coarsens of the recrystallized microstructure of the joined portion. As a result, satisfying the defined relationship may become difficult. Therefore, from the viewpoint of making conditions satisfy the defined relationship, RS×D³/JS preferably satisfies the relationship of the above Expression (9). RS×D³/JS is more preferably 280×TJ or more. RS×D³/JS is more preferably 1600×TJ or less.

In the case of double-sided friction stir welding, when the rotation speeds RS and/or the shoulder diameters D of the rotating tools are different between the front side rotating tool and the back side rotating tool, the relationships of the above Expressions (7) and (9) are preferably satisfied for the front side rotating tool and the back side rotating tool, respectively.

Further, joining conditions, such as tilt angle θ of the rotating tool, rotation speed of the rotating tool, joining speed, position of the lead end of the rotating tool, pressure load, and rotation torque, are not particularly limited as long as the steel microstructures of the joined portion and the thermo-mechanically affected zone formed by joining become mainly ferrite phase and the relationships of the above Expressions (1) to (4) are satisfied, and conventional methods may be applied.

For example, in the case of single-sided friction stir welding, the tilt angle θ of the rotating tool is preferably 0°≤θ≤4°. The tilt angle θ of the rotating tool is more preferably 0°<θ≤3°. Here, θ is the tilt angle of the axis of rotation of the rotating tool (hereinafter also referred to as tool rotation axis) from the thickness direction (direction perpendicular to the surface of the material to be joined) in a plane including the joining direction and the thickness direction (direction perpendicular to the surface of the material to be joined). The direction (angle) in which the lead end of the rotating tool leads the joining direction is +.

The rotation speed of the rotating tool is preferably 100 r/min to 2000 r/min. Keeping the rotation speed of the rotating tool in this range inhibits degradation of mechanical properties due to excessive heat input while maintaining a good surface profile, and is therefore advantageous. The rotation speed of the rotating tool is more preferably 150 r/min or more. The rotation speed of the rotating tool is more preferably 1500 r/min or less.

The joining speed is preferably 80 mm/min to 600 mm/min. The joining speed is more preferably 100 mm/min or more. The joining speed is more preferably 500 mm/min or less.

The position of the lead end of the rotating tool, pressure load, rotation torque, and the like may be set according to conventional methods.

Further, in the case of double-sided friction stir welding, the tilt angle θ of the rotating tools, for both the front side rotating tool and the back side rotating tool, is preferably 0°≤θ≤3°. The tilt angle θ of the rotating tools is more preferably 0°<θ≤2°.

The rotation speed of the rotating tools is preferably 100 r/min to 9000 r/min. Keeping the rotation speed of the rotating tools in this range inhibits degradation of mechanical properties due to excessive heat input while maintaining a good surface profile, and is therefore advantageous. The rotation speed of the rotating tools is more preferably 300 r/min or more. The rotation speed of the rotating tools is even more preferably 400 r/min or more. The rotation speed of the rotating tools is more preferably 8000 r/min or less. When t1 and t2 are different, the rotation speed of the rotating tools is more preferably 100 r/min to 5000 r/min. In such a case, the rotation speed of the rotating tools is even more preferably 500 r/min or more. In such a case, the rotation speed of the rotating tools is even more preferably 3000 r/min or less.

The joining speed is preferably 800 mm/min to 5000 mm/min. The joining speed is more preferably 1000 mm/min or more. The joining speed is even more preferably 2000 mm/min or more. The joining speed is even more preferably 4000 mm/min or less.

The positions of the lead ends of the rotating tools, pressure load, rotation torque, gap between probes, gap between the shoulders of the rotating tools, and the like may be set according to conventional methods.

As illustrated in FIG. 3A, when double-sided friction stir welding is performed, the direction of rotation of the front side rotating tool and direction of rotation of the back side rotating tool are preferably opposed when viewed from the front (or back) side of the material to be joined, and the rotation speeds are preferably the same. This allows the rotation torques applied to the material to be joined from the front side rotating tool and the back side rotating tool to cancel each other out. As a result, the structure of the jig that holds the material to be joined may be simplified compared to the one-sided friction stir welding method, in which the unjoined portion is pressed from one side.

Further, when the rotation direction of the front side rotating tool and the rotation direction of the back side rotating tool are in the same direction as viewed from the front (or back) side of the material to be joined, the relative speed of one rotating tool to the other approaches zero. As a result, the plastic flow of the material to be joined approaches a homogeneous state and plastic deformation is reduced. Therefore, achieving a good joined state is difficult because heat generation due to plastic deformation of the material is also not obtained. Therefore, from the viewpoint of uniformly obtaining sufficient temperature increase and shear stress in the thickness direction of the material to be joined to achieve a good joined state, making the direction of rotation of the front side rotating tool and the direction of rotation of the back side rotating tool opposed when viewed from the front (or back) side of the material to be joined is preferred.

Further, the rotating tool used in friction stir welding is not particularly limited as long as the steel microstructures of the joined portion and the thermo-mechanically affected zone formed by joining become mainly ferrite phase and satisfy the relationships of the above Expressions (1) to (4).

For example, the lead end of the rotating tool is in contact with the material to be joined, that is, the first electrical steel strip and the second electrical steel strip, during joining. Accordingly, the lead end of the rotating tool is made of a harder material than the first electrical steel strip and the second electrical steel strip under the high temperature conditions during joining. This allows the rotating tool to apply deformation to the first electrical steel strip and the second electrical steel strip while maintaining the shape of the lead end during joining. As a result, high stirring capacity is continuously achievable, enabling proper joining. The hardness of the lead end of the rotating tool, the first electrical steel strip, and the second electrical steel strip may be measured and compared by a high temperature Vickers hardness test. Further, it may suffice that only the lead end of the rotating tool is made of a material harder than the first electrical steel strip and the second electrical steel strip. The rotating tool may entirely be made of a material harder than the first electrical steel strip and the second electrical steel strip.

Figure 4A:
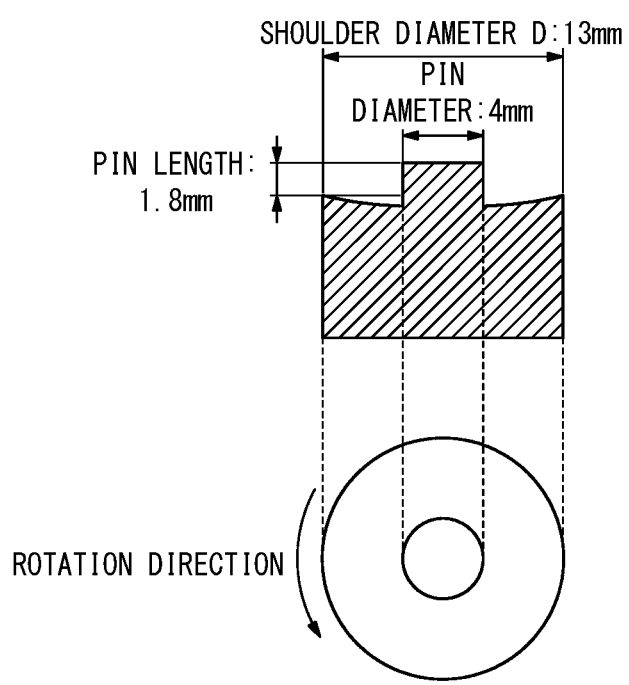
FIG. 4A is a schematic diagram illustrating an example of shape of a rotating tool used in a single-sided friction stir welding method.
Figure 4B:
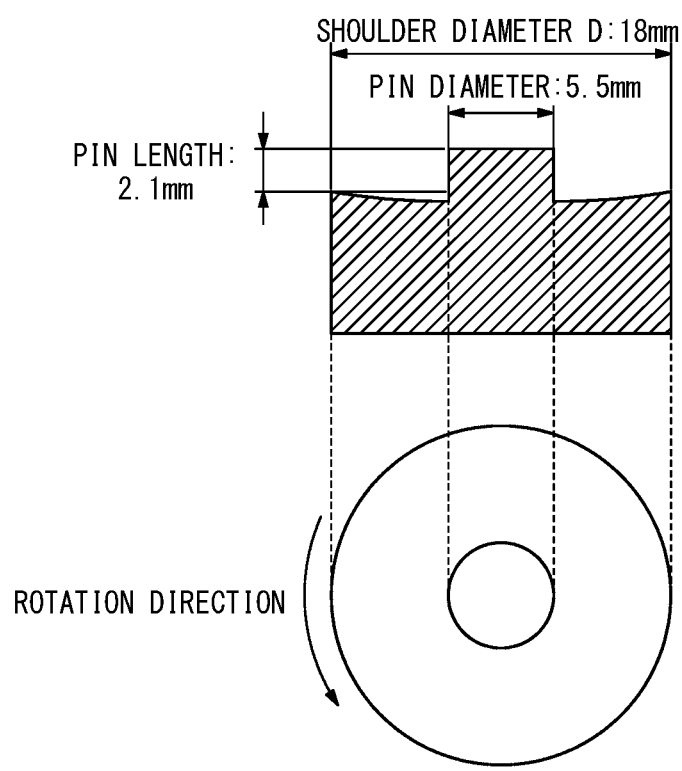
FIG. 4B is a schematic diagram illustrating an example of shape of a rotating tool used in a single-sided friction stir welding method.
Figure 4C:
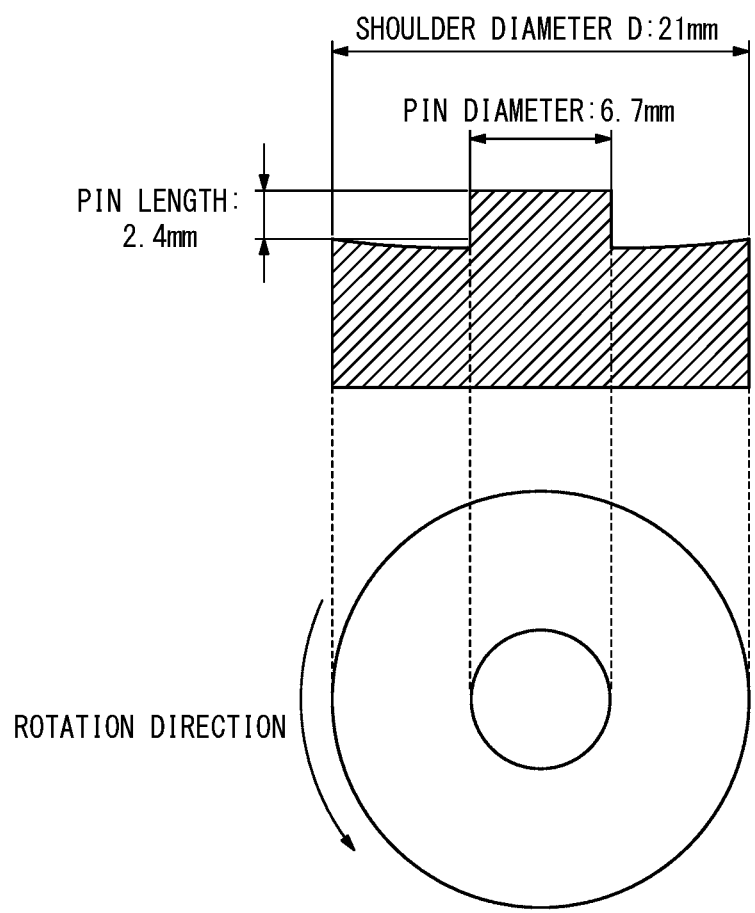
FIG. 4C is a schematic diagram illustrating an example of shape of a rotating tool used in a single-sided friction stir welding method.

FIG. 4A to FIG. 4C illustrate examples of rotating tools used in single-sided friction stir welding. As illustrated in FIG. 4A to FIG. 4C, the lead end of a rotating tool used in single-sided friction stir welding includes a shoulder (the range indicated by the shoulder diameter in the drawings) and a probe (the range indicated by the pin diameter in the drawings) disposed on the shoulder and sharing the axis of rotation with the shoulder.

In the rotating tool example illustrated in FIG. 4A, the rotating tool has shoulder diameter D: 13 mm, probe diameter (hereinafter also referred to as pin diameter): 4 mm, probe length (hereinafter also referred to as pin length): 1.8 mm, and concavity depth (not labelled): 0.3 mm.

In the rotating tool example illustrated in FIG. 4B, the rotating tool has a shoulder diameter D: 18 mm, pin diameter: 5.5 mm, pin length: 2.1 mm, and concavity depth (not labelled): 0.3 mm.

In the rotating tool example illustrated in FIG. 4C, the rotating tool has a shoulder diameter D: 21 mm, pin diameter: 6.7 mm, pin length: 2.4 mm, and concavity depth (not labelled): 0.3 mm.

Figure 5A:
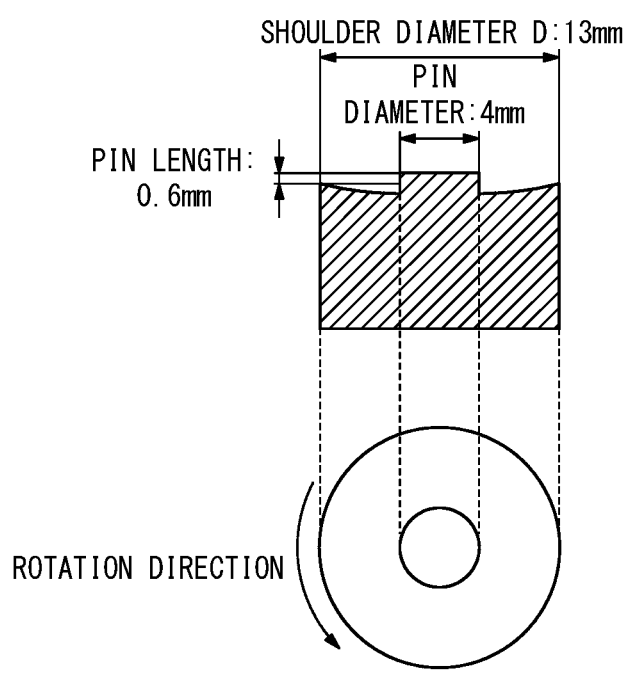
FIG. 5A is a schematic diagram illustrating an example of shape of a rotating tool used in a double-sided friction stir welding method.
Figure 5B:
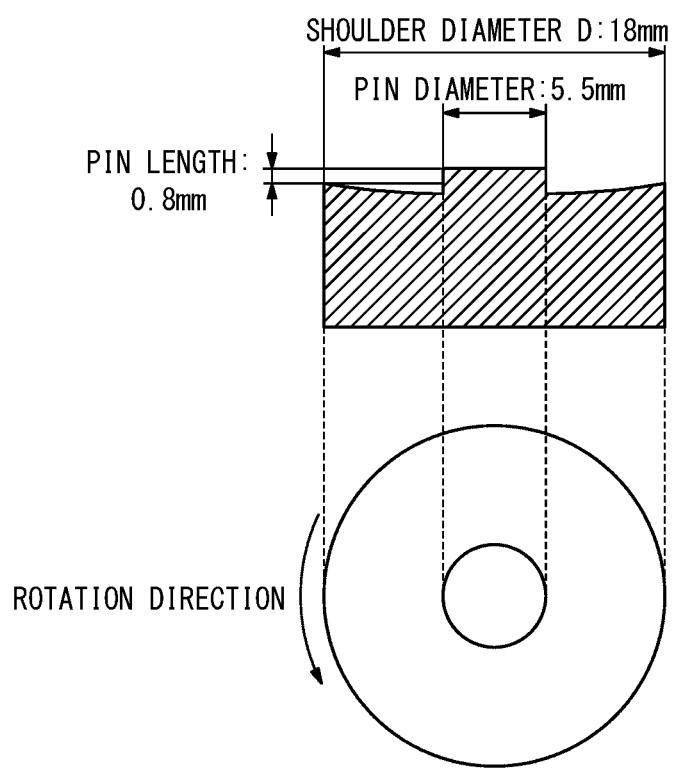
FIG. 5B is a schematic diagram illustrating an example of shape of a rotating tool used in a double-sided friction stir welding method.
Figure 5C:
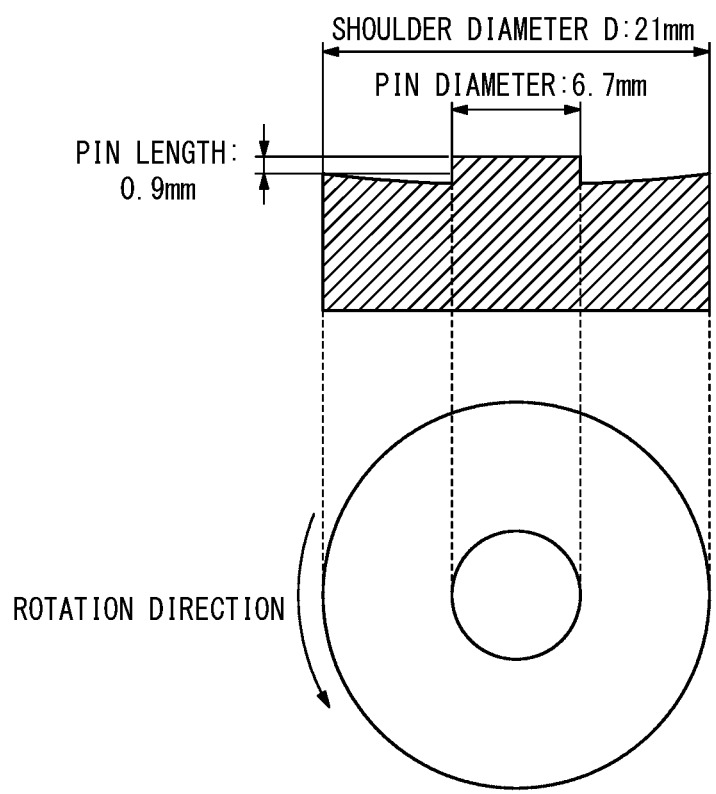
FIG. 5C is a schematic diagram illustrating an example of shape of a rotating tool used in a double-sided friction stir welding method.

FIG. 5A to FIG. 5C illustrate examples of rotating tools used in double-sided friction stir welding. As illustrated in FIG. 5A to FIG. 5C, the lead ends of rotating tools used in double-sided friction stir welding also each include a shoulder (the range indicated by the shoulder diameter in the drawings) and a probe (the range indicated by the pin diameter in the drawings) disposed on the shoulder and sharing the axis of rotation with the shoulder.

In the rotating tool example illustrated in FIG. 5A, the rotating tool has shoulder diameter D: 13 mm, pin diameter: 4 mm, pin length: 0.6 mm, and concavity depth (not labelled): 0.6 mm.

In the rotating tool example illustrated in FIG. 5B, the rotating tool has a shoulder diameter D: 18 mm, pin diameter: 5.5 mm, pin length: 0.8 mm, and concavity depth (not labelled): 0.3 mm.

In the rotating tool example illustrated in FIG. 5C, the rotating tool has a shoulder diameter D: 21 mm, pin diameter: 6.7 mm, pin length: 0.9 mm, and concavity depth (not labelled): 0.3 mm.

As illustrated in FIG. 4A to FIG. 4C and FIG. 5A to FIG. 5C, the lead end of a typical rotating tool consists of a shoulder (the area indicated by the shoulder diameter in the drawings) and a probe (the area indicated by the pin diameter in the drawings). The shoulder presents a flat shape formed by a substantially flat or gently curved surface. The shoulder functions to generate frictional heat through contact with the first electrical steel strip and the second electrical steel strip while rotating during joining. Further, the shoulder functions to press on the heat-softened region to prevent material from separating and to promote plastic flow in the direction of rotation. The probe is a discontinuous shape with the shoulder and protrudes substantially perpendicularly toward the material to be joined (not illustrated). The probe functions to improve the stirring capacity in the vicinity of the mid-thickness part by penetrating in the mid-thickness direction of the softened portions of the first electrical steel strip and the second electrical steel strip during joining. Further, the probe is typically located in the center of the shoulder.

The shoulder diameter D (mm) is not particularly limited, but as mentioned above, from the viewpoint of making the steel microstructures of the joined portion and the thermo-mechanically affected zone formed by joining become mainly ferrite phase and satisfying the relationships of the above Expressions (1) to (4), satisfying the relationships of the above Expressions (7) to (9) is preferred.

Further, the pin diameter and the pin length of each of the rotating tools are not particularly limited, and may be set as needed in accordance with conventional methods. For example, when butt-joining the first electrical steel strip and the second electrical steel strip having different thicknesses, an average thickness of the first electrical steel strip and the second electrical steel strip may be considered and the pin diameter, the pin length, and the like of the rotating tools may be set according to conventional methods. Further, when overlap joining the first electrical steel strip and the second electrical steel strip, the total thickness of the first electrical steel strip and the second electrical steel strip may be considered and the pin diameter, the pin length, and the like of the rotating tools may be set according to conventional methods.

Figure 3C:
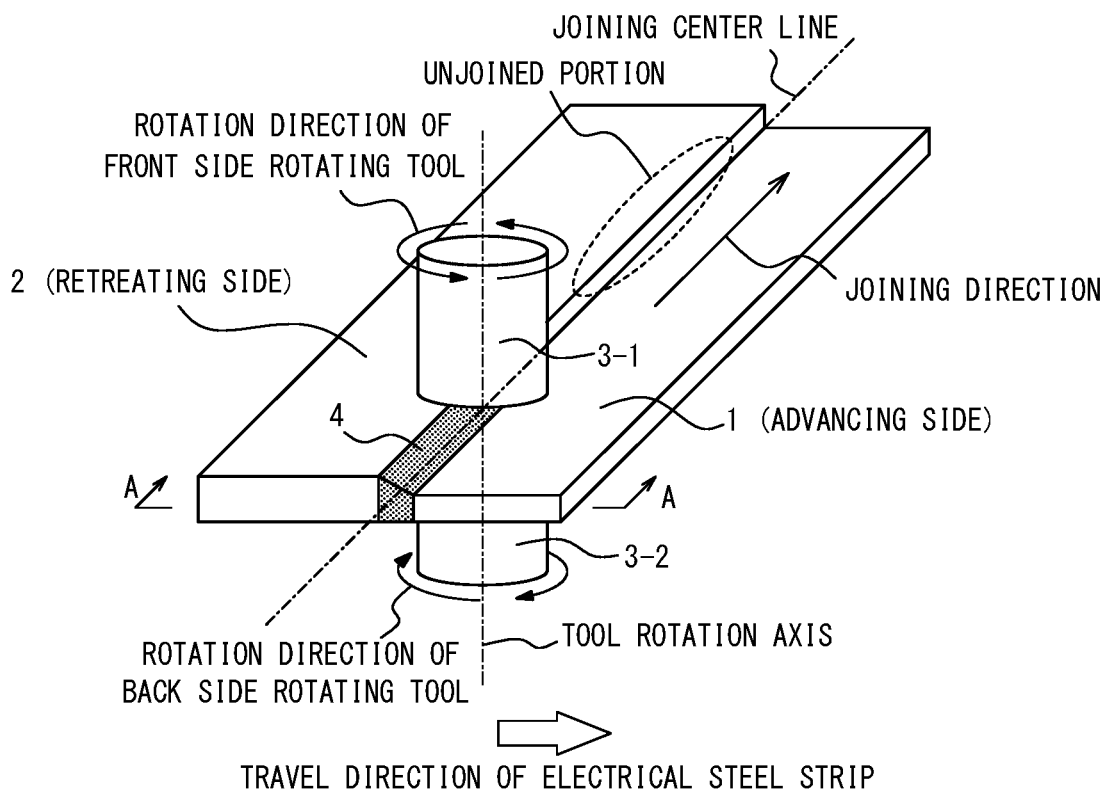
FIG. 3C is a schematic diagram for explanation of an electrical steel strip friction stir welding method according to an embodiment of the present disclosure, and is a diagram illustrating an example of a butt joint by a double-sided friction stir welding method.
Figure 3C:
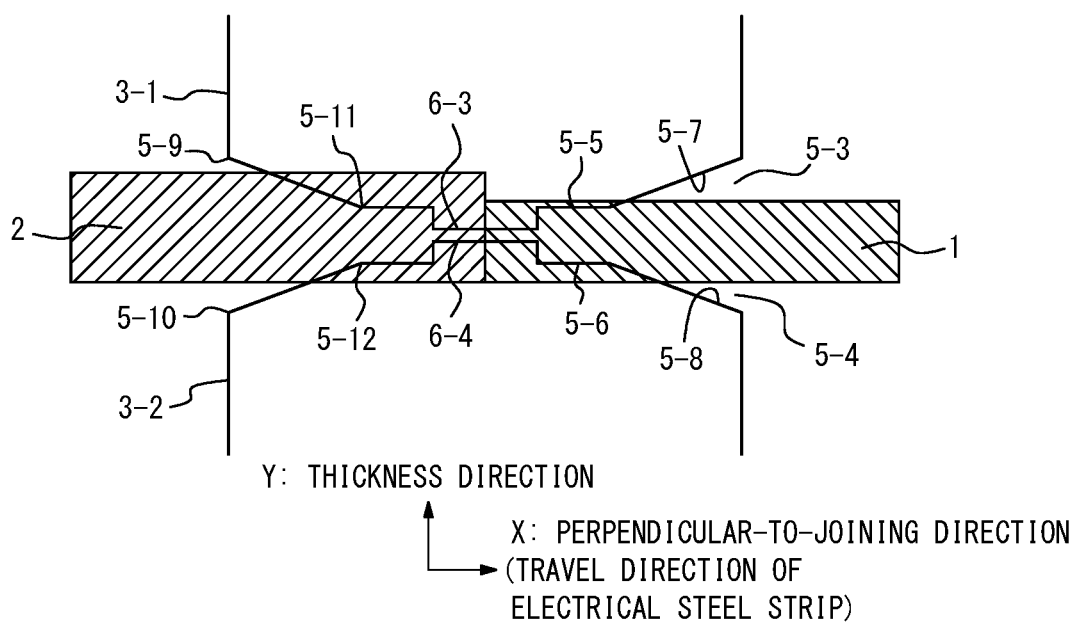

Further, as illustrated in FIG. 3C, when the thicknesses of the electrical steel strips to be joined are different from each other (t1 and t2 are different), then preferably:
  double-sided friction stir welding is applied as electrical steel strip coil joining, and
  the joining is performed using rotating tools that have leading ends that each include a center portion and an outer circumferential portion disposed adjacent to the periphery of the center portion, and the outer circumferential portions each have a tapered shape.

Accordingly, it becomes possible to increase the joining speed even when the thicknesses of the electrical steel strips to be joined differ from each other, while inhibiting the occurrence of coil joint fracture in a production line caused by deterioration of mechanical properties and shape of the coil joint.

In FIG. 3C, reference sign 1 indicates the first electrical steel strip (material to be joined), 2 indicates the second electrical steel strip (material to be joined), 3-1 indicates the rotating tool (front side rotating tool), 3-2 indicates the rotating tool (back side rotating tool), 4 indicates the joined portion, 5-3 indicates a leading end (front side rotating tool), 5-4 indicates a leading end (back side rotating tool), 5-5 indicates a center portion (front side rotating tool), 5-6 indicates a center portion (back side rotating tool), 5-7 indicates an outer circumferential portion (front side rotating tool) 5-8 indicates an outer circumferential portion (back side rotating tool), 6-3 indicates a probe (pin) (front side rotating tool), 6-4 indicates a probe (pin) (back side rotating tool), 5-9 indicates a shoulder end (radial end) (front side rotating tool), 5-10 indicates a shoulder end (radial end) (back side rotating tool), 5-11 indicates a center portion-outer circumferential portion boundary (front side rotating tool), and 5-12 indicates a center portion-outer circumferential portion boundary (back side rotating tool). Further, in the A-A view in FIG. 3C, the vertical direction is the thickness direction. The horizontal direction is the perpendicular-to-joining direction. The direction perpendicular to the plane of the paper and away from the reader is the joining direction. That is, the plane illustrated in the A-A view of FIG. 3C includes the perpendicular-to-joining direction and the thickness direction.

Figure 15:
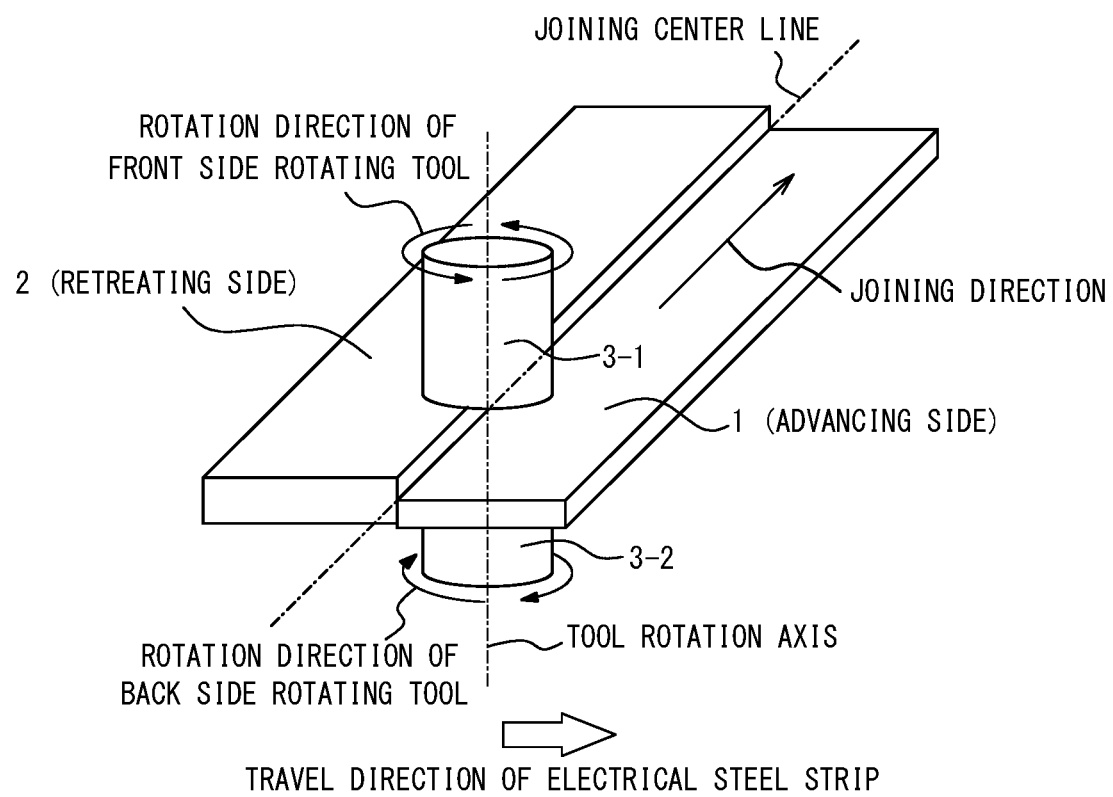
FIG. 15 is a schematic diagram for explanation of an electrical steel strip friction stir welding method according to an embodiment of the present disclosure, and is a diagram illustrating an example of a butt joint by a double-sided friction stir welding method.

The first electrical steel strip and the second electrical steel strip may be arranged so that a step only occurs on one side, as illustrated in FIG. 3C. In this case, a rotating tool with a tapered-shape outer circumferential portion, as described below, may be used for at least the front side rotating tool disposed at the front side where a step is present (vertical direction upper side). The same shape of rotating tool may be used for both the front side rotating tool and the back side rotating tool. Further, as illustrated in FIG. 15, the material to be joined may be arranged so that a step occurs on both sides. In the example in FIG. 15, the second electrical steel strip is stepped to protrude upward in the vertical direction, and the first electrical steel strip is stepped to protrude downward in the vertical direction. In such a case, using rotating tools with a tapered-shape outer circumferential portion, as described below, is preferred for both the front side rotating tool and the back side rotating tool.

The following is a description of a preferred rotating tool for use when t1 and t2 are different, with reference to FIG. 6 to FIG. 14C.

In each drawing, the upper side of the drawing is a cross section view of the rotating tool viewed from the side (cross section including the axis of rotation and parallel to the axis of rotation), and the lower side of the drawing is a plan view of the rotating tool viewed from above (from the side of the leading end). The shapes of the front side rotating tool and the back side rotating tool are essentially the same or point-symmetrical, the front side rotating tool is here used as an example.

Figure 6:
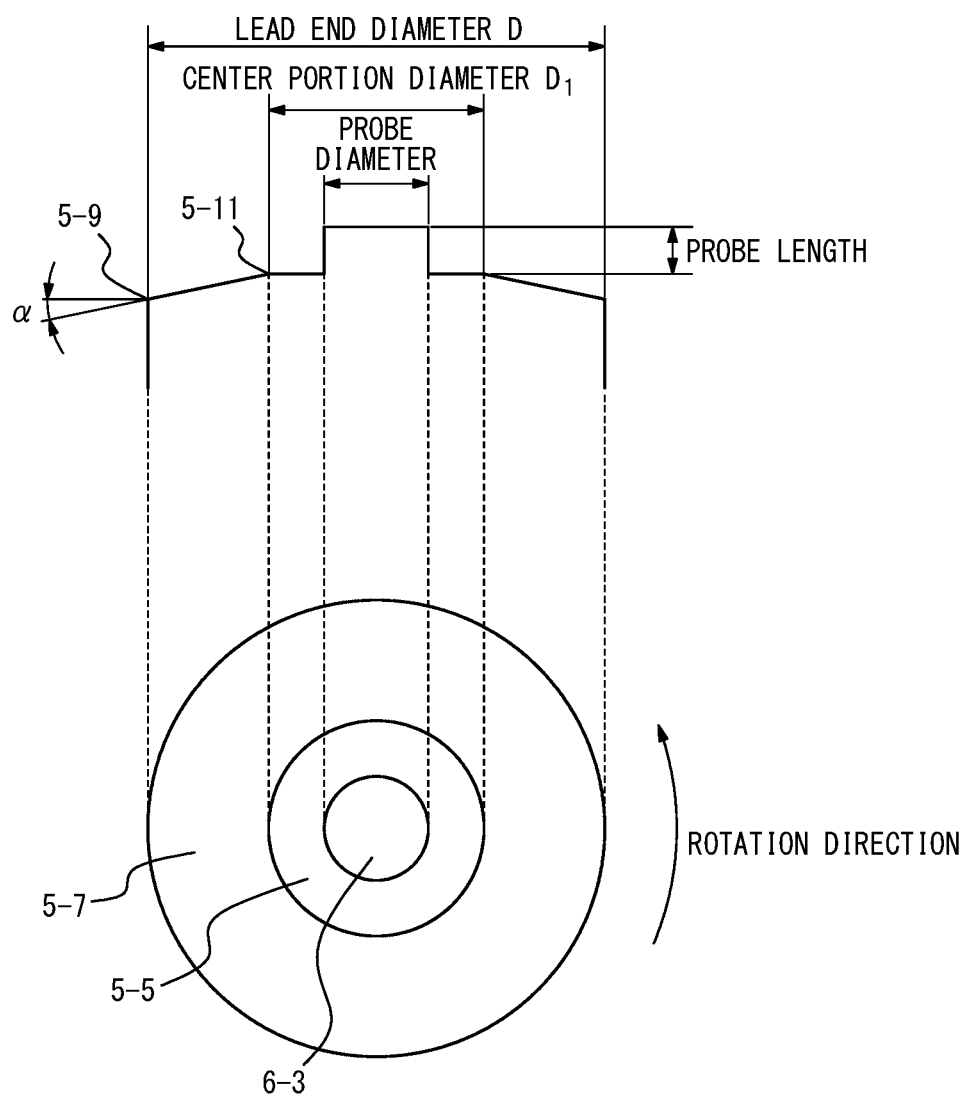
FIG. 6 is a schematic diagram illustrating an example of shape of a rotating tool used in an electrical steel strip friction stir welding method according to an embodiment of the present disclosure.

FIG. 6 illustrates the same form as the rotating tool illustrated in FIG. 3C, with the leading end having the central portion and the outer circumferential portion located adjacent to the periphery of the central portion. The outer circumferential portion having a tapered shape is important. When the outer circumferential portion has a tapered shape, the lead end of the rotating tool, except for the probe, becomes a truncated approximately conical shape, as illustrated in FIG. 6 to FIG. 14C.

As illustrated in FIG. 3C, in friction stir welding, the rotating tools penetrate to near the center of the thickness direction in the portion where the material to be joined is softened during joining. When butt-joining material to be joined that has different thicknesses, a step occurs on at least one side of the material to be joined.

In order to make the steel microstructures of the joined portion and the thermo-mechanically affected zone formed by joining be mainly ferrite phase and to satisfy the relationships of the above Expressions (1) to (4), the step is smoothed out during the passage of the rotating tool to form a proper bead.

When using a typical rotating tool, measures such as tilting the rotating tool rotation axis in the perpendicular-to-joining direction (especially toward the side of the material to be joined that has the smaller thickness) are necessary to smooth out the step when the rotating tool passes through. However, when the material to be joined is an electrical steel strip, especially a high melting point material or a hard material, forming a proper bead may be difficult because of the large load generated by tilt of the rotating tool in the perpendicular-to-joining direction. Further, problems also occur such as damage to the rotating tool and the need for extremely high rigidity of the device in which the rotating tool is installed.

In this regard, by making the outer circumferential portion of the leading end of the rotating tool a tapered shape, then even when the rotating tool rotation axis is not tilted in the perpendicular-to-joining direction, a step in the material to be joined is smoothed as the rotating tool passes through, forming a proper bead. As a result, it becomes possible to increase the joining speed even when the thicknesses of the electrical steel strips to be joined differ from each other, while inhibiting the occurrence of coil joint fracture in a production line caused by deterioration of mechanical properties and shape of the coil joint.

Here, the outer circumferential portion is defined as a region from the shoulder end (radial end) of the leading end of the rotating tool to the boundary between the center portion and the outer circumferential portion (a doughnut-shaped region). Further, the center portion is defined as a region other than the outer circumferential portion of the leading end of the rotating tool. Further, the boundary between the center portion and the outer circumferential portion (hereinafter also referred to as the center portion-outer circumferential portion boundary) is a position closest to the shoulder end where the shape of the leading end becomes discontinuous from the shoulder end toward the center (axis of rotation) in a cross section viewed from the side of the rotating tool (including the axis of rotation and parallel to the axis of rotation). In the case of a stepped portion as described below, locations that are discontinuous due to the stepped portion (steps up, concave portions (grooves), and convex portions) are disregarded.

Further, from the viewpoint of achieving the effect described above, a taper angle $\alpha$ of the outer circumferential portion is preferably 2° to 20°. Here, when the taper angle $\alpha$ of the outer circumferential portion is smaller than 2°, the ability of the rotating tool to smooth a step of the material to be joined when passing through may be reduced. Further, the risk of damage to the rotating tool becomes high due to high stress applied to the outer circumferential portion of the rotating tool. On the other hand, when the taper angle $\alpha$ of the outer circumferential portion is larger than 20°, the contact surface between the outer circumferential portion and the material to be joined decreases. This may reduce joining ability. The taper angle $\alpha$ of the outer circumferential portion is therefore preferably 2° to 20°. The taper angle $\alpha$ of the outer circumferential portion is more preferably 8° or more.

The taper angle $\alpha$ of the outer circumferential portion is more preferably 15° or less.

The taper angle $\alpha$ of the outer circumferential portion is the angle between a straight line connecting the shoulder end (radial end) of the leading end of the rotating tool and the center portion-outer circumferential portion boundary and a straight line perpendicular to the axis of rotation in the cross section of the side view of the rotating tool (cross section including the axis of rotation and parallel to the axis of rotation). The shape of the outer circumferential portion in the cross section of the leading end (cross section including the axis of rotation and parallel to the axis of rotation) may be a straight line (line segment) or a continuous curve, but a straight line (line segment) is preferred.

Further, from the viewpoint of achieving the effect described above, the radial position of the center portion-outer circumferential portion boundary is preferably in a range from 0.15×D to 0.35×D (in other words, the diameter $D_1$ of the center portion of the rotating tool is preferably in a range from $0.3 \times D$ to $0.7 \times D$).

Here, the radial position is the distance from the axis of rotation in the radial direction of the leading end of the rotating tool (direction perpendicular to the axis of rotation). Further, D is the diameter of the leading end of the rotating tool (hereinafter also referred to as leading end diameter D).

In addition, from the viewpoint of obtaining the effect described above, an aiming position (axis of rotation position) of the rotating tool in the perpendicular-to-joining direction (sheet transverse direction) is preferably within ±2 mm from the butt joint (joining center line) of the first electrical steel strip and the second electrical steel strip in the case of a butt joint, and preferably within ±2 mm from a center position (in the perpendicular-to-joining direction) of the overlapped portion of the first electrical steel strip and the second electrical steel strip in the case of a lap joint.

Even when the aiming position deviates in the normal direction to the surface of the material to be welded, a proper bead is formed because the outer circumferential portion that has the tapered shape is able to press on the material to be joined. Further, no particular problem occurs when, for example, the shape (dimension) error of the leading end is within ±0.005 mm relative to a specified dimension, as measured by tool measurement using a displacement meter.

Figure 7A:
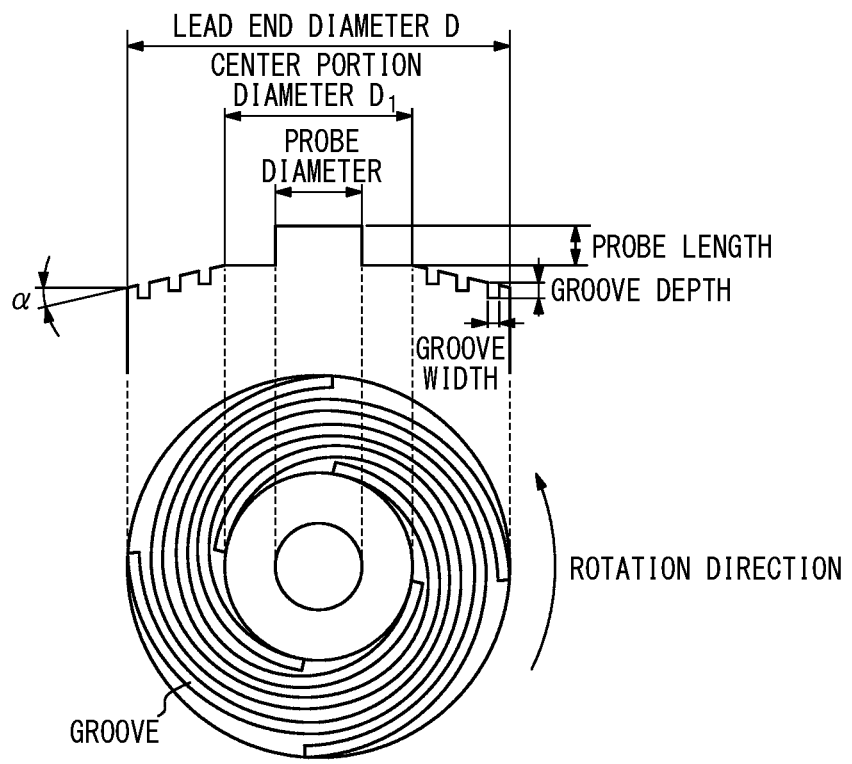
FIG. 7A is a schematic diagram illustrating an example of shape of a rotating tool used in an electrical steel strip friction stir welding method according to an embodiment of the present disclosure.
Figure 7B:
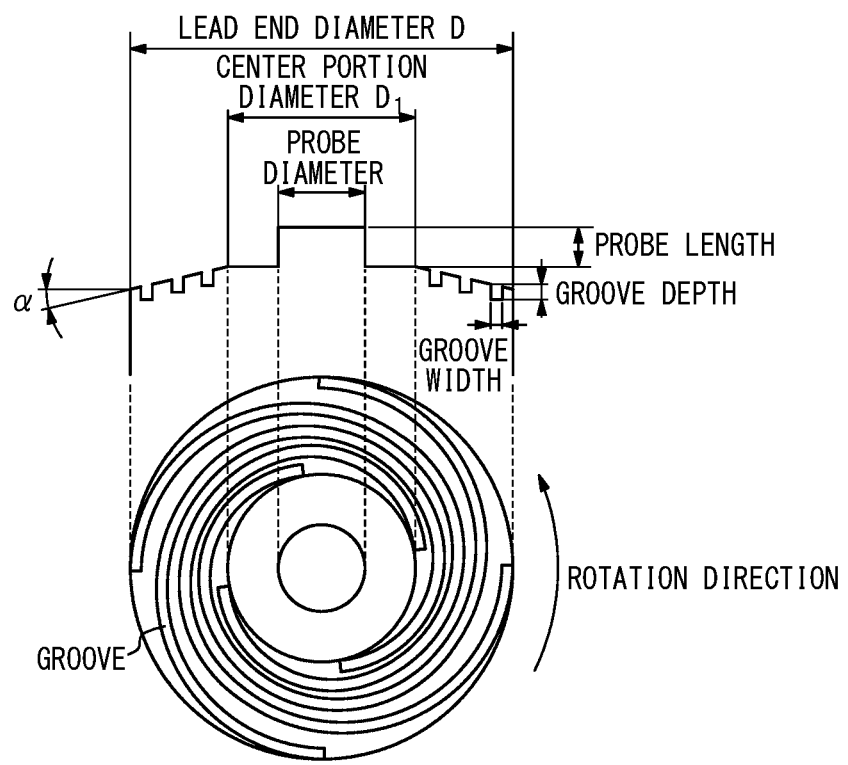
FIG. 7B is a schematic diagram illustrating an example of shape of a rotating tool used in an electrical steel strip friction stir welding method according to an embodiment of the present disclosure.

Further, as illustrated in FIG. 7A and FIG. 7B, providing a spiral-shaped (helical) stepped portion to the outer circumferential portion is preferred. The spiral-shaped stepped portion is defined, for example, by a radial curve (spiral) extending from the periphery of the center portion (center portion-outer circumferential portion boundary) to the outer circumferential edge of the leading end of the rotating tool (shoulder end of the leading end of the rotating tool). The direction of the spiral may be in the same direction as the direction of rotation of the rotating tool, as in FIG. 7A, or in the opposite direction, as in FIG. 7B. In both FIG. 7A and FIG. 7B, the form of the stepped portion is a concave (groove) shape, and the number of spirals is four.

In friction stir welding, frictional heat is generated during the pressing and stirring of the material to be joined by the rotating tool, causing metal material to soften and flow. In this regard, as illustrated in FIG. 7A, by providing a spiral-shaped stepped portion to the outer circumferential portion in the same direction as the direction of rotation of the rotating tool, frictional heat is generated from the inside of the rotating tool toward the outside. This allows excess metal material caused by the difference in thickness of the material to be joined to flow out of the pressed portion due to the rotating tool. As a result, the load on the rotating tool may be reduced.

On the other hand, as illustrated in FIG. 7B, by providing a spiral-shaped stepped portion to the outer circumferential portion in the opposite direction to the direction of rotation of the rotating tool, frictional heat is generated from the outside of the rotating tool toward the inside. This inhibits metal material flowing out of the pressed portion due to the rotating tool. As a result, plastic flow in the pressed portion may be promoted. Further, a decrease in thickness of the joined portion relative to the thickness of the base metal may be inhibited. Further, a joined portion surface with fewer burrs may be formed.

The number of spirals defining the stepped portion may be one or more. However, when the number of spirals defining the stepped portion exceeds six, not only is an effect of promoting material flow lessened, but increased susceptibility to breakage becomes a risk due increased shape complexity. Accordingly, the number of spirals defining the stepped portion is preferably six or less.

Further, from the viewpoint of preventing damage to the lead end of the rotating tool while improving material flow, the number of spirals defining the stepped portion is preferably adjusted according to the leading end diameter D. For example, the larger the leading end diameter D, the greater the number of spirals defining the stepped portion, and the smaller the leading end diameter D, the smaller the number of spirals defining the stepped portion. Specifically, when the leading end diameter D is less than 6 mm, the number of spirals defining the stepped portion is preferably two or less. On the other hand, when the leading end diameter D is 6 mm or more, the number of spirals defining the stepped portion is preferably 3 to 6.

In addition, the length of each spiral is preferably 0.5 circumferences of the leading end or more. The length of each spiral is preferably 2 circumferences of the leading end or less. The length of each spiral is preferably adjusted according to the leading end diameter D. For example, preferably, the larger the leading end diameter D, the longer the spiral length, and the smaller the leading end diameter D, the shorter the spiral length.

In one example, the stepped portion varies in height position in a step-like shape for each region between spirals. For example, the stepped portion is composed by gradual lowering from the periphery of the center portion (center portion-outer circumferential portion boundary) to the circumferential edge of the leading end of the rotating tool (shoulder end of the leading end of the rotating tool), as illustrated in FIG. 14B and FIG. 14C. Hereinafter, this form of the stepped portion is also referred to as step-like. Further, in a cross section including the axis of rotation and parallel to the axis of rotation, each step may be substantially horizontal, for example.

In another example, the stepped portion is formed by providing a concavity (groove) or convexity at the spiral location. Hereinafter, these forms of the stepped portion are also referred to as concave-shaped or convex-shaped, respectively. Further, the cross section shape of the concavity (groove) may be a U shape (including square and semicircular shapes), a V shape, a check-mark shape, or the like, but any shape may be used as long as the effects described above are achievable.

Figure 8A:
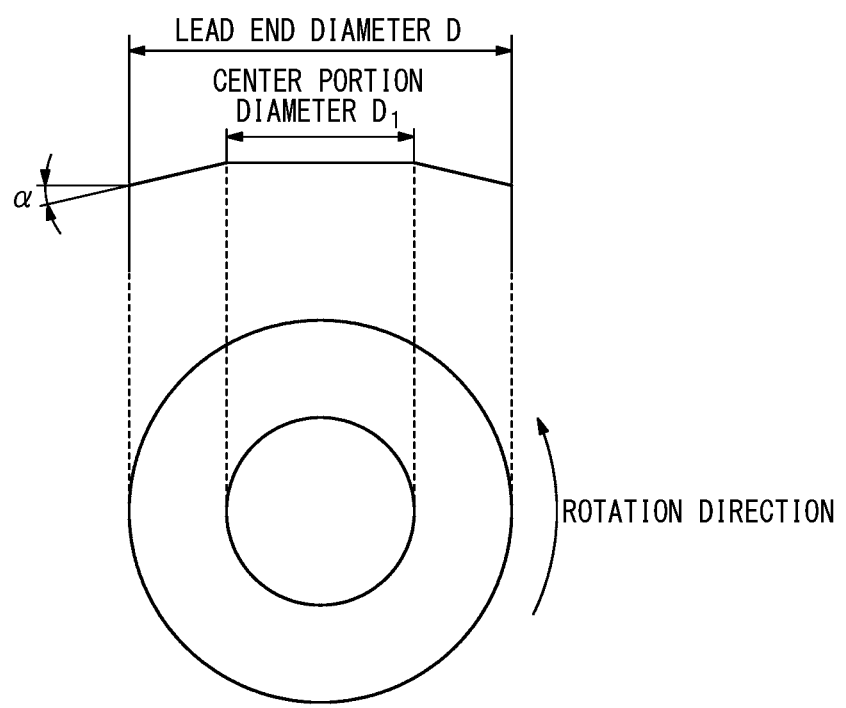
FIG. 8A is a schematic diagram illustrating an example of shape of a rotating tool (flat center portion rotating tool) used in an electrical steel strip friction stir welding method according to an embodiment of the present disclosure.
Figure 8B:
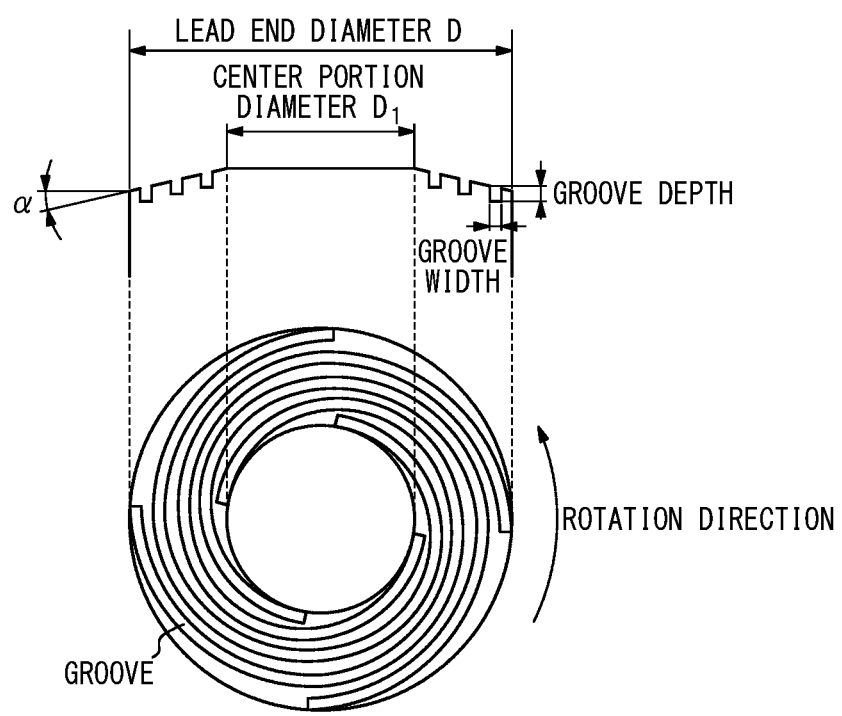
FIG. 8B is a schematic diagram illustrating an example of shape of a rotating tool (flat center portion rotating tool) used in an electrical steel strip friction stir welding method according to an embodiment of the present disclosure.
Figure 8C:
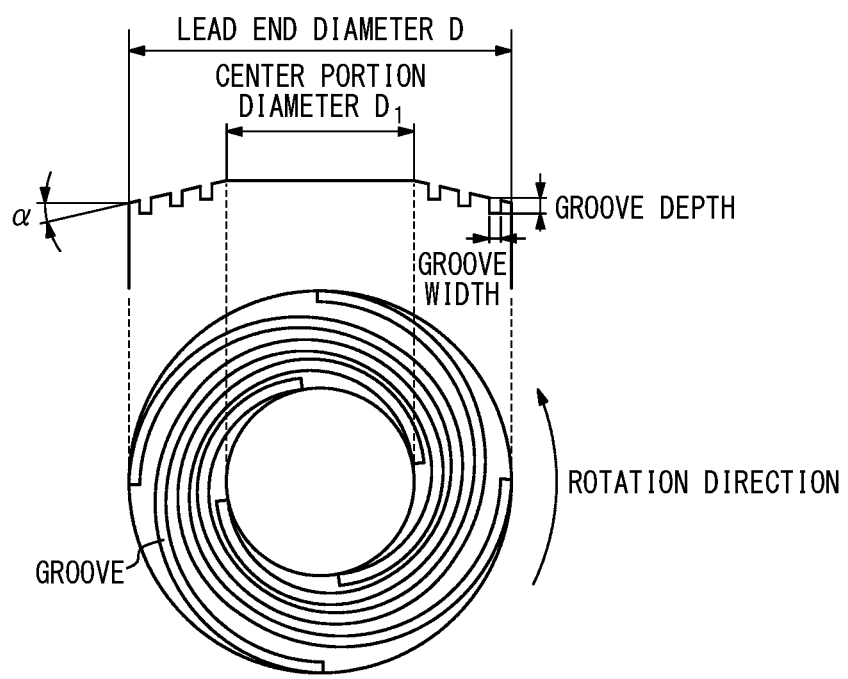
FIG. 8C is a schematic diagram illustrating an example of shape of a rotating tool (flat center portion rotating tool) used in an electrical steel strip friction stir welding method according to an embodiment of the present disclosure.
Figure 9A:
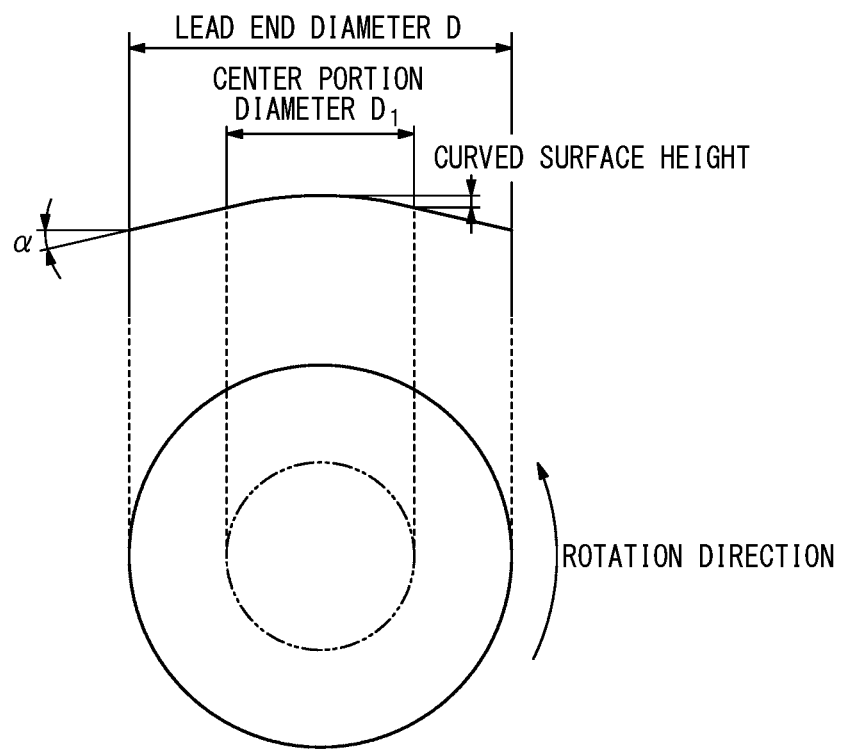
FIG. 9A is a schematic diagram illustrating an example of shape of a rotating tool (convex center portion rotating tool) used in an electrical steel strip friction stir welding method according to an embodiment of the present disclosure.
Figure 9B:
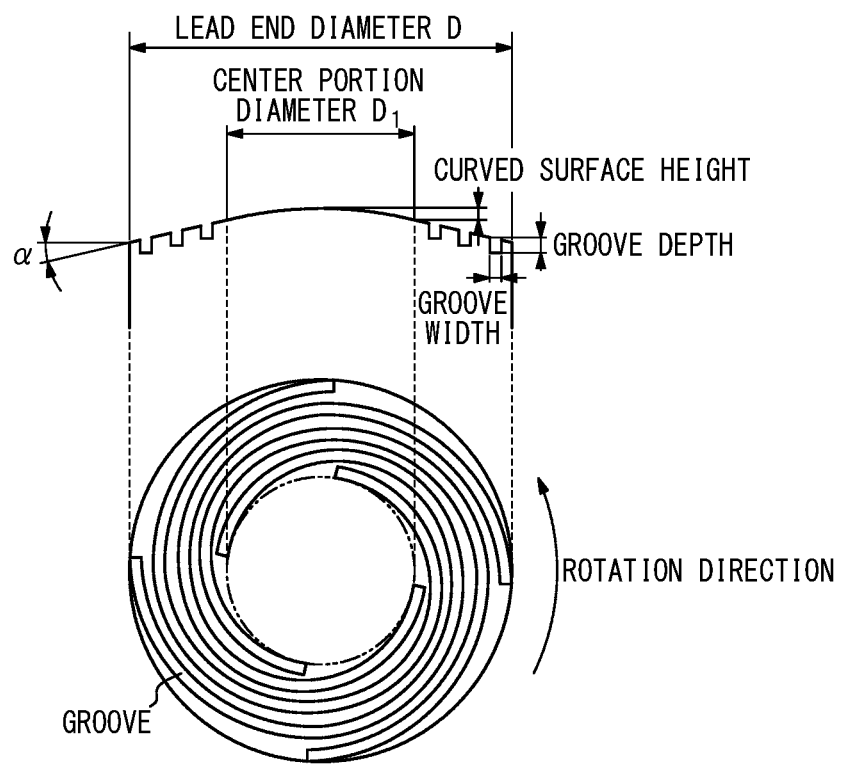
FIG. 9B is a schematic diagram illustrating an example of shape of a rotating tool (convex center portion rotating tool) used in an electrical steel strip friction stir welding method according to an embodiment of the present disclosure.
Figure 9C:
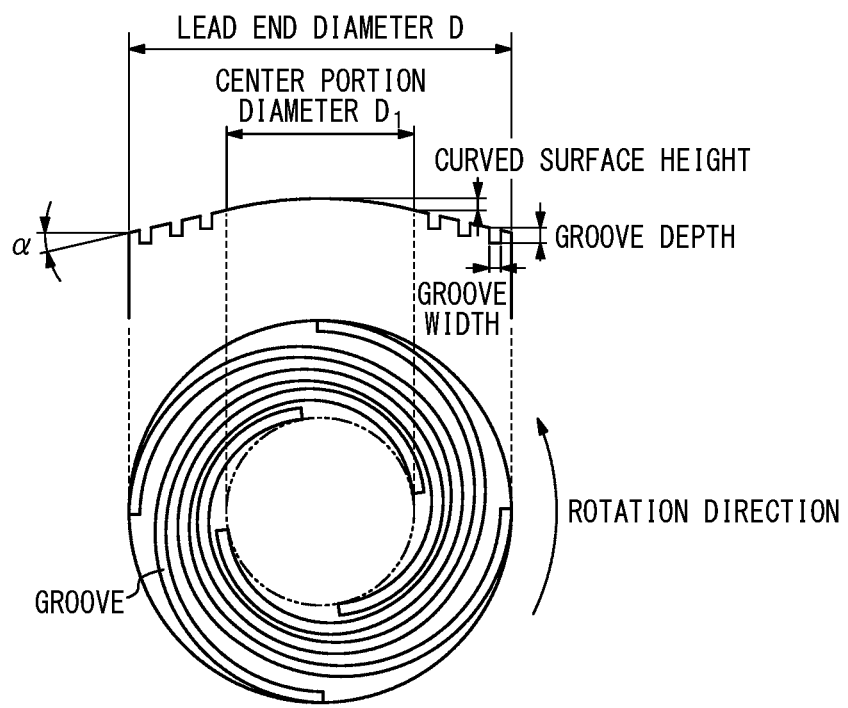
FIG. 9C is a schematic diagram illustrating an example of shape of a rotating tool (convex center portion rotating tool) used in an electrical steel strip friction stir welding method according to an embodiment of the present disclosure.
Figure 10A:
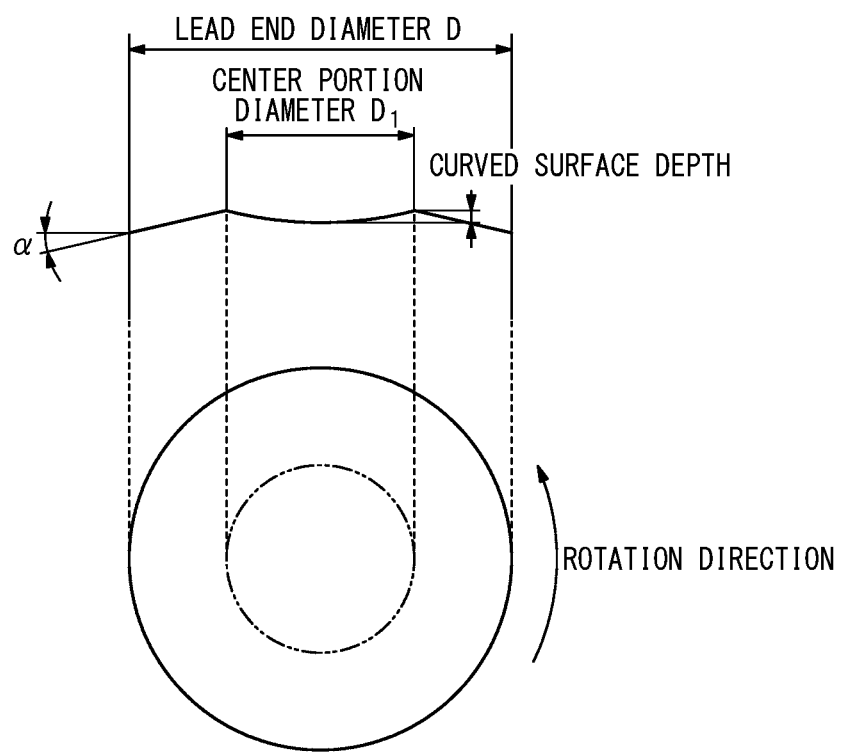
FIG. 10A is a schematic diagram illustrating an example of shape of a rotating tool (concave center portion rotating tool) used in an electrical steel strip friction stir welding method according to an embodiment of the present disclosure.
Figure 10B:
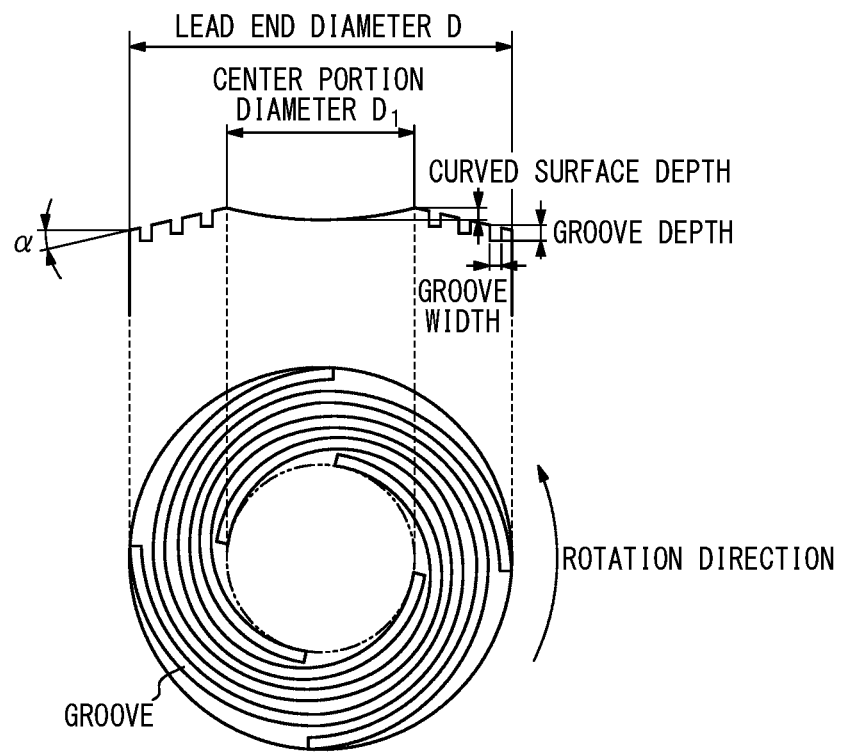
FIG. 10B is a schematic diagram illustrating an example of shape of a rotating tool (concave center portion rotating tool) used in an electrical steel strip friction stir welding method according to an embodiment of the present disclosure.
Figure 10C:
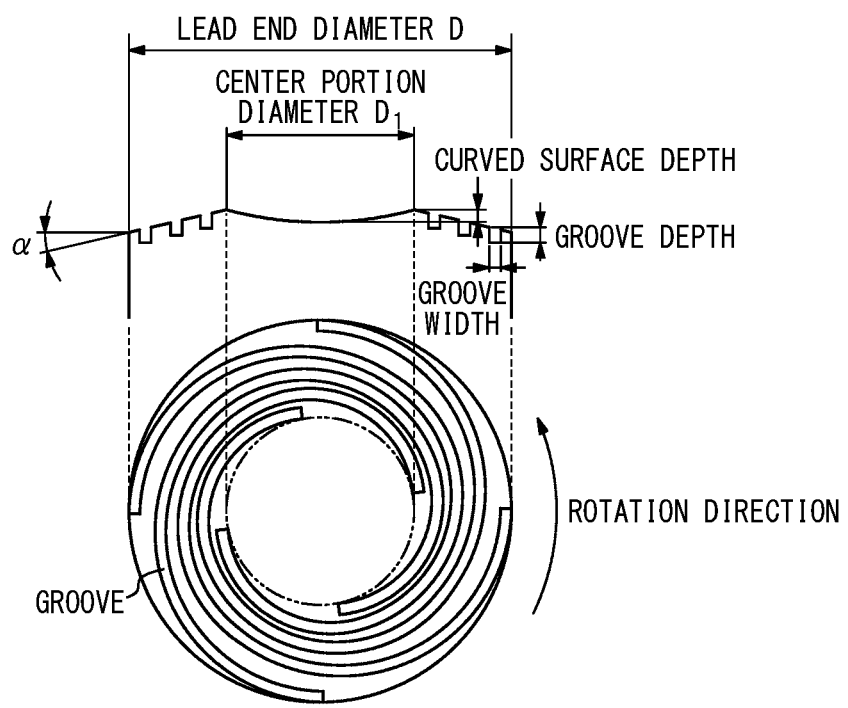
FIG. 10C is a schematic diagram illustrating an example of shape of a rotating tool (concave center portion rotating tool) used in an electrical steel strip friction stir welding method according to an embodiment of the present disclosure.

The center portion of the rotating tool may be a flat, convex curved, or concave curved surface. Further, the shape of the center portion in the plane perpendicular to the tool rotation axis (the projected area when the center portion of the rotating tool is projected in the direction parallel to the axis of rotation) is basically circular. FIG. 8A to FIG. 8C illustrate examples of rotating tools that have a flat center portion (hereinafter also referred to as flat center portion rotating tools). FIG. 9A to FIG. 9C illustrate examples of rotating tools that have a convex curved surface center portion (hereinafter also referred to as convex center portion rotating tools). FIG. 10A to FIG. 10C illustrate examples of rotating tools that have a concave curved surface center portion (hereinafter also referred to as concave center portion rotating tools).

In a flat center portion rotating tool as illustrated in FIG. 8A to FIG. 8C, for example, the center portion in contact with the material to be joined consists of one plane perpendicular to the tool rotation axis. FIG. 8A illustrates an example of a flat center portion rotating tool without a stepped portion. FIG. 8B illustrates an example of a flat center portion rotating tool with a spiral-shaped stepped portion provided to the outer circumferential portion and spiraling in the same direction as the direction of rotation. FIG. 8C illustrates an example of a flat center portion rotating tool with a spiral-shaped stepped portion provided to the outer circumferential portion and spiraling in the opposite direction to the direction of rotation.

In a convex center portion rotating tool such as illustrated in FIG. 9A to FIG. 9C, for example, the center portion in contact with the material to be joined has a continuous shape and a substantially uniformly sloped surface. More specifically, the leading end of the center portion constitutes a single curved surface (paraboloid, prolate spherical, or spherical) projecting from the center portion toward the center. Further, as illustrated in FIG. 9A to FIG. 9C, a cross section of the leading end of the center portion (cross section including the axis of rotation and parallel to the axis of rotation) has a curved shape with a substantially uniform curvature radius. FIG. 9A illustrates an example of a convex center portion rotating tool without a stepped portion. FIG. 9B illustrates an example of a convex center portion rotating tool with a spiral-shaped stepped portion provided to the outer circumferential portion and spiraling in the same direction as the direction of rotation. FIG. 9C illustrates an example of a convex center portion rotating tool with a spiral-shaped stepped portion provided to the outer circumferential portion and spiraling in the opposite direction to the direction of rotation.

In a concave center portion rotating tool such as illustrated in FIG. 10A to FIG. 10C, the center portion in contact with the material to be joined has a continuous shape and a substantially uniformly sloped surface. More specifically, the leading end of the center portion constitutes a single curved surface (paraboloid, prolate spherical, or spherical) recessing from the periphery of the center portion toward the center. Further, as illustrated in FIG. 10A to FIG. 10C, a cross section of the leading end of the center portion (cross section including the axis of rotation and parallel to the axis of rotation) has a curved shape with a substantially uniform curvature radius. FIG. 10A illustrates an example of a concave center portion rotating tool without a stepped portion. FIG. 10B illustrates an example of a concave center portion rotating tool with a spiral-shaped stepped portion provided to the outer circumferential portion and spiraling in the same direction as the direction of rotation. FIG. 10C illustrates an example of a concave center portion rotating tool with a spiral-shaped stepped portion provided to the outer circumferential portion and spiraling in the opposite direction to the direction of rotation.

The higher the curved surface height of the convex center portion rotating tool, the greater the ability to cause plastic flow during joining (hereinafter also referred to as plastic flow ability). The deeper the curved surface depth of the concave center portion rotating tool, the less the plastic flow ability. A flat center portion rotating tool has a plastic flow ability that is about halfway between that of a convex center portion rotating tool and a concave center portion rotating tool. In this way, the plastic flow ability is adjustable by adjusting the shape of the center portion of the rotating tool, and therefore appropriate selection of shape and size of the center portion is preferred, according to the strength and required properties of the material to be joined. For example, when the diameter $D_1$ of the center portion of the rotating tool is 5.0 mm to 15.0 mm, the curved surface height of a convex center portion rotating tool is preferably 0.2 mm to 1.4 mm and the curved surface depth of a concave center portion rotating tool is preferably 0.2 mm to 1.4 mm.

As illustrated in FIG. 11A to FIG. 14C, a spiral-shaped (helical) stepped portion spiraling opposite the direction of rotation may be provided to the center portion of the rotating tool. The form of the stepped portion other than the direction of the spiral is the same as the form of the stepped portion provided to the outer circumferential portion described above. For example, a spiral-shaped stepped portion is defined by a radial curve (spiral) starting from the center of the leading end of the rotating tool or from the periphery of a center circle of the leading end of the rotating tool and extending to the periphery of the center portion (center portion-outer circumferential portion boundary). The center circle of the leading end of the rotating tool is a circle having a diameter less than the center portion diameter, centered at the center of the leading end of the rotating tool (location of the axis of rotation). Further, the number of spirals defining the stepped portion may be one or more. However, when the number of spirals defining the stepped portion exceeds six, the effect of promoting material flow becomes less effective. Further, the complexity of the shape may increase susceptibility to breakage. Accordingly, the number of spirals defining the stepped portion is preferably six or less.

Figure 11A:
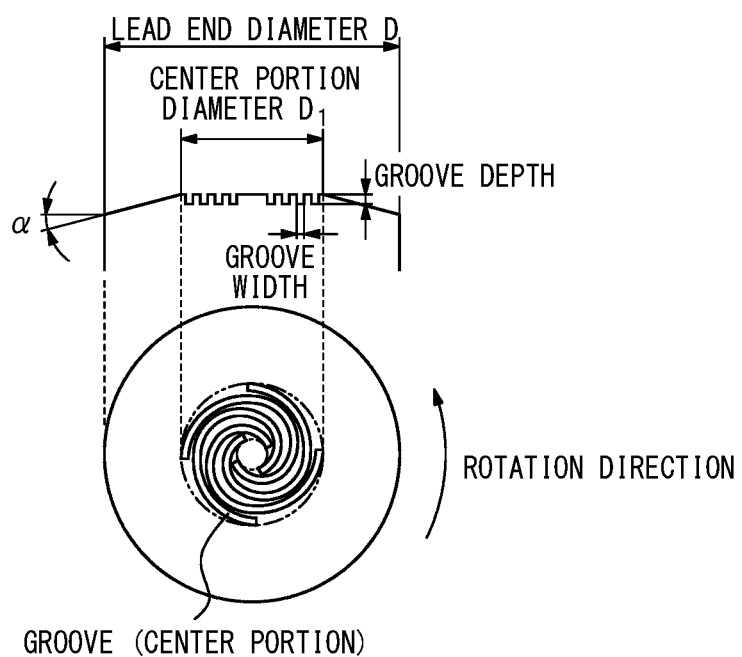
FIG. 11A is a schematic diagram illustrating an example of shape of a rotating tool (flat center portion rotating tool with concave-shaped stepped portion provided to center portion) used in an electrical steel strip friction stir welding method according to an embodiment of the present disclosure.
Figure 11B:
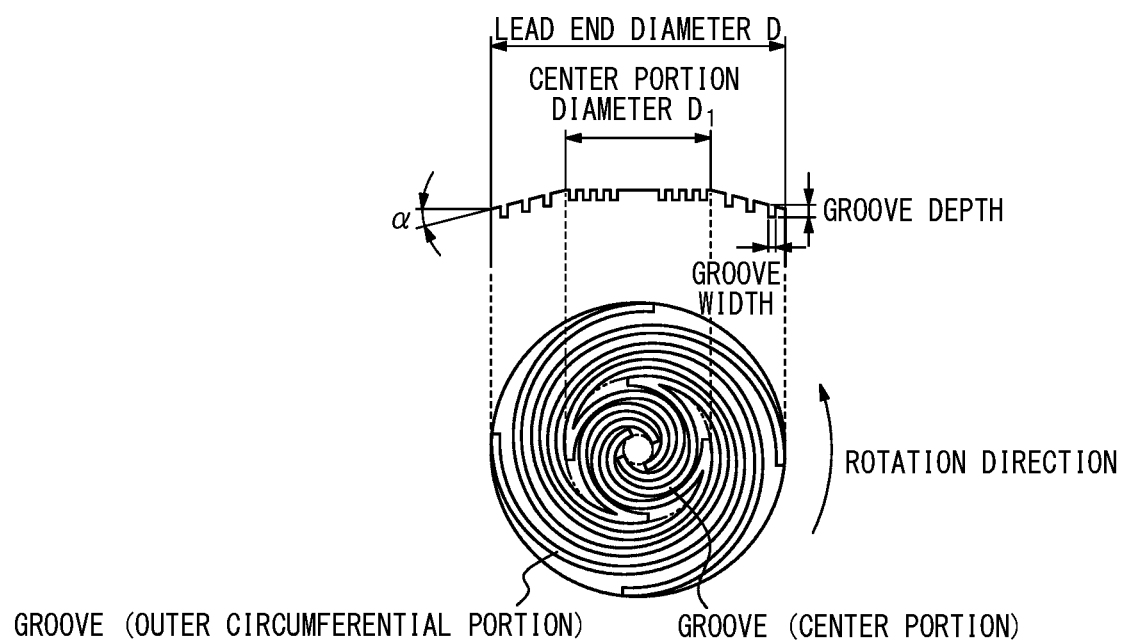
FIG. 11B is a schematic diagram illustrating an example of shape of a rotating tool (flat center portion rotating tool with concave-shaped stepped portion provided to center portion and outer circumferential portion) used in an electrical steel strip friction stir welding method according to an embodiment of the present disclosure.
Figure 11C:
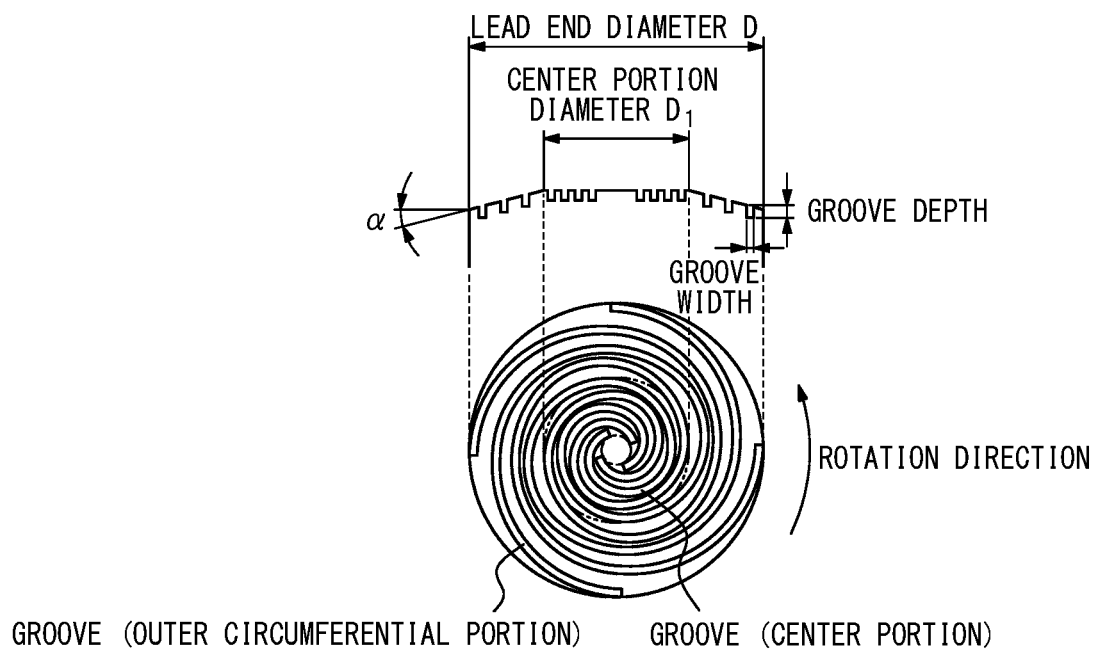
FIG. 11C is a schematic diagram illustrating an example of shape of a rotating tool (flat center portion rotating tool with concave-shaped stepped portion provided to center portion and outer circumferential portion) used in an electrical steel strip friction stir welding method according to an embodiment of the present disclosure.

FIG. 11A illustrates an example of a flat center portion rotating tool with a stepped portion provided only to the center portion. FIG. 11B illustrates an example of a flat center portion rotating tool with a stepped portion provided to the center portion and a spiral-shaped stepped portion provided to the outer circumferential portion that spirals in the same direction as the direction of rotation. FIG. 11C illustrates an example of a flat center portion rotating tool with a stepped portion provided to the center portion and a spiral-shaped stepped portion provided to the outer circumferential portion that spirals in the opposite direction to the direction of rotation.

Figure 12A:
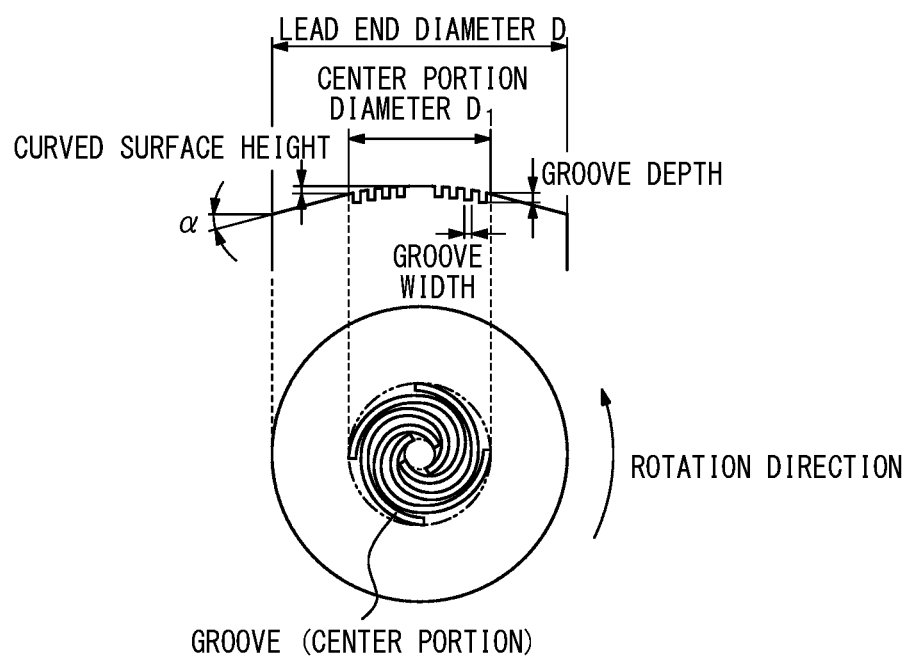
FIG. 12A is a schematic diagram illustrating an example of shape of a rotating tool (convex center portion rotating tool with concave-shaped stepped portion provided to center portion) used in an electrical steel strip friction stir welding method according to an embodiment of the present disclosure.
Figure 12B:
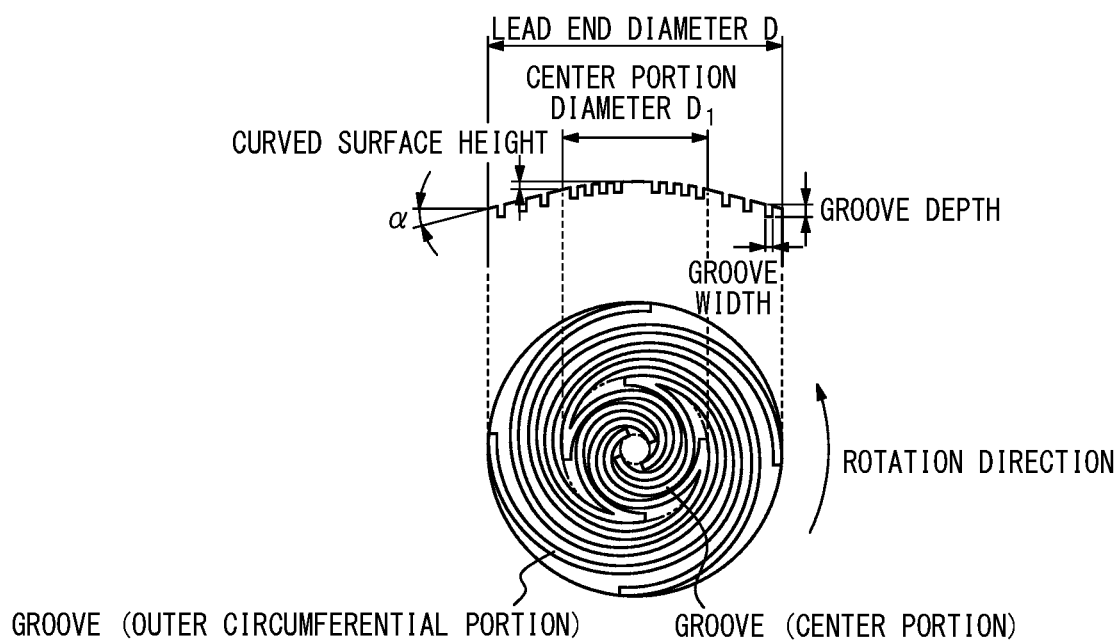
FIG. 12B is a schematic diagram illustrating an example of shape of a rotating tool (convex center portion rotating tool with concave-shaped stepped portion provided to center portion and outer circumferential portion) used in an electrical steel strip friction stir welding method according to an embodiment of the present disclosure.
Figure 12C:
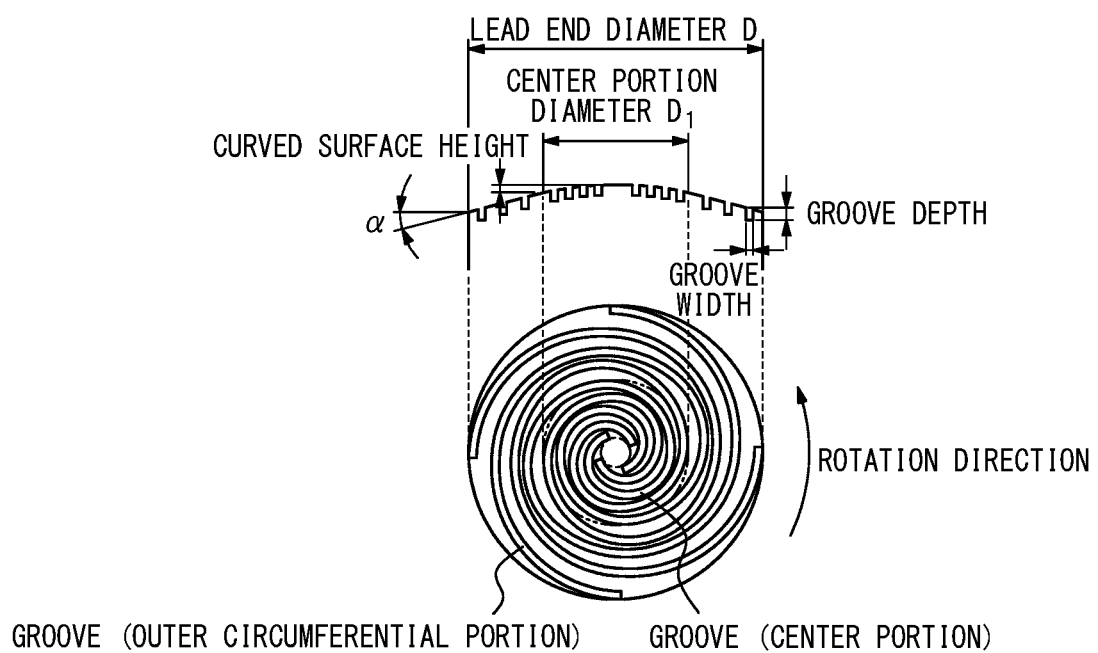
FIG. 12C is a schematic diagram illustrating an example of shape of a rotating tool (convex center portion rotating tool with concave-shaped stepped portion provided to center portion and outer circumferential portion) used in an electrical steel strip friction stir welding method according to an embodiment of the present disclosure.

FIG. 12A illustrates an example of a convex center portion rotating tool with a stepped portion provided only to the center portion. FIG. 12B illustrates an example of a convex center portion rotating tool with a stepped portion provided to the center portion and a spiral-shaped stepped portion provided to the outer circumferential portion that spirals in the same direction as the direction of rotation. FIG. 12C illustrates an example of a convex center portion rotating tool with a stepped portion provided to the center portion and a spiral-shaped stepped portion provided to the outer circumferential portion that spirals in the opposite direction to the direction of rotation.

Figure 13A:
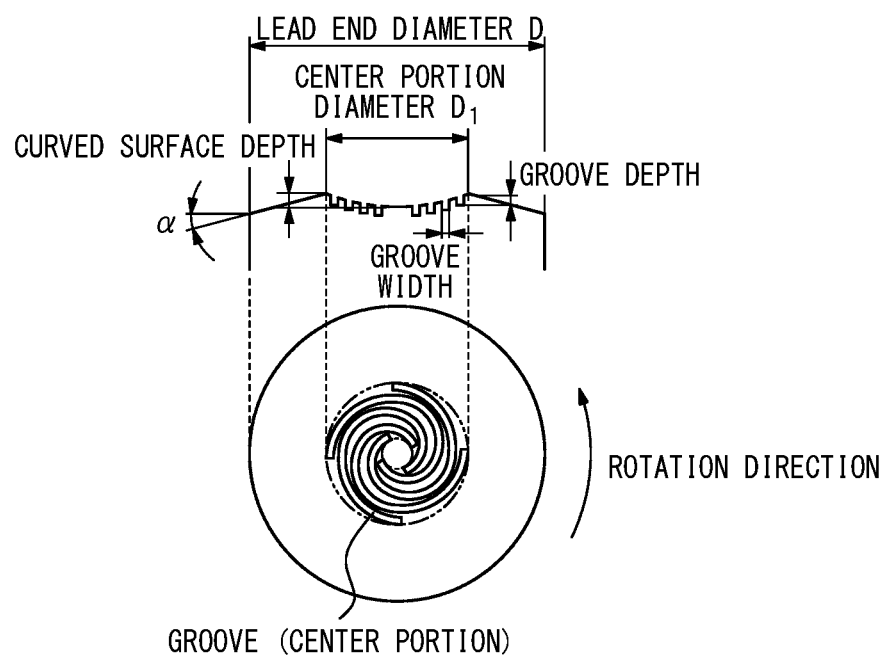
FIG. 13A is a schematic diagram illustrating an example of shape of a rotating tool (concave center portion rotating tool with concave-shaped stepped portion provided to center portion) used in an electrical steel strip friction stir welding method according to an embodiment of the present disclosure.
Figure 13B:
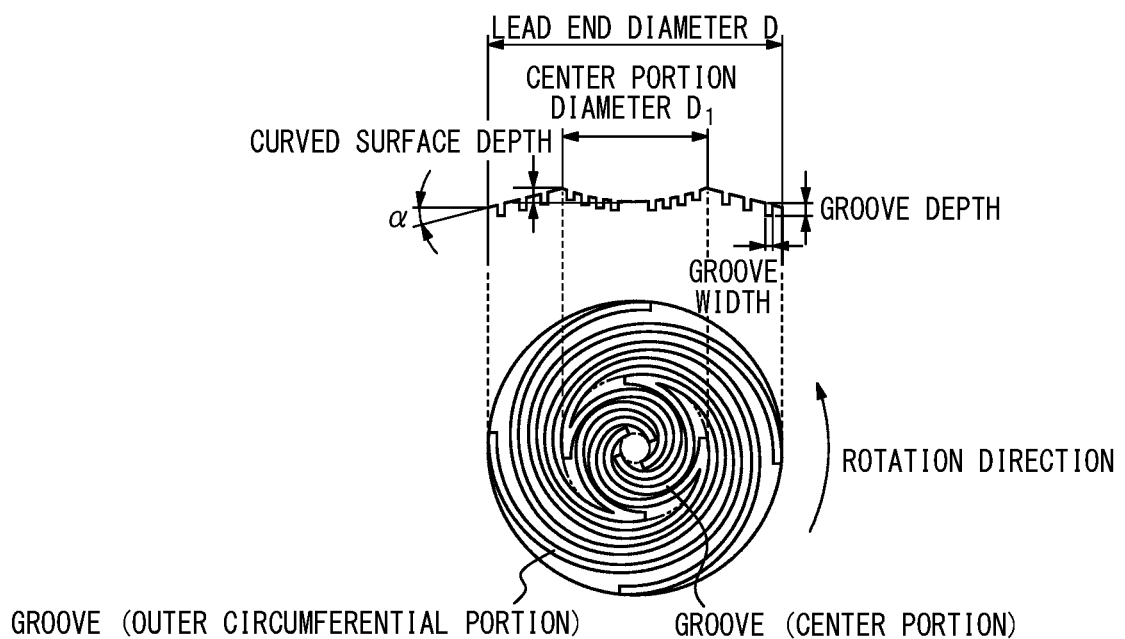
FIG. 13B is a schematic diagram illustrating an example of shape of a rotating tool (concave center portion rotating tool with concave-shaped stepped portion provided to center portion and outer circumferential portion) used in an electrical steel strip friction stir welding method according to an embodiment of the present disclosure.
Figure 13C:
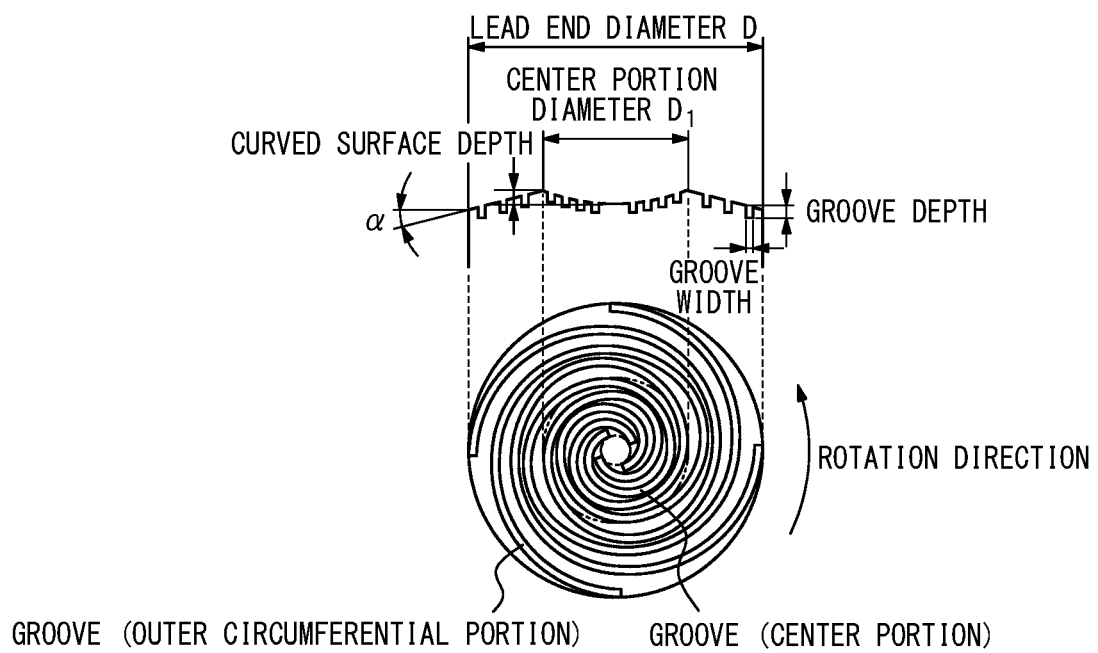
FIG. 13C is a schematic diagram illustrating an example of shape of a rotating tool (concave center portion rotating tool with concave-shaped stepped portion provided to center portion and outer circumferential portion) used in an electrical steel strip friction stir welding method according to an embodiment of the present disclosure.

FIG. 13A illustrates an example of a concave center portion rotating tool with a stepped portion provided only to the center portion. FIG. 13B illustrates an example of a concave center portion rotating tool with a stepped portion provided to the center portion and a spiral-shaped stepped portion provided to the outer circumferential portion that spirals in the same direction as the direction of rotation. FIG. 13C illustrates an example of a concave center portion rotating tool with a stepped portion provided to the center portion and a spiral-shaped stepped portion provided to the outer circumferential portion that spirals in the opposite direction to the direction of rotation.

Figure 14A:
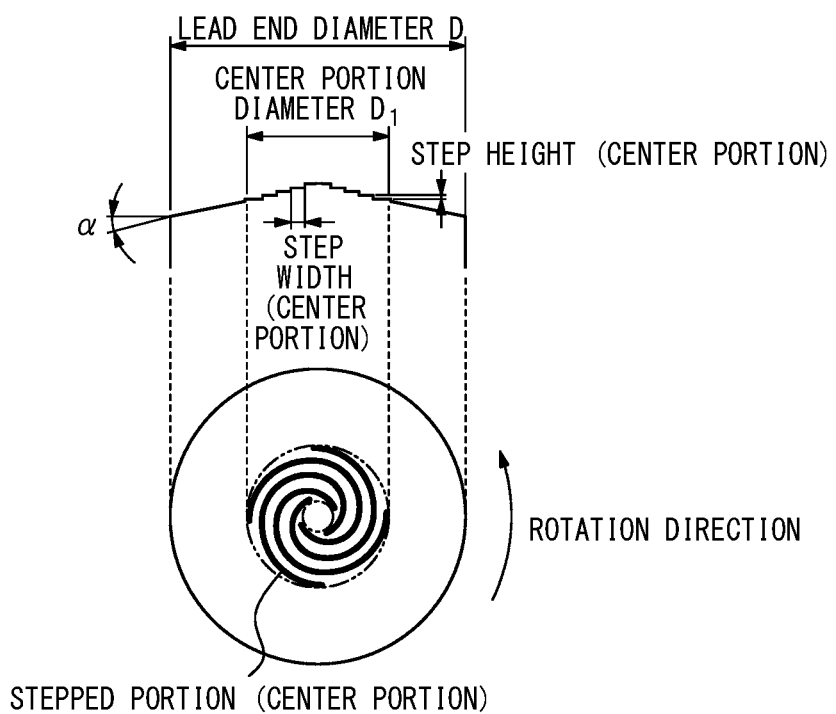
FIG. 14A is a schematic diagram illustrating an example of shape of a rotating tool (convex center portion rotating tool with step-like stepped portion provided to center portion) used in an electrical steel strip friction stir welding method according to an embodiment of the present disclosure.
Figure 14B:
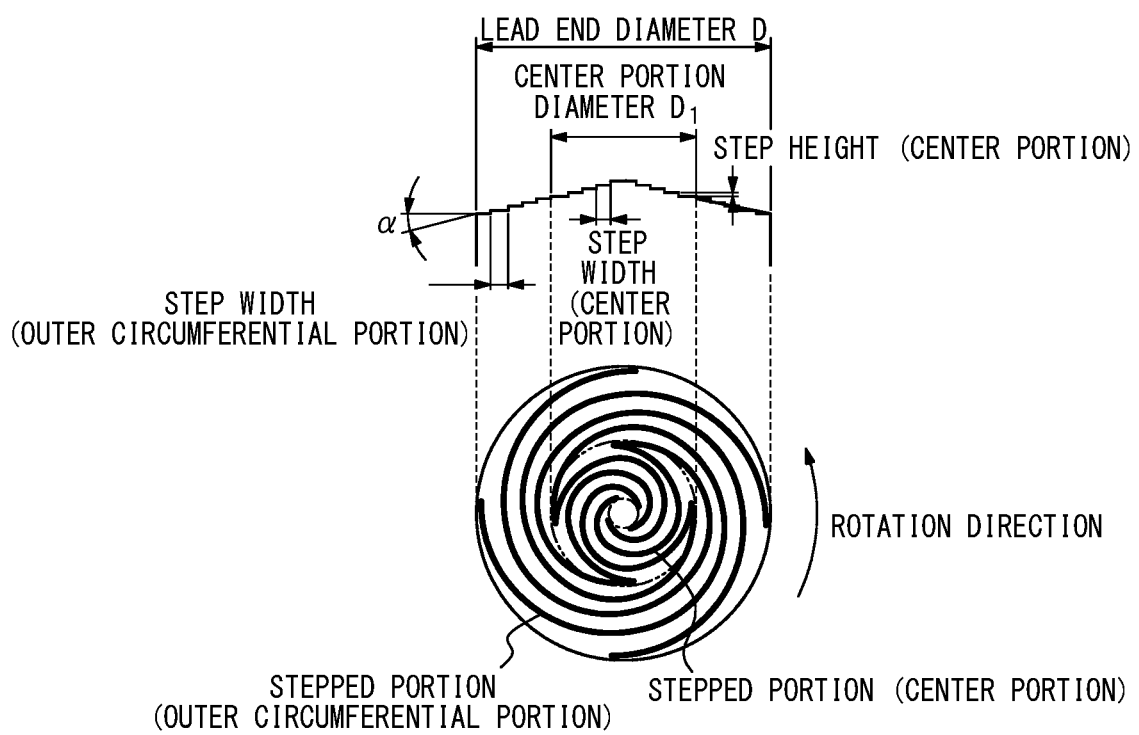
FIG. 14B is a schematic diagram illustrating an example of shape of a rotating tool (convex center portion rotating tool with step-like stepped portion provided to center portion and outer circumferential portion) used in an electrical steel strip friction stir welding method according to an embodiment of the present disclosure.
Figure 14C:
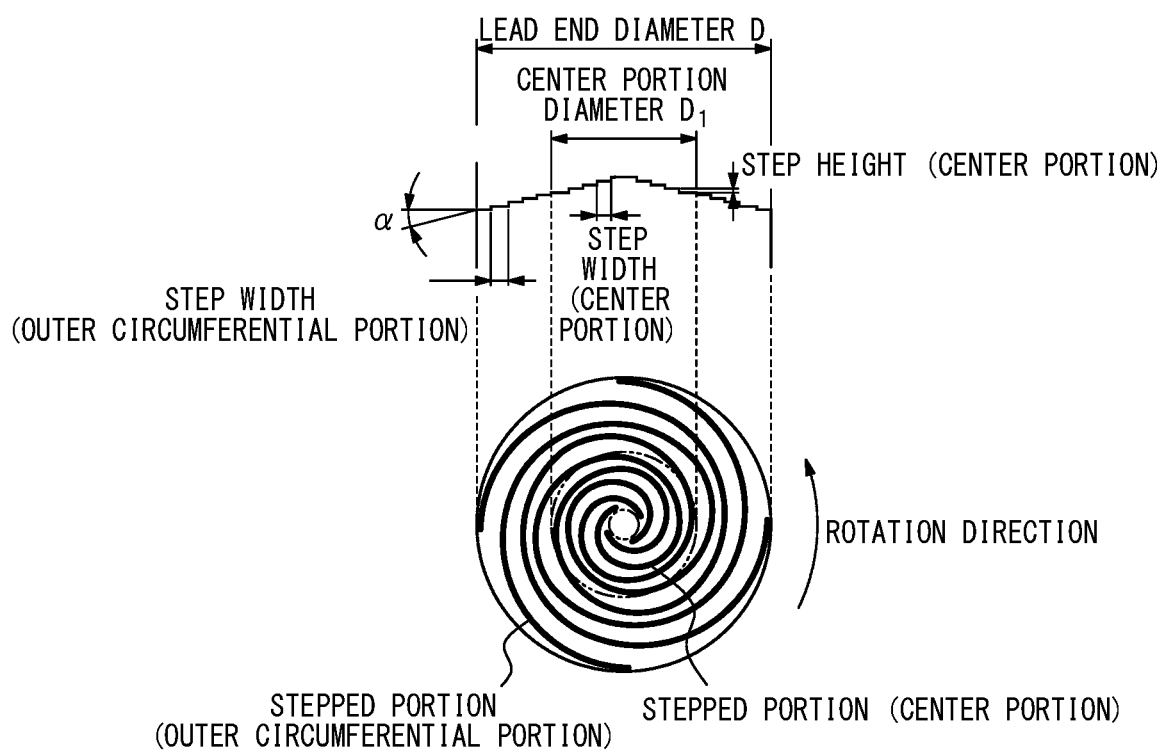
FIG. 14C is a schematic diagram illustrating an example of shape of a rotating tool (convex center portion rotating tool with step-like stepped portion provided to center portion and outer circumferential portion) used in an electrical steel strip friction stir welding method according to an embodiment of the present disclosure.

In FIG. 11A to FIG. 13C, all examples illustrate a concave-shape (grooved) form of the stepped portion of the center portion, but as in FIG. 14A to FIG. 14C, the form of the stepped portion of the central portion may be step-like. FIG. 14A illustrates an example of a convex center portion rotating tool with a step-like stepped portion provided only to the center portion. FIG. 14B illustrates an example of a convex center portion rotating tool with a step-like stepped portion provided to the center portion and a spiral-shaped stepped portion provided to the outer circumferential portion that spirals in the same direction as the direction of rotation.

FIG. 14C illustrates an example of a convex center portion rotating tool with a step-like stepped portion provided to the center portion and a spiral-shaped stepped portion provided to the outer circumferential portion that spirals in the opposite direction to the direction of rotation.

Further, as with the outer circumferential portion, the form and shape of the stepped portion provided to the center portion may also adjust the plastic flow ability. Accordingly, appropriate selection of shape and size of the stepped portion provided to the outer circumferential portion and the center portion is preferred, according to the strength and required properties of the material to be joined.

Further, as illustrated in FIG. 6, a probe that shares the axis of rotation with the rotating tool may be provided to the center portion of the rotating tool. The probe is a discontinuous shape with the center portion of the rotating tool and protrudes substantially perpendicularly toward the material to be joined (not illustrated). Probe dimensions and the like are not particularly limited and may be set according to the shape and dimensions of the center portion. For example, when the diameter $D_1$ of the center portion of the rotating tool is 5.0 mm to 15.0 mm, the probe diameter is preferably 2.0 mm to 5.0 mm and the probe length is preferably 0.1 mm to 1.5 mm.

Further, when t1 and t2 are different, to make the steel microstructures of the joined portion and the thermo-mechanically affected zone formed by joining be mainly ferrite phase and satisfy the relationships of the above Expressions (1) through (4), satisfying the relationships of Expressions (10) and (11) instead of the above Expressions (7) through (9) is preferred. That is, the diameter $D^1$ (mm) of the center portion of the rotating tool preferably satisfies the relationship of the following Expression (10), and rotation speed RS (r/min) of the rotating tool, the diameter $D_1$ (mm) of the center portion of the rotating tool, and joining speed JS (mm/min), expressed as $RS \times D_1^3/JS$, preferably satisfy the relationship of the following Expression (11).

$$4 \times TJ \le D_1 \le 10 \times TJ \quad (10)$$

$$200 \times TJ \le RS \times D_1^3 / JS \le 2000 \times TJ \quad (11)$$

Here, TJ is defined such that, when the unjoined portion is the butted portion, TJ is an average value (mm) of the thickness of the first electrical steel strip and the thickness of the second electrical steel strip, and when the unjoined portion is the overlapped portion, TJ is the thickness (mm) of the overlapped portion.

In other words, appropriately controlling the diameter $D_1$ of the center portion of the rotating tool (hereinafter also simply referred to as the center portion diameter $D_1$) according to the thickness of the unjoined portion, in order to satisfy the relationship of the above Expression (10), is important. This effectively imparts to the material to be joined, that is, the first electrical steel strip and the second electrical steel strip, a temperature increase due to frictional heat generated between the rotating tool and the material to be joined, and a shear stress due to frictional force. Here, when the center portion diameter $D_1$ is less than 4×TJ (mm), obtaining sufficient plastic flow and satisfying the defined relationship may be difficult. On the other hand, when the center portion diameter $D_1$ exceeds 10×TJ (mm), the region where plastic flow occurs is unnecessarily expanded, and an excessive amount of heat is injected into the joined portion. This may coarsen the recrystallized microstructure of the joined portion, making satisfying the defined relationship difficult. Therefore, to make conditions satisfy the defined relationship, the center portion diameter $D_1$ preferably satisfies the relationship of the above Expression (10). The center portion diameter $D_1$ is more preferably 5.5×TJ (mm) or more. The center portion diameter $D_1$ is more preferably 8×TJ (mm) or less.

Further, $RS \times D_1^3/JS$ is a parameter that correlates with the amount of heat generated per unit joint length. By setting the range of $RS \times D_1^3/JS$ from 200×TJ to 2000×TJ, the temperature rise due to the frictional heat generated between the rotating tool and the material to be joined and the shear stress due to the frictional force may be effectively imparted to the material to be joined, that is, the first electrical steel strip and the second electrical steel strip. Here, when $RS \times D_1^3/JS$ is less than 200×TJ, the amount of heat generated may be insufficient. Therefore, forming a joining interface in a metallurgically joined state at mating surfaces of the first electrical steel strip and the second electrical steel strip may become difficult. On the other hand, when $RS \times D_1^3/JS$ exceeds 2000×TJ, the amount of heat generated by friction stirring becomes excessive, and an excessive amount of heat may be injected into the joined portion. This increases the peak temperature (the maximum arrival temperature) and decreases the cooling rate of the joined portion, which leads to coarsening of the recrystallized microstructure of the joined portion. Therefore, the relationship of the above Expression (11) is preferably satisfied for $RS \times D_1^3/JS$. $RS \times D_1^3/JS$ is more preferably 280×TJ or more. $RS \times D_1^3/JS$ is more preferably 1600×TJ or less.

When the rotation speeds RS and/or the center portion diameters $D_1$ of the rotating tools are different between the front side rotating tool and the back side rotating tool, the relationships of the above Expressions (10) and (11) are preferably satisfied for the front side rotating tool and the back side rotating tool, respectively.

In addition, when a step is provided to only one side at the butted portion of the end of the first electrical steel strip and the end of the second electrical steel strip, it is preferred that:

the advancing side of the rotating tool disposed on the side with the step is on the side of the electrical steel strip that has the smaller thickness of the first electrical steel strip and the second electrical steel strip, and the retreating side of the rotating tool disposed on the side with the step is on the side of the electrical steel strip that has the greater thickness of the first electrical steel strip and the second electrical steel strip.

Specifically, as illustrated in FIG. 3C, when the thickness of the first electrical steel strip is less than the thickness of the second electrical steel strip, and a step is provided only on the upper vertical side (front side) at the butted portion of the end of the first electrical steel strip and the end of the second electrical steel strip, then the advancing side of the front side rotating tool is preferably on the first electrical steel strip side and the retreating side of the front side rotating tool is preferably on the second electrical steel strip side.

The advancing side is the side where the rotation direction of the rotating tool and the joining direction are in the same direction, and the retreating side is the side where the rotation direction of the rotating tool and the joining direction are opposed.

Conditions other than those described above are not particularly limited, and a conventional method may be used.

[3] Method of Producing Electrical Steel Strip

The following describes a method of producing an electrical steel strip according to an embodiment of the present disclosure.

The method of producing an electrical steel strip according to an embodiment of the present disclosure includes:
joining a first electrical steel strip and a second electrical steel strip by the electrical steel strip friction stir welding method according to an embodiment of the present disclosure to obtain a joined steel strip; and
cold rolling the joined steel strip to obtain a cold-rolled steel strip.

Here, the joined steel strip preferably includes the first electrical steel strip, the second electrical steel strip, and the electrical steel strip welded joint according to an embodiment of the present disclosure, where the first electrical steel strip and the second electrical steel strip are joined via the electrical steel strip welded joint according to an embodiment of the present disclosure.

Further, cold rolling conditions are not particularly limited, and may be in accordance with a conventional method. Further, pickling may optionally be performed prior to cold rolling.

EXAMPLES

Functions and effects of the present disclosure are described below with reference to Examples. However, the present disclosure is not limited to the following Examples.

Example 1

Electrical steel strips having the chemical compositions listed in Table 1 (the balance being Fe and inevitable impurity) were used as the material to be joined (the first electrical steel strip and the second electrical steel strip). The first electrical steel strip (preceding steel strip) and the second electrical steel strip (trailing steel strip) were then joined by friction stir welding under the conditions listed in Tables 2 and 3, simulating being on a continuous cold rolling line, to produce the electrical steel strip welded joint. Here, in the case of a butt joint, the groove was a so-called I-type groove with no groove angle to the ends of the two electrical steel strips to be joined, and the two electrical steel strips were butted and joined with a surface state equivalent to that of milling. The same was true for the cases listed in Table 4 below. Average values of ferrite grain size, average values of hardness, and Erichsen values of the base metal portion of the electrical steel strips are also listed in Table 1. Here, the average values of ferrite grain size and the average values of hardness of the base metal portion of the electrical steel strips were obtained by the methods described above. Further, the Erichsen values were measured in accordance with the Erichsen test method specified in JIS Z 2247. Conditions not specified were set in accordance with conventional methods.

In single-sided friction stir welding, in the case of a butt joint as illustrated in FIG. 2A, the rotating tool was rotated clockwise when viewed from the vertical upper side (counterclockwise when the lead end of the rotating tool is viewed from the front). Further, in each case, one of the three types of rotating tool with the cross section dimensions and shapes illustrated in FIG. 4A to FIG. 4C was used. Each of the rotating tools was made of tungsten carbide (WC) with a Vickers hardness of HV 1090, which was harder than the material to be joined. Further, when the thicknesses of the first electrical steel strip and the second electrical steel strip were different, the butted portion of the first electrical steel strip and the second electrical steel strip was made with the back side (side of surface plate) having no step and the front side (the side where the rotating tool was disposed) having a step.

Further, in the case of a lap joint as illustrated in FIG. 2C, joining was performed such that the first electrical steel strip (preceding steel strip) was on the upper side of the overlap and the second electrical steel strip (trailing steel strip) was on the lower side of the overlap. The direction of rotation of the rotating tool and the shape of the rotating tool were the same as in the case of a butt joint.

In double-sided friction stir welding, in the case of a butt joint as illustrated in FIG. 3A, the front side rotating tool disposed on the vertically upper side was rotated clockwise when viewed from the vertically upper side, and the back side rotating tool disposed on the vertically lower side was rotated counterclockwise when viewed from the vertically upper side. That is, both were rotated counterclockwise when viewed from in front of the lead end of the rotating tool. Further, in each case, one of the three types of rotating tool with the cross section dimensions and shapes illustrated in FIG. 5A to FIG. 5C was used. Further, the front side rotating tool and the back side rotating tool had the same cross section dimensions and shape as each other. Each of the rotating tools was made of tungsten carbide (WC) with a Vickers hardness of HV 1090, which was harder than the material to be joined. Further, when the thicknesses of the first electrical steel strip and the second electrical steel strip were different, the butted portion of the first electrical steel strip and the second electrical steel strip was made with the back side (the side where the back side rotating tool was disposed) having no step and the front side (the side where the front side rotating tool was disposed) having a step.

Further, in the case of a lap joint, joining was performed such that the first electrical steel strip (preceding steel strip) was on the upper side of the overlap and the second electrical steel strip (trailing steel strip) was on the lower side of the overlap. The direction of rotation of the rotating tools and the shape of the rotating tools were the same as in the case of a butt joint.

Further, for comparison, the material to be joined (the first electrical steel strip and the second electrical steel strip) listed in Table 4 was joined by laser welding under the conditions listed in Table 4 to produce an electrical steel strip welded joint.

For the laser welding, a $CO_2$ laser oscillator with a maximum output of 5.5 kW was used. Helium was used as the shielding gas, and the shielding gas flow rate was 40 L/min. In Table 4, an entry of "no" under "filler wire addition" indicates welding without filler wire. Further, in Table 4, an entry of "yes" under "filler wire addition" indicates welding using a metal inert gas (MIG) welding wire (0.9 mm diameter) having a chemical composition listed in Table 5 (the balance being Fe and inevitable impurity) as filler wire.

The electrical steel strip welded joints obtained as described above were all sound and free of defects both on exterior and interior surfaces.

For the electrical steel strip welded joints thus obtained, the joined portion, the thermo-mechanically affected zone, and the base metal portion were defined as described above.

Further, the following were measured as described above:
Dsz: average value (μm) of ferrite grain size of the joined portion, Dhaz1: average value (μm) of ferrite grain size of the thermo-mechanically affected zone on the first electrical steel strip side,
Dhaz2: average value (μm) of ferrite grain size of the thermo-mechanically affected zone on the second electrical steel strip side,
Dbm1: average value (μm) of ferrite grain size of the base metal portion of the first electrical steel strip,
Dbm2: average value (μm) of ferrite grain size of the base metal portion of the second electrical steel strip,
Hsz: average value of hardness of the joined portion,
Hbm1: average value of hardness of the base metal portion of the first electrical steel strip, and
Hbm2: average value of hardness of the base metal portion of the second electrical steel strip.

Further, cross sections in the vertical direction of the electrical steel strip welded joints (the plane illustrated in FIG. 1A (that is, the plane including the perpendicular-to-joining direction and the thickness direction)) were each measured for TszL: minimum value (mm) of joined portion thickness and TszH: maximum value (mm) of joined portion thickness.

In the electrical steel strip welded joint obtained by laser welding, the welded portion was regarded as the joined portion and the heat-affected zone as the thermo-mechanically affected zone for the above measurements. The measurement procedures and the like were the same as that for an electrical steel strip welded joint obtained by friction stir welding.

The results are listed in Tables 6 and 7.

The electrical steel strip welded joints were evaluated for effectiveness in inhibiting the occurrence of coil joint fractures in a production line (hereinafter also referred to as fracture inhibition effect) in the following way.

Test pieces were collected from each of the electrical steel strip welded joints so that the joined portion, the thermo-mechanically affected zone and base metal on the first electrical steel strip side, and the thermo-mechanically affected zone and base metal on the second electrical steel strip side were included. Then, using the collected test pieces, the Erichsen values of the welded joints were measured in accordance with the Erichsen test method specified in JIS Z 2247. The ratio of the Erichsen value of the welded joint to the Erichsen value of the base metal portion (hereinafter also referred to as the Erichsen value ratio) was used to evaluate the fracture inhibition effect based on the following criteria. Results are listed in Table 8.

[Erichsen value ratio (%)] = [Erichsen value of welded joint]/
[Erichsen value of base metal portion] × 100

O (Pass): Erichsen value ratio of 80% or more
x (Fail): Erichsen value ratio of less than 80%.

When the Erichsen value of the base metal portion of the first electrical steel strip and the Erichsen value of the base metal portion of the second electrical steel strip were different, the Erichsen value of the base metal portion was considered to be the smaller of the Erichsen value of the base metal portion of the first electrical steel strip and the Erichsen value of the base metal portion of the second electrical steel strip.

TABLE 1

| Steel sample ID | Thickness (mm) | Chemical composition (mass %) | | | | | Average ferrite grain size in base metal portion (μm) | Average hardness of base metal portion | Erichsen value of base metal portion (mm) |
|---|---|---|---|---|---|---|---|---|---|
| | | C | Si | Mn | P | S | | | |
| B1-1 | 2.0 | 0.02 | 2.5 | 0.01 | 0.015 | 0.006 | 280 | 219 | 12.4 |
| B1-2 | 2.6 | 0.02 | 2.5 | 0.01 | 0.015 | 0.006 | 280 | 219 | 13.5 |
| B2-1 | 2.0 | 0.01 | 3.5 | 0.02 | 0.012 | 0.006 | 310 | 242 | 3.5 |
| B2-2 | 2.6 | 0.01 | 3.5 | 0.02 | 0.012 | 0.006 | 310 | 242 | 3.8 |

TABLE 2

| | Joint type | Joining method | Material to be joined | | | | | | Rotating tool | | | | | Joining conditions | | |
|---|---|---|---|---|---|---|---|---|---|---|---|---|---|---|---|---|
| | | | First electrical steel strip | | Second electrical steel strip | | | | | | | | | | | |
| | | | Steel sample ID | Thickness t1 (mm) | Steel sample ID | Thickness t2 (mm) | t (mm) | TJ (mm) | Shape | Shoulder diameter D (mm) | Pin diameter (mm) | Pin length (mm) | Tilt angle θ (°) | Depth (mm) | Rotation speed RS (r/min) | Joining speed JS (mm/min) | RS × $D^3$/JS |
| Example 1 | Butt | Single-sided | B1-1 | 2.0 | B1-1 | 2.0 | 2.0 | 2.0 | FIG 4A | 13 | 4 | 1.8 | 3 | 1.90 | 400 | 200 | 4394 |
| Example 2 | Butt | Single-sided | B1-2 | 2.6 | B1-2 | 2.6 | 2.6 | 2.6 | FIG. 4C | 21 | 6.7 | 2.4 | 3 | 2.50 | 300 | 200 | 13892 |
| Example 3 | Butt | Single-sided | B2-1 | 2.0 | B2-1 | 2.0 | 2.0 | 2.0 | FIG. 4A | 13 | 4 | 1.8 | 3 | 1.90 | 400 | 200 | 4394 |
| Example 4 | Butt | Single-sided | B2-2 | 2.6 | B2-2 | 2.6 | 2.6 | 2.6 | FIG. 4B | 18 | 5.5 | 2.1 | 3 | 2.60 | 300 | 200 | 8748 |

TABLE 2-continued

| | | | Material to be joined | | | | | | Rotating tool | | | | Joining conditions | | |
| | | | First electrical steel strip | | Second electrical steel strip | | | | | | | | | | Rotation speed | Joining speed |
| | Joint type | Joining method | Steel sample ID | Thickness t1 (mm) | Steel sample ID | Thickness t2 (mm) | t (mm) | TJ (mm) | Shape | Shoulder diameter D (mm) | Pin diameter (mm) | Pin length (mm) | Tilt angle θ (°) | Depth (mm) | RS (r/min) | JS (mm/min) | RS × D³/JS |
|---|---|---|---|---|---|---|---|---|---|---|---|---|---|---|---|---|---|
| Example 5 | Butt | Single-sided | B1-1 | 2.0 | B2-1 | 2.0 | 2.0 | 2.0 | FIG. 4A | 13 | 4 | 1.8 | 3 | 1.90 | 400 | 200 | 4394 |
| Example 6 | Butt | Single-sided | B1-2 | 2.6 | B2-2 | 2.6 | 2.6 | 2.6 | FIG. 4C | 21 | 6.7 | 2.4 | 3 | 2.50 | 300 | 200 | 13892 |
| Example 7 | Butt | Single-sided | B1-1 | 2.0 | B1-2 | 2.6 | 2.3 | 2.3 | FIG. 4B | 18 | 5.5 | 2.1 | 3 | 2.20 | 400 | 200 | 11664 |
| Example 8 | Lap | Single-sided | B1-1 | 2.0 | B2-1 | 2.0 | 2.0 | 4.0 | FIG. 4C | 21 | 6.7 | 2.4 | 3 | 2.60 | 300 | 200 | 13892 |

TABLE 3

| | | | Material to be joined | | | | | | Rotating tool | | | | Joining conditions | | | | |
| | | | First electrical steel strip | | Second electrical steel strip | | | | | Shoulder | | | | Gap between | Rotation speed | | Joining speed | |
| | Joint type | Joining method | Steel sample ID | Thickness t1 (mm) | Steel sample ID | Thickness t2 (mm) | t (mm) | TJ (mm) | Shape | diameter D (mm) | Pin diameter (mm) | Pin length (mm) | Tilt angle θ (°) | shoulders (mm) | RS (r/min) Front side | RS (r/min) Back side | JS (mm/min) | RS × D³/JS |
|---|---|---|---|---|---|---|---|---|---|---|---|---|---|---|---|---|---|---|
| Example 9 | Butt | Double-sided | B1-1 | 2.0 | B1-1 | 2.0 | 2.0 | 2.0 | FIG. 5A | 13 | 4 | 0.6 | 1.5 | 1.20 | 1000 | 1000 | 2000 | 1099 |
| Example 10 | Butt | Double-sided | B1-2 | 2.6 | B1-2 | 2.6 | 2.6 | 2.6 | FIG. 5C | 21 | 6.7 | 0.9 | 1.5 | 1.50 | 800 | 800 | 2000 | 3704 |
| Example 11 | Butt | Double-sided | B2-1 | 2.0 | B2-1 | 2.0 | 2.0 | 2.0 | FIG. 5A | 13 | 4 | 0.6 | 1.5 | 1.20 | 1000 | 1000 | 2000 | 1099 |
| Example 12 | Butt | Double-sided | B2-2 | 2.6 | B2-2 | 2.6 | 2.6 | 2.6 | FIG. 5C | 21 | 6.7 | 0.9 | 1.5 | 1.50 | 800 | 800 | 2000 | 3704 |
| Example 13 | Butt | Double-sided | B1-1 | 2.0 | B2-1 | 2.0 | 2.0 | 2.0 | FIG. 5A | 13 | 4 | 0.6 | 1.5 | 1.20 | 1000 | 1000 | 2000 | 1099 |
| Example 14 | Butt | Double-sided | B1-2 | 2.6 | B2-2 | 2.6 | 2.6 | 2.6 | FIG. 5C | 21 | 6.7 | 0.9 | 1.5 | 1.50 | 800 | 800 | 2000 | 3704 |
| Example 15 | Butt | Double-sided | B1-1 | 2.0 | B1-2 | 2.6 | 2.3 | 2.3 | FIG. 5B | 18 | 5.5 | 0.8 | 1.5 | 1.40 | 1000 | 1000 | 2000 | 2916 |
| Example 16 | Butt | Double-sided | B1-1 | 2.0 | B2-2 | 2.6 | 2.3 | 2.3 | FIG. 5B | 18 | 5.5 | 0.8 | 1.5 | 1.40 | 1000 | 1000 | 2000 | 2916 |

TABLE 4

| | | | Material to be joined | | | | | | Joining conditions | | | | | |
| | | | First electrical steel strip | | Second electrical steel strip | | | | Gap between | Laser | | | Filler wire addition | |
| | Joint type | Joining method | Steel sample ID | Thickness t1 (mm) | Steel sample ID | Thickness t2 (mm) | t (mm) | TJ (mm) | electrical steel strips (mm) | Laser output (kW) | beam diameter (mm) | Welding speed (mm/min) | Yes or no | Wire feed speed (m/min) |
|---|---|---|---|---|---|---|---|---|---|---|---|---|---|---|
| Comparative Example 1 | Butt | Laser | B1-1 | 2.0 | B1-1 | 2.0 | 2.0 | 2.0 | 0 | 2.5 | 0.5 | 1500 | No | — |
| Comparative Example 2 | Butt | Laser | B1-2 | 2.6 | B1-2 | 2.6 | 2.6 | 2.6 | 0 | 3.0 | 0.5 | 1250 | No | — |
| Comparative Example 3 | Butt | Laser | B2-1 | 2.0 | B2-1 | 2.0 | 2.0 | 2.0 | 0 | 2.5 | 0.5 | 1500 | No | — |
| Comparative Example 4 | Butt | Laser | B2-2 | 2.6 | B2-2 | 2.6 | 2.6 | 2.6 | 0 | 3.0 | 0.5 | 1250 | No | — |
| Comparative Example 5 | Butt | Laser | B1-1 | 2.0 | B1-1 | 2.0 | 2.0 | 2.0 | 0.3 | 5.0 | 0.5 | 1300 | Yes | 3.0 |

TABLE 4-continued

| | | | Material to be joined | | | | | | Joining conditions | | | | | |
|---|---|---|---|---|---|---|---|---|---|---|---|---|---|---|
| | | | First electrical steel strip | | Second electrical steel strip | | | | Gap between | Laser | | | Filler wire addition | |
| | Joint type | Joining method | Steel sample ID | Thickness t1 (mm) | Steel sample ID | Thickness t2 (mm) | t (mm) | TJ (mm) | electrical steel strips (mm) | Laser output (kW) | beam diameter (mm) | Welding speed (mm/min) | Yes or no | Wire feed speed (m/min) |
| Comparative Example 6 | Butt | Laser | B1-2 | 2.6 | B1-2 | 2.6 | 2.6 | 2.6 | 0.3 | 5.0 | 0.5 | 1000 | Yes | 3.0 |
| Comparative Example 7 | Butt | Laser | B2-1 | 2.0 | B2-1 | 2.0 | 2.0 | 2.0 | 0.3 | 5.0 | 0.5 | 1300 | Yes | 3.0 |
| Comparative Example 8 | Butt | Laser | B2-2 | 2.6 | B2-2 | 2.6 | 2.6 | 2.6 | 0.3 | 5.0 | 0.5 | 1000 | Yes | 3.0 |
| Comparative Example 9 | Butt | Laser | B1-1 | 2.0 | B2-1 | 2.0 | 2.0 | 2.0 | 0.3 | 5.0 | 0.5 | 1300 | Yes | 3.0 |
| Comparative Example 10 | Butt | Laser | B1-2 | 2.6 | B2-2 | 2.6 | 2.6 | 2.6 | 0.3 | 5.0 | 0.5 | 1000 | Yes | 3.0 |
| Comparative Example 11 | Butt | Laser | B1-1 | 2.0 | B1-2 | 2.6 | 2.3 | 2.3 | 0.3 | 5.0 | 0.5 | 1200 | Yes | 3.0 |
| Comparative Example 12 | Butt | Laser | B1-1 | 2.0 | B2-2 | 2.6 | 2.3 | 2.3 | 0.3 | 5.0 | 0.5 | 1200 | Yes | 3.0 |

TABLE 5

| Ref. sign | Chemical composition (mass %) | | | | | | | | | |
|---|---|---|---|---|---|---|---|---|---|---|
| | C | Si | Mn | Al | Ti | Ni | Cr | Mo | Nb + Ta | Balance |
| F1 | 0.02 | 0.29 | 0.07 | 0.15 | 0.17 | 61.3 | 22.2 | 9.2 | 3.51 | Fe and impurity |

TABLE 6

| | | | Material to be joined | | | | | | | |
|---|---|---|---|---|---|---|---|---|---|---|
| | | | First electrical steel strip | | | | Second electrical steel strip | | | |
| | Joint type | Joining method | Steel sample ID | Dbm1 (μm) | Hbm1 | Thickness (mm) | Steel sample ID | Dbm2 (μm) | Hbm2 | Thickness (mm) | TbmL (mm) | TbmH (mm) |
| Example 1 | Butt | Single-sided | B1-1 | 280 | 219 | 2.0 | B1-1 | 280 | 219 | 2.0 | 2.0 | 2.0 |
| Example 2 | Butt | Single-sided | B1-2 | 280 | 219 | 2.6 | B1-2 | 280 | 219 | 2.6 | 2.6 | 2.6 |
| Example 3 | Butt | Single-sided | B2-1 | 310 | 242 | 2.0 | B2-1 | 310 | 242 | 2.0 | 2.0 | 2.0 |
| Example 4 | Butt | Single-sided | B2-2 | 310 | 242 | 2.6 | B2-2 | 310 | 242 | 2.6 | 2.6 | 2.6 |
| Example 5 | Butt | Single-sided | B1-1 | 280 | 219 | 2.0 | B2-1 | 310 | 242 | 2.0 | 2.0 | 2.0 |
| Example 6 | Butt | Single-sided | B1-2 | 280 | 219 | 2.6 | B2-2 | 310 | 242 | 2.6 | 2.6 | 2.6 |
| Example 7 | Butt | Single-sided | B1-1 | 280 | 219 | 2.0 | B1-2 | 280 | 219 | 2.6 | 2.0 | 2.6 |
| Example 8 | Lap | Single-sided | B1-1 | 280 | 219 | 2.0 | B2-1 | 310 | 242 | 2.0 | 2.0 | 2.0 |
| Example 9 | Butt | Double-sided | B1-1 | 280 | 219 | 2.0 | B1-1 | 280 | 219 | 2.0 | 2.0 | 2.0 |
| Example 10 | Butt | Double-sided | B1-2 | 280 | 219 | 2.6 | B1-2 | 280 | 219 | 2.6 | 2.6 | 2.6 |
| Example 11 | Butt | Double-sided | B2-1 | 310 | 242 | 2.0 | B2-1 | 310 | 242 | 2.0 | 2.0 | 2.0 |
| Example 12 | Butt | Double-sided | B2-2 | 310 | 242 | 2.6 | B2-2 | 310 | 242 | 2.6 | 2.6 | 2.6 |
| Example 13 | Butt | Double-sided | B1-1 | 280 | 219 | 2.0 | B2-1 | 310 | 242 | 2.0 | 2.0 | 2.0 |
| Example 14 | Butt | Double-sided | B1-2 | 280 | 219 | 2.6 | B2-2 | 310 | 242 | 2.6 | 2.6 | 2.6 |
| Example 15 | Butt | Double-sided | B1-1 | 280 | 219 | 2.0 | B1-2 | 280 | 219 | 2.6 | 2.0 | 2.6 |
| Example 16 | Butt | Double-sided | B1-1 | 280 | 219 | 2.0 | B2-2 | 310 | 242 | 2.6 | 2.0 | 2.6 |

| | Joined portion | | | | | Thermo-mechanically affected zone | | | |
|---|---|---|---|---|---|---|---|---|---|
| | | | | | | First electrical steel strip side | | Second electrical steel strip side | |
| | Ferrite phase area ratio (%) | Dsz (μm) | Hsz | TszL (mm) | TszH (mm) | Ferrite phase area ratio (%) | Dhaz1 (μm) | Ferrite phase area ratio (%) | Dhaz2 (μm) |
| Example 1 | 100 | 29 | 253 | 1.8 | 2.0 | 100 | 181 | 100 | 195 |
| Example 2 | 100 | 51 | 241 | 2.4 | 2.6 | 100 | 209 | 100 | 203 |

TABLE 6-continued

| | | | | | | | | | |
|---|---|---|---|---|---|---|---|---|---|
| Example 3 | 100 | 43 | 276 | 1.8 | 2.1 | 100 | 205 | 100 | 217 |
| Example 4 | 100 | 65 | 266 | 2.0 | 2.6 | 100 | 221 | 100 | 218 |
| Example 5 | 100 | 36 | 264 | 1.9 | 2.1 | 100 | 194 | 100 | 217 |
| Example 6 | 100 | 58 | 253 | 2.3 | 2.5 | 100 | 213 | 100 | 235 |
| Example 7 | 100 | 45 | 243 | 1.8 | 2.6 | 100 | 201 | 100 | 203 |
| Example 8 | 100 | 53 | 255 | 3.6 | 3.9 | 100 | 202 | 100 | 233 |
| Example 9 | 100 | 77 | 234 | 1.9 | 2.0 | 100 | 190 | 100 | 205 |
| Example 10 | 100 | 99 | 230 | 2.5 | 2.7 | 100 | 217 | 100 | 210 |
| Example 11 | 100 | 94 | 258 | 1.8 | 1.9 | 100 | 213 | 100 | 225 |
| Example 12 | 100 | 112 | 255 | 2.4 | 2.7 | 100 | 230 | 100 | 227 |
| Example 13 | 100 | 87 | 246 | 1.9 | 2.1 | 100 | 201 | 100 | 225 |
| Example 14 | 100 | 105 | 243 | 2.5 | 2.8 | 100 | 220 | 100 | 237 |
| Example 15 | 100 | 91 | 231 | 2.0 | 2.6 | 100 | 211 | 100 | 213 |
| Example 16 | 100 | 89 | 245 | 1.9 | 2.7 | 100 | 210 | 100 | 236 |

TABLE 7

| | Joint type | Joining method | Material to be joined | | | | | | | | | | | | Joined portion | | | | | | Thermo-mechanically affected zone | | | |
|---|---|---|---|---|---|---|---|---|---|---|---|---|---|---|---|---|---|---|---|---|---|---|---|---|---|
| | | | First electrical steel strip | | | | Second electrical steel strip | | | | | | | | | | | | | | | First electrical steel side | | Second electrical steel side | |
| | | | Steel sample ID | Dbm1 (μm) | Hbm1 | Thickness (mm) | Steel sample ID | Dbm2 (μm) | Hbm2 | Thickness (mm) | TbmL (mm) | TbmH (mm) | | | Ferrite phase area ratio (%) | Dsz (μm) | Hsz | TszL (mm) | TszH (mm) | | Ferrite phase area ratio (%) | Dhaz1 (μm) | Ferrite phase area ratio (%) | Dhaz2 (μm) |
| Comparative Example 1 | Butt | Laser | B1-1 | 280 | 219 | 2.0 | B1-1 | 280 | 219 | 2.0 | 2.0 | 2.0 | | | 100 | 410 | 218 | 1.9 | 2.2 | | 100 | 310 | 100 | 327 |
| Comparative Example 2 | Butt | Laser | B1-2 | 280 | 219 | 2.6 | B1-2 | 280 | 219 | 2.6 | 2.6 | 2.6 | | | 100 | 453 | 215 | 2.6 | 2.7 | | 100 | 326 | 100 | 321 |
| Comparative Example 3 | Butt | Laser | B2-1 | 310 | 242 | 2.0 | B2-1 | 310 | 242 | 2.0 | 2.0 | 2.0 | | | 100 | 437 | 240 | 2.0 | 2.1 | | 100 | 351 | 100 | 346 |
| Comparative Example 4 | Butt | Laser | B2-2 | 310 | 242 | 2.6 | B2-2 | 310 | 242 | 2.6 | 2.6 | 2.6 | | | 100 | 440 | 238 | 2.5 | 2.8 | | 100 | 367 | 100 | 372 |
| Comparative Example 5 | Butt | Laser | B1-1 | 280 | 219 | 2.0 | B1-1 | 280 | 219 | 2.0 | 2.0 | 2.0 | | | 43 | 23 | 271 | 2.0 | 2.7 | | 100 | 338 | 100 | 362 |
| Comparative Example 6 | Butt | Laser | B1-2 | 280 | 219 | 2.6 | B1-2 | 280 | 219 | 2.6 | 2.6 | 2.6 | | | 40 | 31 | 265 | 2.6 | 3.5 | | 100 | 359 | 100 | 355 |
| Comparative Example 7 | Butt | Laser | B2-1 | 310 | 242 | 2.0 | B2-1 | 310 | 242 | 2.0 | 2.0 | 2.0 | | | 49 | 19 | 283 | 2.0 | 2.5 | | 100 | 388 | 100 | 395 |
| Comparative Example 8 | Butt | Laser | B2-2 | 310 | 242 | 2.6 | B2-2 | 310 | 242 | 2.6 | 2.6 | 2.6 | | | 46 | 28 | 278 | 2.6 | 3.5 | | 100 | 399 | 100 | 413 |
| Comparative Example 9 | Butt | Laser | B1-1 | 280 | 219 | 2.0 | B2-1 | 310 | 242 | 2.0 | 2.0 | 2.0 | | | 45 | 25 | 276 | 2.0 | 2.5 | | 100 | 352 | 100 | 392 |
| Comparative Example 10 | Butt | Laser | B1-2 | 280 | 219 | 2.6 | B2-2 | 310 | 242 | 2.6 | 2.6 | 2.6 | | | 48 | 21 | 281 | 2.6 | 3.3 | | 100 | 377 | 100 | 401 |
| Comparative Example 11 | Butt | Laser | B1-1 | 280 | 219 | 2.0 | B1-2 | 280 | 219 | 2.6 | 2.0 | 2.6 | | | 44 | 40 | 274 | 2.0 | 3.3 | | 100 | 341 | 100 | 352 |
| Comparative Example 12 | Butt | Laser | B1-1 | 280 | 219 | 2.0 | B2-2 | 310 | 242 | 2.6 | 2.0 | 2.6 | | | 43 | 45 | 272 | 2.0 | 3.3 | | 100 | 343 | 100 | 396 |

TABLE 8

| | Expression (1) | Expression (2) | Expression (3) | Expression (4) | Expression (5) | Expression (6) | Erichsen value of welded joint (mm) | Erichsen value ratio (%) |
|---|---|---|---|---|---|---|---|---|
| Example 1 | ○ | ○ | ○ | ○ | ○ | ○ | 13.5 | 109 |
| Example 2 | ○ | ○ | ○ | ○ | ○ | ○ | 14.1 | 104 |
| Example 3 | ○ | ○ | ○ | ○ | ○ | ○ | 3.1 | 89 |
| Example 4 | ○ | ○ | ○ | ○ | × | ○ | 3.1 | 82 |
| Example 5 | ○ | ○ | ○ | ○ | ○ | ○ | 7.2 | 206 |
| Example 6 | ○ | ○ | ○ | ○ | ○ | ○ | 6.8 | 179 |
| Example 7 | ○ | ○ | ○ | ○ | ○ | ○ | 12.8 | 103 |
| Example 8 | ○ | ○ | ○ | ○ | ○ | × | 2.9 | 83 |
| Example 9 | ○ | ○ | ○ | ○ | ○ | ○ | 12.6 | 102 |
| Example 10 | ○ | ○ | ○ | ○ | ○ | ○ | 13.4 | 99 |
| Example 11 | ○ | ○ | ○ | ○ | ○ | ○ | 3.2 | 91 |
| Example 12 | ○ | ○ | ○ | ○ | ○ | ○ | 3.8 | 100 |
| Example 13 | ○ | ○ | ○ | ○ | ○ | ○ | 3.2 | 91 |
| Example 14 | ○ | ○ | ○ | ○ | ○ | ○ | 3.4 | 89 |
| Example 15 | ○ | ○ | ○ | ○ | ○ | ○ | 11.8 | 95 |
| Example 16 | ○ | ○ | ○ | ○ | ○ | ○ | 3.2 | 84 |
| Comparative Example 1 | × | × | × | ○ | ○ | ○ | 9.5 | 77 |
| Comparative Example 2 | × | × | × | ○ | ○ | ○ | 10.0 | 74 |
| Comparative Example 3 | × | × | × | ○ | ○ | ○ | 1.1 | 31 |
| Comparative Example 4 | × | × | × | ○ | ○ | ○ | 2.3 | 61 |
| Comparative Example 5 | ○ | × | × | × | ○ | × | 9.8 | 79 |
| Comparative Example 6 | ○ | × | × | × | ○ | × | 9.7 | 72 |
| Comparative Example 7 | ○ | × | × | ○ | ○ | ○ | 2.5 | 71 |
| Comparative Example 8 | ○ | × | × | ○ | ○ | × | 2.2 | 58 |
| Comparative Example 9 | ○ | × | × | ○ | ○ | ○ | 2.3 | 66 |
| Comparative Example 10 | ○ | × | × | × | ○ | ○ | 2.6 | 68 |
| Comparative Example 11 | ○ | × | × | × | ○ | ○ | 9.4 | 76 |
| Comparative Example 12 | ○ | × | × | ○ | ○ | ○ | 2.9 | 76 |

○ Satisfies the relationship in the Expression
× Does not satisfy the relationship in the Expression Table 8 indicates that excellent fracture inhibition effects were obtained in all of the Examples where the steel microstructures of the joined portion and the thermo-mechanically affected zone were mainly ferrite phase and the relationships of the above Expressions (1) to (4) were satisfied.

On the other hand, in the Comparative Examples where the steel microstructures of the joined portion and the thermo-mechanically affected zone were not mainly ferrite phase and/or at least one of the relationships of the above Expressions (1) to (4) were not satisfied, sufficient fracture inhibition effect was not obtained.

Example 2

As in Examples 1, electrical steel strips having the chemical compositions listed in Table 1 (the balance being Fe and inevitable impurity) were used as the material to be joined (the first electrical steel strip and the second electrical steel strip). The first electrical steel strip (preceding steel strip) and the second electrical steel strip (trailing steel strip) were then joined by double-sided friction stir welding under the conditions listed in Table 9, simulating being on a continuous cold rolling line, to produce the electrical steel strip welded joint. Here, the groove was a so-called I-type groove with no groove angle to the ends of the two electrical steel strips to be joined, and the two electrical steel strips were butted and joined with a surface state equivalent to that of milling. Conditions not specified were set in accordance with conventional methods.

In all of the double-sided friction stir welding, as illustrated in FIG. 3C, the front side rotating tool disposed on the vertically upper side was rotated counterclockwise when viewed from the vertically upper side, and the back side rotating tool disposed on the vertically lower side was rotated clockwise when viewed from the vertically upper side. Further, the butted portion of the first electrical steel strip and the second electrical steel strip was made with the back side (the side where the back side rotating tool was disposed) having no step and the front side (the side where the front side rotating tool was disposed) having a step. Further, the electrical steel strip having the smaller thickness (the first electrical steel strip in the example in FIG. 3C) was disposed on the advancing side of the front side rotating tool, and the electrical steel strip having the larger thickness (the second electrical steel strip in the example in FIG. 3C) was disposed on the retreating side of the front side rotating tool. Additionally, the rotating tools were not tilted in the perpendicular-to-joining direction.

Further, rotating tools were used having the shapes illustrated in the drawings listed in Table 9. The dimensions of each part are indicated in Table 9 and below.

FIG. 6
Probe diameter: 3.5 mm, probe length: 0.5 mm

FIG. 7B
Probe diameter: 3.5 mm, probe length: 0.5 mm, groove depth: 0.5 mm, groove width: 0.5 mm FIG. 9A
Curved surface height: 0.5 mm FIG. 9C
Curved surface height: 0.5 mm, groove depth (outer circumferential portion): 0.5 mm, groove width (outer circumferential portion): 0.5 mm FIG. 10A
Curved surface depth: 0.5 mm FIG. 14C
Curved surface height: 0.5 mm, step height (center portion and outer circumferential portion): 0.125 mm, step width (center portion and outer circumferential portion): 1.25 mm Further, the front side rotating tool and the back side rotating tool had the same cross section dimensions and shape as each other. Each of the rotating tools was made of tungsten carbide (WC) with a Vickers hardness of HV 1090, which was harder than the material to be joined.

Further, for comparison, the material to be joined (the first electrical steel strip and the second electrical steel strip) listed in Table 1 was joined by laser welding under the conditions listed in Table 10 to produce an electrical steel strip welded joint.

For the laser welding, a $CO_2$ laser oscillator with a maximum output of 5.5 kW was used. Helium was used as the shielding gas, and the shielding gas flow rate was 40 L/min. In Table 10, an entry of "no" under "filler wire addition" indicates welding without filler wire. Further, in Table 10, an entry of "yes" under "filler wire addition", as in Examples 1, indicates welding using a metal inert gas (MIG) welding wire (0.9 mm diameter) having a chemical composition listed in Table 5 (the balance being Fe and inevitable impurity) as filler wire.

The electrical steel strip welded joints obtained as described above were all sound and free of defects both on exterior and interior surfaces.

For the electrical steel strip welded joints thus obtained, the joined portion, the thermo-mechanically affected zone, and the base metal portion were defined as described above.

Further, the following were measured as described above:

Dsz: average value (μm) of ferrite grain size of the joined portion,

Dhaz1: average value (μm) of ferrite grain size of the thermo-mechanically affected zone on the first electrical steel strip side, Dhaz2: average value (μm) of ferrite grain size of the thermo-mechanically affected zone on the second electrical steel strip side, Dbm1: average value (μm) of ferrite grain size of the base metal portion of the first electrical steel strip, Dbm2: average value (μm) of ferrite grain size of the base metal portion of the second electrical steel strip, Hsz: average value of hardness of the joined portion, Hbm1: average value of hardness of the base metal portion of the first electrical steel strip, and Hbm2: average value of hardness of the base metal portion of the second electrical steel strip.

Further, cross sections in the vertical direction of the electrical steel strip welded joints (the plane illustrated in FIG. 1B (that is, the plane including the perpendicular-to-joining direction and the thickness direction)) were each measured for TszL: minimum value (mm) of joined portion thickness and TszH: maximum value (mm) of joined portion thickness.

In the electrical steel strip welded joint obtained by laser welding, the welded portion was regarded as the joined portion and the heat-affected zone as the thermo-mechanically affected zone for the above measurements. The measurement procedures and the like were the same as that for an electrical steel strip welded joint obtained by friction stir welding.

The results are listed in Tables 11 and 12.

The electrical steel strip welded joints were evaluated for effectiveness in inhibiting the occurrence of coil joint fractures in a production line (hereinafter also referred to as fracture inhibition effect) according to the same procedures as in Examples 1. The evaluation results are listed in Table 13.

TABLE 9

| | Joint type | Joining method | Material to be joined | | | | | | | Rotating tool | | | | | | Joining conditions | | | | |
|---|---|---|---|---|---|---|---|---|---|---|---|---|---|---|---|---|---|---|---|---|
| | | | First electrical steel strip | | Second electrical steel strip | | | | | | | | Outer circum-ferential portion taper angle α (°) | Boundary position between center portion and outer circum-ferential portion | | | Rotation speed RS (r/min) | | | |
| | | | Steel sample ID | Thick-ness t1 (mm) | Steel sample ID | Thick-ness t2 (mm) | t (mm) | TJ (mm) | Shape | Leading end diameter D (mm) | Center portion diameter D₁ (mm) | | | | Tilt angle θ (°) | Gap between shoulder ends (mm) | Front side | Back side | Joining speed JS (mm/min) | RS × D₁³/JS |
|---|---|---|---|---|---|---|---|---|---|---|---|---|---|---|---|---|---|---|---|---|
| Example 1 | Butt | Double-sided | B1-1 | 2.0 | B1-2 | 2.6 | 2.3 | 2.3 | FIG. 6 | 25 | 12 | 10 | 0.24 × D | 1.5 | 1.40 | 800 | 800 | 2000 | 691 |
| Example 2 | Butt | Double-sided | B1-1 | 2.0 | B1-2 | 2.6 | 2.3 | 2.3 | FIG. 7B | 25 | 12 | 10 | 0.24 × D | 1.5 | 1.40 | 800 | 800 | 2000 | 691 |
| Example 3 | Butt | Double-sided | B1-1 | 2.0 | B1-2 | 2.6 | 2.3 | 2.3 | FIG. 8A | 25 | 12 | 10 | 0.24 × D | 0 | 1.40 | 800 | 800 | 2000 | 691 |
| Example 4 | Butt | Double-sided | B1-1 | 2.0 | B1-2 | 2.6 | 2.3 | 2.3 | FIG. 9A | 25 | 12 | 10 | 0.24 × D | 0 | 1.40 | 800 | 800 | 2000 | 691 |
| Example 5 | Butt | Double-sided | B1-1 | 2.0 | B1-2 | 2.6 | 2.3 | 2.3 | FIG. 9C | 25 | 12 | 10 | 0.24 × D | 0 | 1.40 | 800 | 800 | 2000 | 691 |
| Example 6 | Butt | Double-sided | B1-1 | 2.0 | B1-2 | 2.6 | 2.3 | 2.3 | FIG. 10A | 25 | 12 | 10 | 0.24 × D | 0 | 1.40 | 800 | 800 | 2000 | 691 |
| Example 7 | Butt | Double-sided | B1-1 | 2.0 | B1-2 | 2.6 | 2.3 | 2.3 | FIG. 14C | 25 | 12 | 10 | 0.24 × D | 0 | 1.40 | 800 | 800 | 2000 | 691 |
| Example 8 | Butt | Double-sided | B1-1 | 2.0 | B1-2 | 2.6 | 2.3 | 2.3 | FIG. 6 | 25 | 12 | 10 | 0.24 × D | 1.5 | 1.20 | 1000 | 1000 | 2000 | 864 |
| Example 9 | Butt | Double-sided | B1-1 | 2.0 | B1-2 | 2.6 | 2.3 | 2.3 | FIG. 7B | 25 | 12 | 10 | 0.24 × D | 1.5 | 1.20 | 1000 | 1000 | 2000 | 864 |
| Example 10 | Butt | Double-sided | B1-1 | 2.0 | B1-2 | 2.6 | 2.3 | 2.3 | FIG. 8A | 25 | 12 | 10 | 0.24 × D | 0 | 1.20 | 1000 | 1000 | 2000 | 864 |
| Example 11 | Butt | Double-sided | B1-1 | 2.0 | B1-2 | 2.6 | 2.3 | 2.3 | FIG. 9A | 25 | 12 | 10 | 0.24 × D | 0 | 1.20 | 1000 | 1000 | 2000 | 864 |
| Example 12 | Butt | Double-sided | B2-1 | 2.0 | B2-2 | 2.6 | 2.3 | 2.3 | FIG. 9C | 25 | 12 | 10 | 0.24 × D | 0 | 1.20 | 1000 | 1000 | 2000 | 864 |
| Example 13 | Butt | Double-sided | B2-1 | 2.0 | B2-2 | 2.6 | 2.3 | 2.3 | FIG. 10A | 25 | 12 | 10 | 0.24 × D | 0 | 1.20 | 1000 | 1000 | 2000 | 864 |
| Example 14 | Butt | Double-sided | B1-1 | 2.0 | B1-2 | 2.6 | 2.3 | 2.3 | FIG. 14C | 25 | 12 | 10 | 0.24 × D | 0 | 1.20 | 1000 | 1000 | 2000 | 864 |
| Example 15 | Butt | Double-sided | B1-1 | 2.0 | B1-2 | 2.6 | 2.3 | 2.3 | FIG. 6 | 25 | 12 | 15 | 0.24 × D | 1.5 | 1.40 | 800 | 800 | 2000 | 691 |
| Example 16 | Butt | Double-sided | B1-1 | 2.0 | B1-2 | 2.6 | 2.3 | 2.3 | FIG. 7B | 25 | 12 | 15 | 0.24 × D | 1.5 | 1.40 | 800 | 800 | 2000 | 691 |
| Example 17 | Butt | Double-sided | B1-1 | 2.0 | B1-2 | 2.6 | 2.3 | 2.3 | FIG. 8A | 25 | 12 | 15 | 0.24 × D | 0 | 1.40 | 800 | 800 | 2000 | 691 |
| Example 18 | Butt | Double-sided | B1-1 | 2.0 | B1-2 | 2.6 | 2.3 | 2.3 | FIG. 9A | 25 | 12 | 15 | 0.24 × D | 0 | 1.40 | 800 | 800 | 2000 | 691 |
| Example 19 | Butt | Double-sided | B1-1 | 2.0 | B1-2 | 2.6 | 2.3 | 2.3 | FIG. 9C | 25 | 12 | 15 | 0.24 × D | 0 | 1.40 | 800 | 800 | 2000 | 691 |
| Example 20 | Butt | Double-sided | B1-1 | 2.0 | B1-2 | 2.6 | 2.3 | 2.3 | FIG. 10A | 25 | 12 | 15 | 0.24 × D | 0 | 1.40 | 800 | 800 | 2000 | 691 |
| Example 21 | Butt | Double-sided | B1-1 | 2.0 | B1-2 | 2.6 | 2.3 | 2.3 | FIG. 14C | 25 | 12 | 15 | 0.24 × D | 0 | 1.40 | 800 | 800 | 2000 | 691 |
| Example 22 | Butt | Double-sided | B1-1 | 2.0 | B1-2 | 2.6 | 2.3 | 2.3 | FIG. 6 | 25 | 12 | 15 | 0.24 × D | 1.5 | 1.20 | 1000 | 1000 | 2000 | 864 |
| Example 23 | Butt | Double-sided | B1-1 | 2.0 | B1-2 | 2.6 | 2.3 | 2.3 | FIG. 7B | 25 | 12 | 15 | 0.24 × D | 1.5 | 1.20 | 1000 | 1000 | 2000 | 864 |
| Example 24 | Butt | Double-sided | B1-1 | 2.0 | B1-2 | 2.6 | 2.3 | 2.3 | FIG. 8A | 25 | 12 | 15 | 0.24 × D | 0 | 1.20 | 1000 | 1000 | 2000 | 864 |
| Example 25 | Butt | Double-sided | B1-1 | 2.0 | B1-2 | 2.6 | 2.3 | 2.3 | FIG. 9A | 25 | 12 | 15 | 0.24 × D | 0 | 1.20 | 1000 | 1000 | 2000 | 864 |
| Example 26 | Butt | Double-sided | B2-1 | 2.0 | B2-2 | 2.6 | 2.3 | 2.3 | FIG. 9C | 25 | 12 | 15 | 0.24 × D | 0 | 1.20 | 1000 | 1000 | 2000 | 864 |
| Example 27 | Butt | Double-sided | B2-1 | 2.0 | B2-2 | 2.6 | 2.3 | 2.3 | FIG. 10A | 25 | 12 | 15 | 0.24 × D | 0 | 1.20 | 1000 | 1000 | 2000 | 864 |
| Example 28 | Butt | Double-sided | B1-1 | 2.0 | B1-2 | 2.6 | 2.3 | 2.3 | FIG. 14C | 25 | 12 | 15 | 0.24 × D | 0 | 1.20 | 1000 | 1000 | 2000 | 864 |
| Example 29 | Butt | Double-sided | B1-1 | 2.0 | B1-2 | 2.6 | 2.3 | 2.3 | FIG. 6 | 25 | 15 | 10 | 0.30 × D | 1.5 | 1.40 | 800 | 800 | 2000 | 1350 |
| Example 30 | Butt | Double-sided | B1-1 | 2.0 | B1-2 | 2.6 | 2.3 | 2.3 | FIG. 7B | 25 | 15 | 10 | 0.30 × D | 1.5 | 1.40 | 800 | 800 | 2000 | 1350 |
| Example 31 | Butt | Double-sided | B1-1 | 2.0 | B1-2 | 2.6 | 2.3 | 2.3 | FIG. 8A | 25 | 15 | 10 | 0.30 × D | 0 | 1.40 | 800 | 800 | 2000 | 1350 |
| Example 32 | Butt | Double-sided | B1-1 | 2.0 | B1-2 | 2.6 | 2.3 | 2.3 | FIG. 9A | 25 | 15 | 10 | 0.30 × D | 0 | 1.40 | 800 | 800 | 2000 | 1350 |
| Example 33 | Butt | Double-sided | B1-1 | 2.0 | B1-2 | 2.6 | 2.3 | 2.3 | FIG. 9C | 25 | 15 | 10 | 0.30 × D | 0 | 1.40 | 800 | 800 | 2000 | 1350 |
| Example 34 | Butt | Double-sided | B1-1 | 2.0 | B1-2 | 2.6 | 2.3 | 2.3 | FIG. 10A | 25 | 15 | 10 | 0.30 × D | 0 | 1.40 | 800 | 800 | 2000 | 1350 |
| Example 35 | Butt | Double-sided | B1-1 | 2.0 | B1-2 | 2.6 | 2.3 | 2.3 | FIG. 14C | 25 | 15 | 10 | 0.30 × D | 0 | 1.40 | 800 | 800 | 2000 | 1350 |
| Example 36 | Butt | Double-sided | B1-1 | 2.0 | B1-2 | 2.6 | 2.3 | 2.3 | FIG. 6 | 25 | 15 | 10 | 0.30 × D | 1.5 | 1.20 | 1000 | 1000 | 2000 | 1688 |

TABLE 9-continued

| | Joint type | Joining method | Material to be joined | | | | | | | Rotating tool | | | | | | Joining conditions | | | |
|---|---|---|---|---|---|---|---|---|---|---|---|---|---|---|---|---|---|---|---|
| | | | First electrical steel strip | | Second electrical steel strip | | t (mm) | TJ (mm) | Shape | Leading end diameter D (mm) | Center portion diameter $D_1$ (mm) | Outer circumferential portion taper angle α (°) | Boundary position between center portion and outer circumferential portion | Tilt angle θ (°) | Gap between shoulder ends (mm) | Rotation speed RS (r/min) | | Joining speed JS (mm/min) | $RS \times D_1^3/JS$ |
| | | | Steel sample ID | Thickness t1 (mm) | Steel sample ID | Thickness t2 (mm) | | | | | | | | | | Front side | Back side | | |
| Example 37 | Butt | Double-sided | B1-1 | 2.0 | B1-2 | 2.6 | 2.3 | 2.3 | FIG. 7B | 25 | 15 | 10 | 0.30 × D | 1.5 | 1.20 | 1000 | 1000 | 2000 | 1688 |
| Example 38 | Butt | Double-sided | B1-1 | 2.0 | B1-2 | 2.6 | 2.3 | 2.3 | FIG. 8A | 25 | 15 | 10 | 0.30 × D | 0 | 1.20 | 1000 | 1000 | 2000 | 1688 |
| Example 39 | Butt | Double-sided | B1-1 | 2.0 | B1-2 | 2.6 | 2.3 | 2.3 | FIG. 9A | 25 | 15 | 10 | 0.30 × D | 0 | 1.20 | 1000 | 1000 | 2000 | 1688 |
| Example 40 | Butt | Double-sided | B2-1 | 2.0 | B2-2 | 2.6 | 2.3 | 2.3 | FIG. 9C | 25 | 15 | 10 | 0.30 × D | 0 | 1.20 | 1000 | 1000 | 2000 | 1688 |
| Example 41 | Butt | Double-sided | B2-1 | 2.0 | B2-2 | 2.6 | 2.3 | 2.3 | FIG. 10A | 25 | 15 | 10 | 0.30 × D | 0 | 1.20 | 1000 | 1000 | 2000 | 1688 |
| Example 42 | Butt | Double-sided | B2-1 | 2.0 | B2-2 | 2.6 | 2.3 | 2.3 | FIG. 14C | 25 | 15 | 10 | 0.30 × D | 0 | 1.20 | 1000 | 1000 | 2000 | 1688 |

TABLE 10

|  | Joint type | Joining method | Material to be joined | | | | | | Joining conditions | | | | Filler wire addition | |
|---|---|---|---|---|---|---|---|---|---|---|---|---|---|---|
|  |  |  | First electrical steel strip | | Second electrical steel strip | | | | Gap between | Laser | | | | Wire |
|  |  |  | Steel sample ID | Thickness t1 (mm) | Steel sample ID | Thickness t2 (mm) | t (mm) | TJ (mm) | electrical steel strips (mm) | Laser output (kW) | beam diameter (mm) | Welding speed (mm/min) | Yes or no | feed speed (m/min) |
| Comparative Example 1 | Butt | Laser | B1-1 | 2.0 | B1-2 | 2.6 | 2.3 | 2.3 | 0 | 2.5 | 0.5 | 1500 | No | — |
| Comparative Example 2 | Butt | Laser | B1-1 | 2.0 | B1-2 | 2.6 | 2.3 | 2.3 | 0 | 3.0 | 0.5 | 1250 | No | — |
| Comparative Example 3 | Butt | Laser | B2-1 | 2.0 | B2-2 | 2.6 | 2.3 | 2.3 | 0 | 2.5 | 0.5 | 1500 | No | — |
| Comparative Example 4 | Butt | Laser | B2-1 | 2.0 | B2-2 | 2.6 | 2.3 | 2.3 | 0 | 3.0 | 0.5 | 1250 | No | — |
| Comparative Example 5 | Butt | Laser | B1-1 | 2.0 | B1-2 | 2.6 | 2.3 | 2.3 | 0.3 | 5.0 | 0.5 | 1300 | Yes | 3.0 |
| Comparative Example 6 | Butt | Laser | B1-1 | 2.0 | B1-2 | 2.6 | 2.3 | 2.3 | 0.3 | 5.0 | 0.5 | 1000 | Yes | 3.0 |
| Comparative Example 7 | Butt | Laser | B2-1 | 2.0 | B2-2 | 2.6 | 2.3 | 2.3 | 0.3 | 5.0 | 0.5 | 1300 | Yes | 3.0 |
| Comparative Example 8 | Butt | Laser | B2-1 | 2.0 | B2-2 | 2.6 | 2.3 | 2.3 | 0.3 | 5.0 | 0.5 | 1000 | Yes | 3.0 |
| Comparative Example 9 | Butt | Laser | B1-1 | 2.0 | B1-2 | 2.6 | 2.3 | 2.3 | 0.3 | 5.0 | 0.5 | 1300 | Yes | 3.0 |
| Comparative Example 10 | Butt | Laser | B1-1 | 2.0 | B1-2 | 2.6 | 2.3 | 2.3 | 0.3 | 5.0 | 0.5 | 1000 | Yes | 3.0 |
| Comparative Example 11 | Butt | Laser | B2-1 | 2.0 | B2-2 | 2.6 | 2.3 | 2.3 | 0.3 | 5.0 | 0.5 | 1200 | Yes | 3.0 |
| Comparative Example 12 | Butt | Laser | B2-1 | 2.0 | B2-2 | 2.6 | 2.3 | 2.3 | 0.3 | 5.0 | 0.5 | 1200 | Yes | 3.0 |

TABLE 11

| | | | First electrical steel strip | | | | Second electrical steel strip | | | | | | Joined portion | | | | | Thermo-mechanically affected zone | | | |
|---|---|---|---|---|---|---|---|---|---|---|---|---|---|---|---|---|---|---|---|---|---|---|
| | | | | | | | | | | | | | | | | | | | First electrical steel strip side | | Second electrical steel strip side | |
| | Joint type | Joining method | Steel sample ID | Dbm1 (μm) | Hbm1 | Thickness (mm) | Steel sample ID | Dbm2 (μm) | Hbm2 | Thickness (mm) | TbmL (mm) | TbmH (mm) | Ferrite phase area ratio (%) | Dsz (μm) | Hsz | TszL (mm) | TszH (mm) | Ferrite phase area ratio (%) | Dhaz1 (μm) | Ferrite phase area ratio (%) | Dhaz2 (μm) |
| Example 1 | Butt | Double-sided | B1-1 | 280 | 219 | 2.0 | B1-2 | 280 | 219 | 2.6 | 2.0 | 2.6 | 100 | 99 | 230 | 1.9 | 2.7 | 100 | 216 | 100 | 238 |
| Example 2 | Butt | Double-sided | B1-1 | 280 | 219 | 2.0 | B1-2 | 280 | 219 | 2.6 | 2.0 | 2.6 | 100 | 105 | 229 | 2.0 | 2.6 | 100 | 218 | 100 | 256 |
| Example 3 | Butt | Double-sided | B1-1 | 280 | 219 | 2.0 | B1-2 | 280 | 219 | 2.6 | 2.0 | 2.6 | 100 | 108 | 229 | 1.8 | 2.6 | 100 | 204 | 100 | 232 |
| Example 4 | Butt | Double-sided | B1-1 | 280 | 219 | 2.0 | B1-2 | 280 | 219 | 2.6 | 2.0 | 2.6 | 100 | 94 | 231 | 1.9 | 2.7 | 100 | 221 | 100 | 201 |
| Example 5 | Butt | Double-sided | B1-1 | 280 | 219 | 2.0 | B1-2 | 280 | 219 | 2.6 | 2.0 | 2.6 | 100 | 91 | 231 | 2.0 | 2.5 | 100 | 205 | 100 | 262 |
| Example 6 | Butt | Double-sided | B1-1 | 280 | 219 | 2.0 | B1-2 | 280 | 219 | 2.6 | 2.0 | 2.6 | 100 | 114 | 228 | 1.9 | 2.6 | 100 | 222 | 100 | 212 |
| Example 7 | Butt | Double-sided | B1-1 | 280 | 219 | 2.0 | B1-2 | 280 | 219 | 2.6 | 2.0 | 2.6 | 100 | 86 | 260 | 1.8 | 2.6 | 100 | 235 | 100 | 222 |
| Example 8 | Butt | Double-sided | B1-1 | 280 | 219 | 2.0 | B1-2 | 280 | 219 | 2.6 | 2.0 | 2.6 | 100 | 105 | 256 | 1.5 | 2.6 | 100 | 240 | 100 | 220 |
| Example 9 | Butt | Double-sided | B1-1 | 280 | 219 | 2.0 | B1-2 | 280 | 219 | 2.6 | 2.0 | 2.6 | 100 | 88 | 260 | 2.0 | 2.5 | 100 | 257 | 100 | 256 |
| Example 10 | Butt | Double-sided | B1-1 | 280 | 219 | 2.0 | B1-2 | 280 | 219 | 2.6 | 2.0 | 2.6 | 100 | 99 | 258 | 1.9 | 2.6 | 100 | 233 | 100 | 265 |
| Example 11 | Butt | Double-sided | B1-1 | 280 | 219 | 2.0 | B1-2 | 280 | 219 | 2.6 | 2.0 | 2.6 | 100 | 94 | 258 | 1.8 | 2.6 | 100 | 251 | 100 | 250 |
| Example 12 | Butt | Double-sided | B1-1 | 280 | 219 | 2.0 | B1-2 | 280 | 219 | 2.6 | 2.0 | 2.6 | 100 | 112 | 255 | 1.8 | 2.7 | 100 | 289 | 100 | 277 |
| Example 13 | Butt | Double-sided | B2-1 | 310 | 242 | 2.0 | B2-2 | 310 | 242 | 2.6 | 2.0 | 2.6 | 100 | 87 | 246 | 1.9 | 2.5 | 100 | 236 | 100 | 256 |
| Example 14 | Butt | Double-sided | B2-1 | 310 | 242 | 2.0 | B2-2 | 310 | 242 | 2.6 | 2.0 | 2.6 | 100 | 105 | 243 | 2.0 | 2.6 | 100 | 233 | 100 | 242 |
| Example 15 | Butt | Double-sided | B1-1 | 280 | 219 | 2.0 | B1-2 | 280 | 219 | 2.6 | 2.0 | 2.6 | 100 | 91 | 245 | 1.9 | 2.6 | 100 | 268 | 100 | 235 |
| Example 16 | Butt | Double-sided | B1-1 | 280 | 219 | 2.0 | B1-2 | 280 | 219 | 2.6 | 2.0 | 2.6 | 100 | 112 | 242 | 1.8 | 2.7 | 100 | 238 | 100 | 258 |
| Example 17 | Butt | Double-sided | B1-1 | 280 | 219 | 2.0 | B1-2 | 280 | 219 | 2.6 | 2.0 | 2.6 | 100 | 87 | 246 | 1.9 | 2.6 | 100 | 265 | 100 | 261 |
| Example 18 | Butt | Double-sided | B1-1 | 280 | 219 | 2.0 | B1-2 | 280 | 219 | 2.6 | 2.0 | 2.6 | 100 | 105 | 243 | 2.0 | 2.7 | 100 | 227 | 100 | 266 |
| Example 19 | Butt | Double-sided | B1-1 | 280 | 219 | 2.0 | B1-2 | 280 | 219 | 2.6 | 2.0 | 2.6 | 100 | 91 | 245 | 1.5 | 2.5 | 100 | 261 | 100 | 213 |
| Example 20 | Butt | Double-sided | B1-1 | 280 | 219 | 2.0 | B1-2 | 280 | 219 | 2.6 | 2.0 | 2.6 | 100 | 99 | 244 | 1.9 | 2.6 | 100 | 249 | 100 | 218 |
| Example 21 | Butt | Double-sided | B1-1 | 280 | 219 | 2.0 | B1-2 | 280 | 219 | 2.6 | 2.0 | 2.6 | 100 | 81 | 247 | 1.8 | 2.6 | 100 | 250 | 100 | 223 |
| Example 22 | Butt | Double-sided | B1-1 | 280 | 219 | 2.0 | B1-2 | 280 | 219 | 2.6 | 2.0 | 2.6 | 100 | 89 | 245 | 2.1 | 2.7 | 100 | 270 | 100 | 266 |
| Example 23 | Butt | Double-sided | B1-1 | 280 | 219 | 2.0 | B1-2 | 280 | 219 | 2.6 | 2.0 | 2.6 | 100 | 105 | 243 | 1.5 | 2.5 | 100 | 222 | 100 | 250 |
| Example 24 | Butt | Double-sided | B1-1 | 280 | 219 | 2.0 | B1-2 | 280 | 219 | 2.6 | 2.0 | 2.6 | 100 | 90 | 260 | 1.9 | 2.6 | 100 | 246 | 100 | 239 |
| Example 25 | Butt | Double-sided | B1-1 | 280 | 219 | 2.0 | B1-2 | 280 | 219 | 2.6 | 2.0 | 2.6 | 100 | 112 | 230 | 2.0 | 2.7 | 100 | 246 | 100 | 238 |
| Example 26 | Butt | Double-sided | B2-1 | 310 | 242 | 2.0 | B2-2 | 310 | 242 | 2.6 | 2.0 | 2.6 | 100 | 102 | 254 | 2.1 | 2.6 | 100 | 245 | 100 | 238 |
| Example 27 | Butt | Double-sided | B2-1 | 310 | 242 | 2.0 | B2-2 | 310 | 242 | 2.6 | 2.0 | 2.6 | 100 | 85 | 247 | 2.1 | 2.7 | 100 | 245 | 100 | 237 |
| Example 28 | Butt | Double-sided | B1-1 | 280 | 219 | 2.0 | B1-2 | 280 | 219 | 2.6 | 2.0 | 2.6 | 100 | 99 | 249 | 2.0 | 2.6 | 100 | 245 | 100 | 236 |
| Example 29 | Butt | Double-sided | B1-1 | 280 | 219 | 2.0 | B1-2 | 280 | 219 | 2.6 | 2.0 | 2.6 | 100 | 87 | 257 | 1.9 | 2.6 | 100 | 244 | 100 | 235 |
| Example 30 | Butt | Double-sided | B1-1 | 280 | 219 | 2.0 | B1-2 | 280 | 219 | 2.6 | 2.0 | 2.6 | 100 | 87 | 235 | 1.8 | 2.7 | 100 | 244 | 100 | 234 |
| Example 31 | Butt | Double-sided | B1-1 | 280 | 219 | 2.0 | B1-2 | 280 | 219 | 2.6 | 2.0 | 2.6 | 100 | 105 | 239 | 1.9 | 2.5 | 100 | 243 | 100 | 233 |
| Example 32 | Butt | Double-sided | B1-1 | 280 | 219 | 2.0 | B1-2 | 280 | 219 | 2.6 | 2.0 | 2.6 | 100 | 91 | 241 | 1.9 | 2.7 | 100 | 243 | 100 | 233 |
| Example 33 | Butt | Double-sided | B1-1 | 280 | 219 | 2.0 | B1-2 | 280 | 219 | 2.6 | 2.0 | 2.6 | 100 | 112 | 251 | 2.1 | 2.5 | 100 | 243 | 100 | 232 |
| Example 34 | Butt | Double-sided | B1-1 | 280 | 219 | 2.0 | B1-2 | 280 | 219 | 2.6 | 2.0 | 2.6 | 100 | 105 | 236 | 2.2 | 2.6 | 100 | 243 | 100 | 231 |
| Example 35 | Butt | Double-sided | B1-1 | 280 | 219 | 2.0 | B1-2 | 280 | 219 | 2.6 | 2.0 | 2.6 | 100 | 91 | 239 | 1.5 | 2.6 | 100 | 242 | 100 | 230 |
| Example 36 | Butt | Double-sided | B1-1 | 280 | 219 | 2.0 | B1-2 | 280 | 219 | 2.6 | 2.0 | 2.6 | 100 | 87 | 246 | 2.0 | 2.7 | 100 | 242 | 100 | 229 |
| Example 37 | Butt | Double-sided | B1-1 | 280 | 219 | 2.0 | B1-2 | 280 | 219 | 2.6 | 2.0 | 2.6 | 100 | 105 | 243 | 2.1 | 2.6 | 100 | 242 | 100 | 228 |
| Example 38 | Butt | Double-sided | B1-1 | 280 | 219 | 2.0 | B1-2 | 280 | 219 | 2.6 | 2.0 | 2.6 | 100 | 102 | 245 | 1.8 | 2.7 | 100 | 241 | 100 | 228 |

TABLE 11-continued

| | Joint type | Joining method | Material to be joined | | | | | | | | | Joined portion | | | | | | Thermo-mechanically affected zone | | | |
|---|---|---|---|---|---|---|---|---|---|---|---|---|---|---|---|---|---|---|---|---|---|
| | | | First electrical steel strip | | | Second electrical steel strip | | | | | | | | | | | | First electrical steel strip side | | Second electrical steel strip side | |
| | | | Steel sample ID | Dbm1 (µm) | Hbm1 | Thickness (mm) | Steel sample ID | Dbm2 (µm) | Hbm2 | Thickness (mm) | TbmL (mm) | TbmH (mm) | Ferrite phase area ratio (%) | Dsz (µm) | Hsz | TszL (mm) | TszH (mm) | Ferrite phase area ratio (%) | Dhaz1 (µm) | Ferrite phase area ratio (%) | Dhaz2 (µm) |
| Example 39 | Butt | Double-sided | B1-1 | 280 | 219 | 2.0 | B1-2 | 280 | 219 | 2.6 | 2.0 | 2.6 | 100 | 103 | 242 | 1.9 | 2.5 | 100 | 241 | 100 | 227 |
| Example 40 | Butt | Double-sided | B2-1 | 310 | 242 | 2.0 | B2-2 | 310 | 242 | 2.6 | 2.0 | 2.6 | 100 | 98 | 246 | 2.0 | 2.6 | 100 | 240 | 100 | 226 |
| Example 41 | Butt | Double-sided | B2-1 | 310 | 242 | 2.0 | B2-2 | 310 | 242 | 2.6 | 2.0 | 2.6 | 100 | 95 | 243 | 1.9 | 2.5 | 100 | 240 | 100 | 225 |
| Example 42 | Butt | Double-sided | B2-1 | 310 | 242 | 2.0 | B2-2 | 310 | 242 | 2.6 | 2.0 | 2.6 | 100 | 109 | 242 | 1.8 | 2.6 | 100 | 209 | 100 | 238 |

TABLE 12

| | | | Material to be joined | | | | | | | | | Joined portion | | | | | | Heat-affected zone | | | |
|---|---|---|---|---|---|---|---|---|---|---|---|---|---|---|---|---|---|---|---|---|---|---|
| | | | First electrical steel strip | | | | Second electrical steel strip | | | | | | | | | | | First electrical steel strip side | | Second electrical steel strip side | |
| | Joint type | Joining method | Steel sample ID | Dbm1 (μm) | Hbm1 | Thickness (mm) | Steel sample ID | Dbm2 (μm) | Hbm2 | Thickness (mm) | TbmL (mm) | TbmH (mm) | Ferrite phase area ratio (%) | Dsz (μm) | Hsz | TszL (mm) | TszH (mm) | Ferrite phase area ratio (%) | Dhaz1 (μm) | Ferrite phase area ratio (%) | Dhaz2 (μm) |
| Comparative Example 1 | Butt | Laser | B1-1 | 280 | 219 | 2.0 | B1-2 | 280 | 219 | 2.6 | 2.0 | 2.6 | 100 | 410 | 218 | 1.9 | 2.2 | 100 | 310 | 100 | 327 |
| Comparative Example 2 | Butt | Laser | B1-1 | 280 | 219 | 2.0 | B1-2 | 280 | 219 | 2.6 | 2.0 | 2.6 | 100 | 453 | 215 | 2.6 | 2.7 | 100 | 326 | 100 | 321 |
| Comparative Example 3 | Butt | Laser | B2-1 | 310 | 242 | 2.0 | B2-2 | 310 | 242 | 2.6 | 2.0 | 2.6 | 100 | 437 | 240 | 2.0 | 2.1 | 100 | 351 | 100 | 346 |
| Comparative Example 4 | Butt | Laser | B2-1 | 310 | 242 | 2.0 | B2-2 | 310 | 242 | 2.6 | 2.0 | 2.6 | 100 | 440 | 238 | 2.5 | 2.8 | 100 | 367 | 100 | 372 |
| Comparative Example 5 | Butt | Laser | B1-1 | 280 | 219 | 2.0 | B1-2 | 280 | 219 | 2.6 | 2.0 | 2.6 | 43 | 23 | 292 | 2.0 | 3.8 | 100 | 338 | 100 | 362 |
| Comparative Example 6 | Butt | Laser | B1-1 | 280 | 219 | 2.0 | B1-2 | 280 | 219 | 2.6 | 2.0 | 2.6 | 40 | 31 | 306 | 2.6 | 3.5 | 100 | 359 | 100 | 355 |
| Comparative Example 7 | Butt | Laser | B2-1 | 310 | 242 | 2.0 | B2-2 | 310 | 242 | 2.6 | 2.0 | 2.6 | 49 | 19 | 256 | 2.0 | 2.5 | 100 | 388 | 100 | 395 |
| Comparative Example 8 | Butt | Laser | B2-1 | 310 | 242 | 2.0 | B2-2 | 310 | 242 | 2.6 | 2.0 | 2.6 | 46 | 28 | 278 | 2.6 | 3.5 | 100 | 399 | 100 | 413 |
| Comparative Example 9 | Butt | Laser | B1-1 | 280 | 219 | 2.0 | B1-2 | 280 | 219 | 2.6 | 2.0 | 2.6 | 45 | 25 | 242 | 2.0 | 2.5 | 100 | 352 | 100 | 392 |
| Comparative Example 10 | Butt | Laser | B1-1 | 280 | 219 | 2.0 | B1-2 | 280 | 219 | 2.6 | 2.0 | 2.6 | 48 | 21 | 320 | 2.6 | 3.3 | 100 | 377 | 100 | 401 |
| Comparative Example 11 | Butt | Laser | B2-1 | 310 | 242 | 2.0 | B2-2 | 310 | 242 | 2.6 | 2.0 | 2.6 | 44 | 40 | 345 | 2.0 | 3.3 | 100 | 341 | 100 | 352 |
| Comparative Example 12 | Butt | Laser | B2-1 | 310 | 242 | 2.0 | B2-2 | 310 | 242 | 2.6 | 2.0 | 2.6 | 43 | 45 | 272 | 2.0 | 3.3 | 100 | 343 | 100 | 396 |

TABLE 13

| | Expression (1) | Expression (2) | Expression (3) | Expression (4) | Expression (5) | Expression (6) | Erichsen value of welded joint (mm) | Erichsen value ratio (%) |
|---|---|---|---|---|---|---|---|---|
| Example 1 | ○ | ○ | ○ | ○ | ○ | ○ | 13.5 | 109 |
| Example 2 | ○ | ○ | ○ | ○ | ○ | ○ | 12.8 | 103 |
| Example 3 | ○ | ○ | ○ | ○ | ○ | ○ | 12.6 | 102 |
| Example 4 | ○ | ○ | ○ | ○ | ○ | ○ | 12.9 | 104 |
| Example 5 | ○ | ○ | ○ | ○ | ○ | ○ | 12.8 | 103 |
| Example 6 | ○ | ○ | ○ | ○ | ○ | ○ | 13.5 | 109 |
| Example 7 | ○ | ○ | ○ | ○ | ○ | ○ | 12.8 | 103 |
| Example 8 | ○ | ○ | ○ | ○ | × | ○ | 12.6 | 102 |
| Example 9 | ○ | ○ | ○ | ○ | ○ | ○ | 12.9 | 104 |
| Example 10 | ○ | ○ | ○ | ○ | ○ | ○ | 12.9 | 104 |
| Example 11 | ○ | ○ | ○ | ○ | ○ | ○ | 12.6 | 102 |
| Example 12 | ○ | ○ | ○ | ○ | ○ | ○ | 3.9 | 111 |
| Example 13 | ○ | ○ | ○ | ○ | ○ | ○ | 3.8 | 109 |
| Example 14 | ○ | ○ | ○ | ○ | ○ | ○ | 3.4 | 97 |
| Example 15 | ○ | ○ | ○ | ○ | ○ | ○ | 12.5 | 101 |
| Example 16 | ○ | ○ | ○ | ○ | ○ | ○ | 12.6 | 101 |
| Example 17 | ○ | ○ | ○ | ○ | ○ | ○ | 12.6 | 102 |
| Example 18 | ○ | ○ | ○ | ○ | ○ | ○ | 12.9 | 104 |
| Example 19 | ○ | ○ | ○ | ○ | × | ○ | 12.8 | 103 |
| Example 20 | ○ | ○ | ○ | ○ | ○ | ○ | 13.5 | 109 |
| Example 21 | ○ | ○ | ○ | ○ | ○ | ○ | 14.2 | 115 |
| Example 22 | ○ | ○ | ○ | ○ | ○ | ○ | 13.8 | 111 |
| Example 23 | ○ | ○ | ○ | ○ | × | ○ | 13.1 | 106 |
| Example 24 | ○ | ○ | ○ | ○ | ○ | ○ | 12.6 | 102 |
| Example 25 | ○ | ○ | ○ | ○ | ○ | ○ | 13.6 | 110 |
| Example 26 | ○ | ○ | ○ | ○ | ○ | ○ | 3.6 | 103 |
| Example 27 | ○ | ○ | ○ | ○ | ○ | ○ | 3.2 | 91 |
| Example 28 | ○ | ○ | ○ | ○ | ○ | ○ | 3.4 | 97 |
| Example 29 | ○ | ○ | ○ | ○ | ○ | ○ | 13.5 | 109 |
| Example 30 | ○ | ○ | ○ | ○ | ○ | ○ | 14.2 | 115 |
| Example 31 | ○ | ○ | ○ | ○ | ○ | ○ | 13.8 | 111 |
| Example 32 | ○ | ○ | ○ | ○ | ○ | ○ | 13.1 | 106 |
| Example 33 | ○ | ○ | ○ | ○ | ○ | ○ | 12.6 | 102 |
| Example 34 | ○ | ○ | ○ | ○ | ○ | ○ | 13.6 | 110 |
| Example 35 | ○ | ○ | ○ | ○ | × | ○ | 13.8 | 111 |
| Example 36 | ○ | ○ | ○ | ○ | ○ | ○ | 13.1 | 106 |
| Example 37 | ○ | ○ | ○ | ○ | ○ | ○ | 12.7 | 102 |
| Example 38 | ○ | ○ | ○ | ○ | ○ | ○ | 12.4 | 100 |
| Example 39 | ○ | ○ | ○ | ○ | ○ | ○ | 11.9 | 96 |
| Example 40 | ○ | ○ | ○ | ○ | ○ | ○ | 3.7 | 106 |
| Example 41 | ○ | ○ | ○ | ○ | ○ | ○ | 3.6 | 103 |
| Example 42 | ○ | ○ | ○ | ○ | ○ | ○ | 3.4 | 97 |
| Comparative Example 1 | × | × | × | ○ | ○ | ○ | 9.5 | 77 |
| Comparative Example 2 | × | × | × | ○ | ○ | ○ | 8.6 | 69 |
| Comparative Example 3 | × | × | × | ○ | ○ | ○ | 1.1 | 31 |
| Comparative Example 4 | × | × | × | ○ | ○ | ○ | 2.3 | 66 |
| Comparative Example 5 | ○ | × | × | × | ○ | × | 9.8 | 79 |
| Comparative Example 6 | ○ | × | × | × | ○ | × | 9.7 | 78 |
| Comparative Example 7 | ○ | × | × | ○ | ○ | ○ | 2.5 | 71 |
| Comparative Example 8 | ○ | × | × | ○ | ○ | × | 2.2 | 63 |
| Comparative Example 9 | ○ | × | × | ○ | ○ | ○ | 2.3 | 19 |
| Comparative Example 10 | ○ | × | × | × | ○ | ○ | 2.6 | 21 |
| Comparative Example 11 | ○ | × | × | × | ○ | ○ | 2.4 | 69 |
| Comparative Example 12 | ○ | × | × | ○ | ○ | ○ | 2.1 | 60 |

○ Satisfies the relationship in the Expression
× Does not satisfy the relationship in the Expression Table 13 indicates that in all of the Examples, despite the thicknesses of the first electrical steel strip and the second electrical steel strip being different from each other, the electrical steel strip welded joints were free from defects and had excellent fracture inhibition effects at high joining speed. On the other hand, sufficient fracture inhibition effect was not obtained for each of the Comparative Examples.

REFERENCE SIGNS LIST

1 first electrical steel strip (material to be joined)
2 second electrical steel strip (material to be joined)
3 rotating tool
3-1 rotating tool (front side rotating tool)
3-2 rotating tool (back side rotating tool)
4 joined portion
4-1 thermo-mechanically affected zone (first electrical steel strip side)
4-2 thermo-mechanically affected zone (second electrical steel strip side)
5, 5-1, 5-2 shoulder
5-3 leading end (front side rotating tool)
5-4 leading end (back side rotating tool)
5-5 center portion (front side rotating tool)
5-6 center portion (back side rotating tool)
5-7 outer circumferential portion (front side rotating tool)
5-8 outer circumferential portion (back side rotating tool)
5-9 shoulder end (radial end) (front side rotating tool)
5-10 shoulder end (radial end) (back side rotating tool)
5-11 center portion-outer circumferential portion boundary (front side rotating tool)
5-12 center portion-outer circumferential portion boundary (back side rotating tool)
6, 6-1, 6-2 probe (pin)
6-3 probe (pin) (front side rotating tool)
6-4 probe (pin) (back side rotating tool)
7 gripping device
8 surface plate (backing)
9, 9-1, 9-2 lead end

The invention claimed is:

1. An electrical steel strip welded joint, joining a first electrical steel strip and a second electrical steel strip,
the electrical steel strip welded joint comprising a joined portion and a thermo-mechanically affected zone adjacent to the joined portion, wherein
the steel microstructures of the joined portion and the thermo-mechanically affected zone are a mainly ferrite phase steel microstructure, the mainly ferrite phase steel microstructure having a ferrite phase with an area ratio of 95% or more, and
the following Expressions (1) to (4) are satisfied, $$Dsz \leq 200 \ \mu m \tag{1}$$

$$Dhaz1 \leq Dbm1 \tag{2}$$

$$Dhaz2 \leq Dbm2 \tag{3}$$

$$0.9 \times +(Hbm1 + Hbm2)/2 \leq Hsz \leq 1.2 \times +(Hbm1 + Hbm2)/2 \tag{4}$$

wherein
Dsz is an average value (μm) of ferrite grain size of the joined portion,
Dhaz1 is an average value (μm) of ferrite grain size of the thermo-mechanically affected zone on a first electrical steel strip side,
Dhaz2 is an average value (μm) of ferrite grain size of the thermo-mechanically affected zone on a second electrical steel strip side, Dbm1 is an average value (μm) of ferrite grain size of the base metal portion of the first electrical steel strip, Dbm2 is an average value (μm) of ferrite grain size of the base metal portion of the second electrical steel strip, Hsz is an average value of Vickers hardness under test force of 4.9 N of the joined portion, Hbm1 is an average value of Vickers hardness under test force of 4.9 N of the base metal portion of the first electrical steel strip, and Hbm2 is an average value of Vickers hardness under test force of 4.9 N of the base metal portion of the second electrical steel strip.

2. The electrical steel strip welded joint according to claim 1, satisfying the relationships of the following Expressions (5) and (6), $$0.8 \times TbmL \leq TszL \quad (5)$$

$$TszH \leq 1.3 \times TbmH \quad (6)$$

wherein

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, TbmH is the thickness (mm) of the thicker of the first electrical steel strip and the second electrical steel strip, and when the thicknesses of the first electrical steel strip and the second electrical steel strip are the same, TbmL=TbmH.

3. The electrical steel strip welded joint according to claim 1, wherein the thickness of the first electrical steel strip is different from the thickness of the second electrical steel strip.

4. An electrical steel strip friction stir welding method for joining a first electrical steel strip and a second electrical steel strip following the first electrical steel strip, comprising:

pressing a rotating tool into an unjoined portion that is a butted portion or an overlapped portion of an end of the first electrical steel strip and an end of the second electrical steel strip while rotating the rotating tool; and joining the first electrical steel strip and the second electrical steel strip by moving the rotating tool in a joining direction, wherein the joining is performed under conditions that the steel microstructures of the joined portion and the thermo-mechanically affected zone formed by the joining of the first electrical steel strip and the second electrical steel strip become a mainly ferrite phase steel microstructure, the mainly ferrite phase steel microstructure having a ferrite phase with an area ratio of 95% or more, and the relationships of the following Expressions (1) to (4) are satisfied, $$Dsz \leq 200 \ \mu m \quad (1)$$

$$Dhaz1 \leq Dbm1 \quad (2)$$

$$Dhaz2 \leq Dbm2 \quad (3)$$

$$0.9 \times +(Hbm1 + Hbm2)/2 \leq Hsz \leq 1.2 \times +(Hbm1 + Hbm2)/2 \quad (4)$$

wherein

Dsz is an average value (μm) of ferrite grain size of the joined portion,

Dhaz1 is an average value (μm) of ferrite grain size of the thermo-mechanically affected zone on a first electrical steel strip side, Dhaz2 is an average value (μm) of ferrite grain size of the thermo-mechanically affected zone on a second electrical steel strip side, Dbm1 is an average value (μm) of ferrite grain size of the base metal portion of the first electrical steel strip, Dbm2 is an average value (μm) of ferrite grain size of the base metal portion of the second electrical steel strip, Hsz is an average value of Vickers hardness under test force of 4.9 N of the joined portion, Hbm1 is an average value of Vickers hardness under test force of 4.9 N of the base metal portion of the first electrical steel strip, and Hbm2 is an average value of Vickers hardness under test force of 4.9 N of the base metal portion of the second electrical steel strip.

5. The electrical steel strip friction stir welding method according to claim 4, wherein the joining is performed under conditions satisfying the relationships of the following Expressions (5) and (6), $$0.8 \times TbmL \leq TszL \quad (5)$$

$$TszH \leq 1.3 \times TbmH \quad (6)$$

wherein

TszL is the minimum value (mm) of the thickness of the joined portion,

TszH is the maximum value (mm) of the thickness of the joined portion,

TbmL is the thickness (mm) of the thinner of the first electrical steel strip and the second electrical steel strip, TbmH is the thickness (mm) of the thicker of the first electrical steel strip and the second electrical steel strip, and when the thicknesses of the first electrical steel strip and the second electrical steel strip are the same, TbmL=TbmH.

6. The electrical steel strip friction stir welding method according to claim 4, wherein the rotating tool is a pair of rotating tools facing each other, and the rotating tools are pressed from both sides of the unjoined portion while rotating in opposite directions to each other, the thickness of the first electrical steel strip is different from the thickness of the second electrical steel strip, the leading ends of the rotating tools each include a center portion and an outer circumferential portion disposed adjacent to a periphery of the center portion, and the outer circumferential portion has a tapered shape.

7. The electrical steel strip friction stir welding method according to claim 6, wherein a taper angle α of the outer circumferential portion is from 2° to 20°.

8. The electrical steel strip friction stir welding method according to claim 6, wherein a radial position of the boundary between the center portion and the outer circumferential portion is in a range from 0.15×D to 0.35×D, wherein the radial position is the distance from the axis of rotation along the radial direction of the leading end of the rotating tool, and D is the diameter of the leading end of the rotating tool.

9. The electrical steel strip friction stir welding method according to claim 6, wherein the surface of the outer circumferential portion has a spiral-shaped stepped portion spiraling in the rotation direction of the rotating tool.

10. The electrical steel strip friction stir welding method according to claim 6, wherein the surface of the outer circumferential portion has a spiral-shaped stepped portion spiraling opposite the rotation direction of the rotating tool.

11. The electrical steel strip friction stir welding method according to claim 6, wherein the center portion has a flat, convex curved, or concave curved surface.

12. The electrical steel strip friction stir welding method according to claim 6, wherein the surface of the center portion has a spiral-shaped stepped portion spiraling opposite the rotation direction of the rotating tool.

13. The electrical steel strip friction stir welding method according to claim 6, wherein the diameter $D_1$ (mm) of the center portion of the rotating tool satisfies the relationship of the following Expression (10), and a rotation speed RS (r/min) of the rotating tool, the diameter $D_1$ (mm) of the center portion of the rotating tool, and a joining speed JS (mm/min), expressed as $RS \times D_1^3/JS$, satisfy the relationship of the following Expression (11), $$4 \times TJ \le D_1 \le 10 \times TJ \quad (10)$$

$$200 \times TJ \le RS \times D_1^3/JS \le 2000 \times TJ \quad (11)$$

wherein TJ is defined such that, when the unjoined portion is the butted portion, TJ is an average value (mm) of the thickness of the first electrical steel strip and the thickness of the second electrical steel strip, and when the unjoined portion is the overlapped portion, TJ is the thickness (mm) of the overlapped portion.

14. The electrical steel strip friction stir welding method according to claim 6, wherein at the butted portion of the end of the first electrical steel strip and the end of the second electrical steel strip, there is a step on only one side, the advancing side of the rotating tool disposed on the side with the step is on the side of the electrical steel strip that has the smaller thickness of the first electrical steel strip and the second electrical steel strip, and the retreating side of the rotating tool disposed on the side with the step is on the side of the electrical steel strip that has the greater thickness of the first electrical steel strip and the second electrical steel strip.

15. A method of producing an electrical steel strip, the method comprising:

joining a first electrical steel strip and a second electrical steel strip by the electrical steel strip friction stir welding method according to claim 4 to obtain a joined steel strip; and cold rolling the joined steel strip to obtain a cold-rolled steel strip.

16. The electrical steel strip welded joint according to claim 2, wherein the thickness of the first electrical steel strip is different from the thickness of the second electrical steel strip.

17. The electrical steel strip friction stir welding method according to claim 5, wherein the rotating tool is a pair of rotating tools facing each other, and the rotating tools are pressed from both sides of the unjoined portion while rotating in opposite directions to each other, the thickness of the first electrical steel strip is different from the thickness of the second electrical steel strip, the leading ends of the rotating tools each include a center portion and an outer circumferential portion disposed adjacent to a periphery of the center portion, and the outer circumferential portion has a tapered shape.

18. The electrical steel strip friction stir welding method according to claim 17, wherein a taper angle α of the outer circumferential portion is from 2° to 20°.

19. The electrical steel strip friction stir welding method according to claim 7, wherein a radial position of the boundary between the center portion and the outer circumferential portion is in a range from 0.15×D to 0.35×D, wherein the radial position is the distance from the axis of rotation along the radial direction of the leading end of the rotating tool, and D is the diameter of the leading end of the rotating tool.

20. The electrical steel strip friction stir welding method according to claim 17, wherein a radial position of the boundary between the center portion and the outer circumferential portion is in a range from 0.15×D to 0.35×D, wherein the radial position is the distance from the axis of rotation along the radial direction of the leading end of the rotating tool, and D is the diameter of the leading end of the rotating tool.

* * * * *